(12) United States Patent
Knowles

(10) Patent No.: US 11,470,785 B2
(45) Date of Patent: Oct. 18, 2022

(54) PHENOTYPIC HORTICULTURE SYSTEMS AND METHODS

(71) Applicant: PRECISION PROCESS SYSTEMS, LLC, Trinidad, CO (US)

(72) Inventor: Kevin Knowles, Trinidad, CO (US)

(73) Assignee: PRECISION PROCESS SYSTEMS, LLC, Trinidad, CO (US)

(*) Notice: Subject to any disclaimer, the term of this patent is extended or adjusted under 35 U.S.C. 154(b) by 0 days.

(21) Appl. No.: 17/475,434

(22) Filed: Sep. 15, 2021

(65) Prior Publication Data
US 2022/0000041 A1   Jan. 6, 2022

Related U.S. Application Data

(63) Continuation of application No. PCT/US2020/025845, filed on Mar. 30, 2020.
(Continued)

(51) Int. Cl.
*A01G 9/02* (2018.01)
*A01G 9/24* (2006.01)

(52) U.S. Cl.
CPC .......... *A01G 9/023* (2013.01); *A01G 9/246* (2013.01)

(58) Field of Classification Search
CPC ......... A01G 9/023; A01G 9/246; A01G 9/249
(Continued)

(56) References Cited

U.S. PATENT DOCUMENTS 3,717,953 A * 2/1973 Kuhn .................. A01G 18/62
47/1.1
3,729,832 A * 5/1973 Lund ...................... F26B 15/18
34/437
(Continued)

FOREIGN PATENT DOCUMENTS

JP     2014014285 A  *  1/2014
JP     5871025 B2    *  3/2016
(Continued)

OTHER PUBLICATIONS

International Search Report and Written Opinion of the International Searching Authority for PCT/US2020/025845, dated Jun. 30, 2020, 12 pages.

*Primary Examiner* — Lisa L Tsang
(74) *Attorney, Agent, or Firm* — Heslin Rothenberg Farley & Mesiti P.C.; Kristian E. Ziegler, Esq.

(57) ABSTRACT

Horticulture systems and methods including an air handling rack system comprising frame supply and return plenums, an input diffusion assembly physically supported by and fluidically coupled to the frame supply plenum, and a plant support tray assembly physically supported by and fluidically coupled to the frame return plenum. The input diffusion assembly is configured to direct a supply airflow flowing through the frame supply plenum downwardly from an underside thereof. The plant support tray assembly is positioned below the at least one input diffusion assembly to form an environmental cultivation chamber therebetween. The rack system is configured to direct the supply airflow through the environmental cultivation chamber from the input diffusion assembly to the plant support tray assembly past one or more plants positioned on a support side of the plant support tray assembly and into the frame return plenum as a return airflow.

32 Claims, 44 Drawing Sheets

Related U.S. Application Data

(60) Provisional application No. 62/825,451, filed on Mar. 28, 2019.

(58) Field of Classification Search
USPC .......................................................... 47/17
See application file for complete search history.

(56) References Cited

U.S. PATENT DOCUMENTS

| | | | | |
|---|---|---|---|---|
| 3,810,327 | A * | 5/1974 | Giansante | A01G 18/69 47/1.1 |
| 4,047,328 | A * | 9/1977 | Kehl | A01G 9/246 47/59 R |
| 4,163,342 | A * | 8/1979 | Fogg | A01G 31/04 47/58.1 R |
| 4,292,762 | A * | 10/1981 | Fogg | A01G 9/246 47/17 |
| 5,315,837 | A * | 5/1994 | Lego | A47F 3/0443 34/294 |
| 5,493,808 | A * | 2/1996 | Munday | A01G 9/246 47/60 |
| 6,006,471 | A | 12/1999 | Sun | |
| 7,975,429 | B2 * | 7/2011 | Okabe | A01G 7/045 47/61 |
| 8,448,379 | B2 | 5/2013 | Igarashi | |
| 8,984,806 | B2 * | 3/2015 | Uchiyama | A01G 9/24 47/17 |
| 10,694,682 | B2 * | 6/2020 | Bogner | A01G 9/249 |
| 2002/0134010 | A1 * | 9/2002 | Rohrborn, Jr. | A01G 13/04 47/29.1 |
| 2004/0194371 | A1 * | 10/2004 | Kinnis | A01G 9/246 47/17 |
| 2010/0126063 | A1 * | 5/2010 | Emoto | A01G 7/045 165/104.34 |
| 2011/0192082 | A1 * | 8/2011 | Uchiyama | A01G 31/06 47/66.6 |
| 2012/0085026 | A1 | 4/2012 | Morris | |
| 2012/0311926 | A1 * | 12/2012 | Mittelmark | F24F 3/16 47/17 |
| 2015/0319933 | A1 * | 11/2015 | Li | A01G 22/00 47/58.1 LS |
| 2016/0157447 | A1 * | 6/2016 | Hanzawa | A01G 31/06 47/60 |
| 2016/0242372 | A1 * | 8/2016 | Wong | A01G 7/045 |
| 2017/0223912 | A1 * | 8/2017 | Gagne | A01G 25/16 |
| 2017/0273256 | A1 | 9/2017 | Hutzel | |
| 2018/0014485 | A1 | 1/2018 | Whitcher et al. | |
| 2018/0125016 | A1 * | 5/2018 | Dufresne | A01G 9/1423 |
| 2018/0213735 | A1 * | 8/2018 | Vail | A01G 9/249 |
| 2018/0220595 | A1 | 8/2018 | Hancock | |
| 2019/0021249 | A1 | 1/2019 | Ivanescu et al. | |
| 2019/0037780 | A1 * | 2/2019 | Hutto | F24F 8/192 |
| 2019/0059241 | A1 | 2/2019 | Bogner et al. | |
| 2019/0059242 | A1 * | 2/2019 | Bogner | A61L 9/20 |
| 2019/0230876 | A1 * | 8/2019 | Lysaa | A01G 27/005 |
| 2019/0313588 | A1 * | 10/2019 | Zimmerman | A01G 9/246 |
| 2021/0267133 | A1 * | 9/2021 | Bélanger | A01G 7/02 |

FOREIGN PATENT DOCUMENTS

| | | | | |
|---|---|---|---|---|
| KR | | 101045302 B1 * | 6/2011 | |
| WO | WO-2012093938 A1 * | | 7/2012 | ............. F24F 7/065 |
| WO | WO-2016181699 A1 * | | 11/2016 | ........... A01G 31/042 |

* cited by examiner

PHENOTYPIC HORTICULTURE SYSTEMS AND METHODS

CROSS-REFERENCE TO RELATED APPLICATION

This patent application claims priority benefit to International PCT Patent Application No. PCT/US2020/025845, filed Mar. 30, 2020, and entitled Phenotypic Horticulture Systems and Methods, which perfected and claims priority benefit to U.S. Provisional Patent Application No. 62/825,451, filed Mar. 28, 2019, and entitled High Density Racking and Delivery Systems, Methods and Apparatus for Horticulture Growing Systems, which are hereby both incorporated herein by reference in their entireties.

FIELD OF THE DISCLOSURE

The present disclosure relates generally to systems and methods for horticulture. More specifically, the present disclosure relates to phenotypic systems and methods for cultivating plants in an environmental cultivation chamber of an air handling horticulture rack system.

BACKGROUND

Conventional indoor horticulture (i.e., indoor plant cultivation) utilizes artificial lighting systems to provide light (e.g., ultraviolet (UV) and/or infrared (IR) radiation) to plants as a means for simulating sunlight, heat and desired growing conditions. Typically, plants are distributed in a substantially horizontal arrangement, such as on a floor or elevated shelf of a rack system. In such arrangements, lighting elements are generally provided above the plants and direct or radiate light downwardly to the plants. Such systems are limited in that the number of plants that can be cultivated are limited by the area of the horizontal space and over-crowding concerns.

One problem with prior horticultural growing applications, and in particular high density horticultural growing applications, is the inability to provide satisfactory airflow patterns and air conditions around and through plants growing therein. For example, prior systems fail to provide adequate volumetric air flow (if any), provide air flow of an insufficient velocity and/or provide an unequal/uneven air flow to and through the growing plant canopy.

Apart from temperature, plant growth and plant health is influenced by the conditions of the air around/in the plant canopy. The thickness of the boundary layer of air about a plant leaf (i.e., the thin layer of calm air that surrounds a plant leaf) can impact how efficiently and/or quickly gasses and energy are exchanged between the plant leaf and the ambient air. For example, a thick boundary layer typically reduces the transfer of heat, carbon dioxide ($CO_2$), oxygen ($O_2$) and water/water vapor from the leaf to the ambient air. More specifically, without air movement around the leaves, the air around a plants surface may differ greatly from the ambient air. For example, if the air around a plant leaf is not moving, the boundary layer at the surface of the leaf can have a high moisture content, which would increase the vapor pressure around the plant leaves, thereby reducing transpiration from the leaves. Similarly, as transpiration decreases, water uptake through the plant decreases which can result in deficient nutrient uptake.

In high density indoor horticultural rack systems, the air environment experienced by a plant canopy can be influenced by the structure of the rack system, the positioning of the plant, and the density of the plant canopy, for example. In a typical horticultural rack, plants are gown in a relatively tight spacing/arrangement, and the dense leaf canopy of the plants impedes air movement therethrough.

One object of the systems and methods disclosed herein is to provide high density horticulture rack systems with adjustable air flow, air humidity and air temperature (and potentially lighting positions) that can all be adjusted during plant growth to provide desired conditions (e.g., airflow movement, dew point temperature, temperature, light intensity, etc.) within a positive pressure chamber containing the plants (and thereby through the canopy thereof). The systems and methods disclosed herein provide environmentally and directionally controlled airflow and efficient lighting to precisely (and repeatably) control the environment in which plants grow, and thereby precisely (and repeatably) control the growth and characteristics of the plants. The systems and methods provide an isolated environmental chamber that can be controlled to grow plants therein such that photosynthesis is optimized/growth rate maximized (if desired), environmental variations within the plant canopy are greatly reduced, consistent and optimal plant growth and health is provided for, and/or the suppression/expression of one or more desired physiological phenotypic characteristic can be effected. For example, the horticulture rack systems according to the present disclosure are configured to control/vary the air environment about plants in the chamber(s) thereof to potentially alter gene expression (such as, but not limited to, plant phenylpropanoid profile manipulation by selective stress induction, via DNA methylation and histone modification) within the plants, if desired.

It is known that plants have phenotypic plasticity, which is the ability of one genotype to produce more than one phenotype (i.e., observable gene expression) when exposed to different environments. Variation or control of the environment in which a plant grows can thereby induce changes in one or more phenotypic characteristic or trait thereof, such as morphological, structural, developmental, biochemical, physiological and/or phenological changes thereto. Terpene and flavonoid levels/production in plants are two examples of potential phenotype changes that may be induced by the controlling/altering the air environment that a plant is exposed to during its life/growth cycle. A phenotypic characteristic/trait of plant that is changed via environmental factors may or may not be permanent throughout a plant's growth cycle/lifespan. Further, a phenotype change may or may not be epigenetic/heritable.

Another problem with prior horticultural growing applications is variability in differing growing operations. For example, many horticultural growing applications are unable to provide uniform plant growth/products from one batch to a subsequent batch because the environmental conditions in which the plants grow is susceptible to change (i.e., is not strictly controlled) from one batch to the subsequent batch. As noted above, plant growth processes are effected by the environmental conditions that the plant experiences during its life cycle.

Another problem with prior horticultural growing applications is the formation/presence of micro-climates within the plant growing space, typically associated with inadequate airflow volume/velocity/pattern and high differential air conditions between a supply air from an air conditioning system versus desired plant conditions. These micro-climates are often very high in relative humidity, and therefore tend to promote mold and mildew growth (when spores are present) (and/or the growth of other unwanted or detrimental organisms). Improper airflow patterns exasperate this problem by spreading spores or organisms to adjacent plants as air moves around the plants.

It is object of the systems and methods provided herein to provide an improved horticulture growing system and/or method that addresses one or more of the aforementioned problems of the prior art. The systems and methods disclosed herein solve the above noted deficiencies of current horticulture applications by creating a specific/desired plant growing environment.

SUMMARY

Air handling horticulture rack systems and methods that provide precise and repeatable adjustable/selectable air environment conditions (e.g., air flow characteristics and/or patterns, air humidity, and air temperature) and lighting conditions are disclosed herein. The present disclosure provides such systems and methods for growing plants in a manner that maximizes the use of space (e.g., square footage) and help minimize energy consumption, and provides for precise and uniform/repeatable adjustable/selectable environmental growing conditions (e.g., air and lighting conditions). The systems and methods are thereby able to deliver consistent horticultural product output regardless of the physical system location, and are able to alter a plant's biological processes to obtain a desired plant biological profile.

Systems and methods of the present disclosure are configured to deliver conditioned air to one or more racks/levels containing a substantially sealed environmental cultivation/growing chamber/space, pass the air that flows past/through the plant canopy (and the chamber) to an air conditioning system that treats the air, and returns the treated air back to each environmental cultivation chamber. The present systems and methods also provide adjustable conditioned airflow through, and lighting to, a plant canopy on each rack/level thereof during growth to effectuate or induce a phenotypic change of the plants, if desired. Embodiments of the systems and methods provide for single or multi-level planting, while maintaining specific selected/specified environmental conditions for desired/optimal plant growth. The present systems and methods positively pressurize each growing chamber to ensure that contaminants are prevented from entering each chamber, and each chamber comprises a particularly selected air environment during the entire growing operation/time period, thereby allowing for precise and uniform air environments from one grow operation to a subsequent grow operation to ensure plant uniformity between the batches. The systems and methods of the present disclosure can thereby be utilized to phenotypically cultivate a plurality of plants in the controlled environmental chamber of the air handling horticulture rack system. The present systems and methods substantially eliminate environmental variation within each chamber, which reduces or eliminates the potential for mold and/or mildew growth. Some embodiments of the systems and methods provide for multi-level vertical planting within vertically arranged/spaced growing chambers, while maintaining the specific selected/specified environmental conditions in each chamber.

The systems and methods of the present disclosure are well suited for a variety of plants, and particularly plants that are desirable to grow indoors and/or in the presence of artificial lighting elements. For example, many different spermatophytes, including angiosperms (flowering plants) and gymnosperms (ovule producing plants) may be specifically/particularly and repeatedly grown in the air handling horticulture rack systems and methods of the present disclosure. It will be expressly recognized, however, that systems and methods of the present disclosure are not limited to use with a particular type of plant, flower, crop, etc. Furthermore, it will be expressly recognized that although the systems and methods of the present disclosure are well suited for increasing efficiencies of indoor growing operations, the present disclosure is not limited to such operations. Indeed, embodiments of the disclosure may be employed in a variety of settings, including indoor settings, outdoor settings, and greenhouses or similar environments that may comprise characteristics of both indoor and outdoor growing.

In one aspect, the present disclosure provides a horticulture system. The horticulture system comprises an air handling first rack system. The first rack system comprises at least one frame supply plenum extending upwardly from a bottom side of the first rack system, and at least one frame return plenum extending upwardly from the bottom side of the first rack system. The first rack system further comprises at least one input diffusion assembly physically supported by and fluidically coupled to the at least one frame supply plenum, the at least one input diffusion assembly being configured to direct a supply airflow flowing through the at least one frame supply plenum downwardly from an underside thereof. The first rack system also comprises at least one plant support tray assembly physically supported by and fluidically coupled to the at least one frame return plenum, the at least one plant support tray assembly being positioned below the at least one input diffusion assembly to form at least one environmental cultivation chamber therebetween. The first rack system is configured to direct the supply airflow through the at least one environmental cultivation chamber from the at least one input diffusion assembly to the at least one plant support tray assembly past at least one plant positioned on a support side of the at least one plant support tray assembly and into the at least one frame return plenum as a return airflow.

In some embodiments, the at least one input diffusion assembly comprises at least one input diffusion plate with a plurality of input apertures in fluid communication with the at least one frame supply plenum configured to direct the supply airflow flowing downwardly therefrom toward the at least one plant support tray assembly. In some such embodiments, the at least one diffusion plate comprises a first diffusion plate with a plurality of first input apertures and a second diffusion plate with a plurality of second input apertures at least partially overlapping the first input apertures, the first and second diffusion plates being movable coupled together such that the degree of overlap between the first and second input apertures is adjustable to adjust the velocity of the supply airflow flowing therethrough. In some such embodiments, a height of the at least one input diffusion assembly relative to that of the at least one plant support tray assembly is fixed such that a height of the at least one environmental cultivation chamber is fixed. In some other such embodiments, a height of the at least one input diffusion assembly relative to that of the at least one plant support tray assembly is adjustable such that a height of the at least one environmental cultivation chamber is adjustable.

In some embodiments, the at least one input diffusion assembly is configured such that the velocity of the supply airflow flowing through the plurality of input apertures is within the range of about 25 ft/min to about 2,500 ft/min. In some such embodiments, the system is configured such that the supply airflow flowing through the at least one environmental cultivation chamber comprises a turbulent flow at a leaf canopy of the at least one plant with an average velocity of about 25 ft/min to about 1,000 ft/min.

In some embodiments, the at least one input diffusion assembly further comprises an input passageway for a flow of the supply airflow therethrough from the at least one frame supply plenum. In some such embodiments, the at least one input diffusion assembly defines an internal cavity that is in fluid communication with the plurality of input apertures and in fluid communication with the input passageway via a plurality of through holes in the input passageway. In some such embodiments, the input passageway extends along a length of the first and second ends and the first and second faces of the first rack system, and the plurality of through holes include at least one through hole positioned along the lengths of the input passageway extending along each of the first and second ends and the first and second faces of the first rack system. In some other such embodiments, the plurality of through holes each include a filter that prevents particles larger than a predefined size from flowing to the at least one diffusion plate.

In some embodiments, the first rack system further comprises at least one lighting device positioned within the at least one environmental cultivation chamber. In some such embodiments, the at least one lighting device comprises at least one top lighting device positioned proximate to the underside of the at least one input diffusion assembly and distal to the support side of the at least one plant support tray assembly such that the at least one top lighting device is positioned above the at least one plant when it is positioned on the support side of the at least one plant support tray assembly. In some such embodiments, the at least one lighting device comprises at least one bottom lighting device positioned proximate to the support side of the at least one plant support tray assembly and distal to the underside of the at least one input diffusion assembly such that the at least one bottom lighting device is positioned below a leaf canopy of the at least one plant when it is positioned on the support side of the at least one plant support tray assembly. In some embodiments, the at least one lighting device comprises at least one bottom lighting device positioned proximate to the support side of the at least one plant support tray assembly and distal to the underside of the at least one input diffusion assembly such that the at least one bottom lighting device is positioned below a leaf canopy of the at least one plant when it is positioned on the support side of the at least one plant support tray assembly.

In some such embodiments, the at least one plant support tray assembly comprises a plant support platform that defines the support side, and the plant support platform comprises a plurality of first return apertures extending therethrough for a flow of the return airflow therethrough. In some such embodiments, the plant support platform comprises of removable slats. In some other such embodiments, the plant support platform further comprises at least one screen extending across at least one return aperture of the plurality of first return apertures, the at least one screen comprising a plurality of second return apertures extending therethrough for a flow of the return airflow therethrough that are smaller than the plurality of first return apertures. In some other such embodiments, the at least one plant support tray assembly further comprises a return passageway for a flow of the return airflow therethrough to the at least one frame return plenum. In some such embodiments, the at least one plant support tray assembly further comprises an internal cavity that is in fluid communication with the plurality of return apertures of the plant support platform and is in fluid communication with the input passageway via a plurality of through holes in the return passageway. In some such embodiments, the return passageway extends along a length of the first and second ends and the first and second faces of the first rack system, and the plurality of through holes include at least one through hole positioned along the lengths of the return passageway extending along each of the first and second ends and the first and second faces of the first rack system. In some other such embodiments, the plurality of through holes each include a filter that prevents particles larger than a predefined size from flowing to the at least one diffusion plate. In some such embodiments, the each filter comprises a high-efficiency particulate air (HEPA) filter.

In some embodiments, the at least one plant support tray assembly further comprises at least one deflector plate positioned between the plant support platform and the internal cavity, the at least one deflector plate including upper deflector surfaces that extend downwardly and into an interior portion of the internal cavity as they extend away from at least one of the first and second ends and the first and second faces of the first rack system to an opening that is in communication with the internal cavity to direct the return airflow into the interior portion of the internal cavity. In some such embodiments, the at least one plant support tray assembly further comprises a drain pan in a bottom portion of the internal cavity and below the opening of the at least one deflector plate.

In some embodiments, a height of the at least one input diffusion assembly relative to that of the at least one plant support tray assembly is fixed such that a height of the at least one environmental cultivation chamber is fixed. In some such embodiments, a height of the at least one input diffusion assembly relative to that of the at least one plant support tray assembly is adjustable such that a height of the at least one environmental cultivation chamber is adjustable. In some such embodiments, the at least one frame supply plenum comprises at least one length adjustable plenum portion positioned at least partially below the at least one input diffusion assembly and above the at least one plant support tray assembly configured to adjust a height of the at least one input diffusion assembly with respect to the at least one plant support tray and thereby a height of the at least one environmental cultivation chamber. In some such embodiments, each of the at least one length adjustable plenum portion comprises a first adjustable plenum member and a second adjustable plenum member being telescopingly arranged. In some other such embodiments, the first rack system further comprises at least one length adjustable actuator associated with each of the at least one length adjustable plenum portion configured to vary the length thereof to selectively adjust the height of the at least one input diffusion assembly with respect to the at least one plant support tray assembly and thereby the height of the at least one environmental cultivation chamber. In some such embodiments, the first rack system further comprises at least one sensor associated with each length adjustable linear actuator configured to sense the operation of the associated length adjustable linear actuator.

In some such embodiments, the at least one input diffusion assembly comprises: a first input diffusion assembly; and a second input diffusion assembly positioned below the first input diffusion assembly; and the at least one plant support tray assembly comprises: a first plant support tray assembly positioned above the second input diffusion assembly, and positioned below the first input diffusion assembly to form a first environmental cultivation chamber therebetween, wherein the first rack system is configured to direct the supply airflow through the first environmental cultivation chamber from the first input diffusion assembly to the first plant support tray assembly past at least one plant positioned on a support side of the first plant support tray assembly and into the at least one frame return plenum as a portion of the return airflow; and a second plant support tray assembly positioned below the second input diffusion assembly to form a second environmental cultivation chamber therebetween, wherein the first rack system is configured to direct the supply airflow through the second environmental cultivation chamber from the second input diffusion assembly to the second plant support tray assembly past at least one plant positioned on a support side of the second plant support tray assembly and into the at least one frame return plenum as a portion of the return airflow.

In some such embodiments, the first rack system further comprises a plurality of panels that collectively extend about a periphery of at least a portion of the first environmental cultivation chamber to substantially enclose the first environmental cultivation chamber, and collectively extend about a periphery of at least a portion of the second environmental cultivation chamber to substantially enclose the second environmental cultivation chamber.

In some other such embodiments, the first input diffusion assembly is physically supported by a first frame supply plenum of the at least one frame supply plenum and not fluidically coupled thereto, and is fluidically coupled to a second frame supply plenum of the at least one frame supply plenum and not physically supported thereby, the second frame supply plenum being a separate and distinct plenum than the first frame supply plenum, and the second input diffusion assembly is physically supported by the second frame supply plenum and not fluidically coupled thereto, and is fluidically coupled to the first frame supply plenum and not physically supported thereby. In some other such embodiments, the first plant support tray assembly is physically supported by a first frame return plenum of the at least one frame return plenum and not fluidically coupled thereto, and is fluidically coupled to a second frame return plenum of the at least one frame return plenum and not physically supported thereby, the second frame return plenum being a separate and distinct plenum than the first frame return plenum, and the second plant support tray assembly is physically supported by the second frame return plenum and not fluidically coupled thereto, and is fluidically coupled to the first frame return plenum and not physically supported thereby. In some other such embodiments, a height of the first input diffusion assembly relative to that of the second input diffusion assembly is fixed, a height of the first plant support tray assembly relative to that of the second plant support tray assembly is fixed, a height of the first input diffusion assembly relative to that of the first plant support tray is adjustable such that a height of the first environmental cultivation chamber is adjustable, and a height of the second input diffusion assembly relative to that of the second plant support tray is adjustable such that a height of the second environmental cultivation chamber is adjustable. In some such embodiments, the at least one frame supply plenum comprises a first length adjustable portion positioned at least partially below the first input diffusion assembly and above the first plant support tray configured to adjust a height of the first input diffusion assembly with respect to the first plant support tray, and a second length adjustable portion positioned at least partially below the second input diffusion assembly and above the second plant support tray configured to adjust a height of the second input diffusion assembly with respect to the second plant support tray. In some such embodiments, the first length adjustable portion comprises a first adjustable plenum member and a second adjustable plenum member being telescopingly arranged, and the second length adjustable portion comprises a third adjustable plenum member and a fourth adjustable plenum member being telescopingly arranged.

In some other such embodiments, the first rack system further comprises at least one length adjustable linear actuator associated with the first length adjustable portion configured to selectively adjust the length thereof to selectively adjust the height between the first input diffusion assembly and the first plant support tray, and selectively adjust the height between the second input diffusion assembly and the second plant support tray. In some such embodiments, the first rack system further comprises at least one sensor associated with each length adjustable linear actuator configured to sense the operation of the associated linear actuator.

In some embodiments, the at least one frame supply plenum comprises a first supply plenum portion that comprises the first length adjustable portion and is configured to direct the flow of supply airflow to the first input diffusion assembly, and a second supply plenum portion that comprises the second length adjustable portion and is configured to direct the flow of supply airflow to the second input diffusion assembly, the first and second supply plenum portions defining separate and distinct flow pathways of the supply airflow. In some such embodiments, the first rack system further comprises at least one pressure equalizing plenum portion of a fixed height physically and fluidically coupled to, and extending between, an upper portion of the first length adjustable portion and an upper portion of the second length adjustable portion of the at least one frame supply plenum. In some other such embodiments, the first supply plenum portion further comprises a first fixed height plenum leg portion that extends upwardly from the bottom side of the first rack system to the first length adjustable portion, and the second supply plenum portion further comprises a second fixed length plenum leg portion that extends upwardly from the bottom side of the first rack system to the second length adjustable portion, the first and second fixed height plenum leg portions defining separate and distinct flow pathways of the supply airflow therethrough. In some such embodiments, the first fixed height plenum leg portion includes at least one damper therein configured to control the volumetric flow rate of the supply airflow flowing therethrough, and the second fixed height plenum leg portion includes at least one damper therein configured to control the volumetric flow rate of the supply airflow flowing therethrough.

In some embodiments, a height of the first input diffusion assembly relative to that of the second input diffusion assembly is fixed, a height of the first plant support tray assembly relative to that of the second plant support tray assembly is fixed, a height of the first input diffusion assembly relative to that of the first plant support tray is fixed such that a height of the first environmental cultivation chamber is fixed, and a height of the second input diffusion assembly relative to that of the second plant support tray is fixed such that a height of the second environmental cultivation chamber is fixed.

In some embodiments, the at least one input diffusion assembly is physically supported by and fluidically coupled to at least one common frame supply plenum of the at least one frame supply plenum. In some embodiments, the at least one input diffusion assembly is physically supported by a first frame supply plenum of the at least one frame supply plenum and not fluidically coupled thereto, and is fluidically coupled to a second frame supply plenum of the at least one frame supply plenum and not physically supported thereby, the second frame supply plenum being a separate and distinct plenum than the first frame supply plenum. In some embodiments, the at least one frame supply plenum comprises a first frame supply plenum positioned proximate to a first end of the first rack system and a first face of the first rack system, and a second frame supply plenum positioned proximate to a second end of the first rack system and the first face of the first rack system. In some embodiments, the at least one plant support tray assembly is physically supported by and fluidically coupled to at least one common frame return plenum of the at least one frame return plenum. In some embodiments, the at least one plant support tray assembly is physically supported by a first frame return plenum of the at least one frame return plenum and not fluidically coupled thereto, and is fluidically coupled to a second frame return plenum of the at least one frame return plenum and not physically supported thereby, the second frame return plenum being a separate and distinct plenum than the first frame return plenum. In some embodiments, the at least one frame return plenum comprises a first frame return plenum positioned proximate to a first end of the first rack system and a second face of the first rack system, and a second support return plenum positioned proximate to a second end of the first rack system and the second face of the first rack system.

In some embodiments, the at least one frame supply plenum comprises a first frame supply plenum positioned proximate to a first end of the first rack system and a first face of the first rack system, and a second frame supply plenum positioned proximate to a second end of the first rack system and the first face of the first rack system, the at least one frame return plenum comprises a first frame return plenum positioned proximate to the first end of the first rack system and a second face of the first rack system, and a second frame return plenum positioned proximate to the second end of the first rack system and the second face of the first rack system, and the each of the at least one input diffusion assembly and the at least one plant support tray assembly extend from at least a portion of the first frame supply plenum to at least a portion of the second frame supply plenum, from at least a portion of the second frame supply plenum to at least a portion of the second frame return plenum, from at least a portion of the second return frame supply plenum to at least a portion of the first frame return plenum, and from at least a portion of the first frame return plenum to at least a portion of the first frame supply plenum.

In some embodiments, the at least one frame supply plenum is formed of at least one rigid duct. In some such embodiments, the at least one frame supply plenum is formed of a plurality of rigid ducts physically and fluidically coupled together. In some embodiments, the at least one frame return plenum is formed of at least one rigid duct. In some such embodiments, the at least one frame supply plenum is formed of a plurality of rigid ducts physically and fluidically coupled together.

In some embodiments, the system further comprises an air conditioning system fluidically coupled to the at least one frame supply plenum via at least one supply base plenum and fluidically coupled to the at least one frame return plenum via at least one return base plenum, the air conditioning system configured to force the supply airflow through the at least one supply base plenum and to the at least one frame supply plenum under positive pressure, and draw the return airflow through the at least one return base plenum from the at least one frame return plenum under negative pressure. In some such embodiments, the least one supply base plenum and the at least one return base plenum extend beneath the first rack system and the air conditioning system. In some such embodiments, the least one supply base plenum and the at least one return base plenum extend between a ground surface and the first rack system and the air conditioning system. In some other such embodiments, the least one supply base plenum is physically and fluidically coupled to a bottom end of the least one frame supply plenum at the bottom side of the first rack system, and the least one return base plenum is physically and fluidically coupled to a bottom end of the least one frame return plenum at the bottom side of the first rack system. In some such embodiments, the least one supply base plenum and the at least one return base plenum physically support the first rack system and the air conditioning system.

In some embodiments, the air conditioning system comprises an air conditioning passageway with a fan fluidically coupled to at least one frame supply plenum via the at least one supply base plenum and fluidically coupled to the at least one frame return plenum via at least one return base plenum, the fan configured to generate the supply airflow and force the supply airflow through a portion of the air conditioning passageway, the at least one supply base plenum and the at least one frame supply plenum under positive pressure, and draw the return airflow through the at least one frame return plenum, the at least one return base plenum and a portion of the air conditioning passageway under negative pressure. In some such embodiments, at least one of the at least one frame return plenum, the at least one return base plenum and the conditioning passageway upstream of the fan includes at least one air inlet aperture comprising a filter that is in direct fluid communication with the environment extending about the system. In some other such embodiments, the positive and negative pressures applied by the fan are effective in forcing at least 75% of the volume of the supply airflow flowing into the at least one environmental cultivation chamber to flow into the at least one plant support tray assembly. In some such embodiments, the first rack system, the at least one return base plenum, the air conditioning system and the at least one supply base plenum form a substantially closed airflow loop comprising the supply airflow and the return airflow such that at least 75% of the volumetric airflow of the supply airflow in the air conditioning passageway of the air conditioning unit returns to the air conditioning passageway as the return airflow. In some such embodiments, the air conditioning system is configured to maintain the at least one environmental cultivation chamber under positive pressure.

In some embodiments, the fan comprises a variable speed fan, and the system is configured to vary the rotational speed of the fan to maintain a selected constant volumetric flow rate of the supply airflow flowing through the at least one environmental cultivation chamber. In some such embodiments, the air conditioning system is configured such that the selected constant volumetric flow rate is within the range of about 300 ft$^3$/min to about 1,000 ft$^3$/min. In some such embodiments, the system is configured to vary the rotational speed of the fan such that the volumetric flow rate of the supply airflow flowing through the air conditioning passageway is within the range of about 300 ft$^3$/min and about 5,000 ft$^3$/min.

In some embodiments, the air conditioning system comprises at least one cooling coil within the air conditioning passageway such that the airflow flowing therethrough flows over the at least one cooling coil, and the air conditioning system is configured to control the temperature of the at least one cooling coil such that the supply airflow flowing through the at least one environmental cultivation chamber is maintained at a selected absolute humidity level at a location in the at least one environmental cultivation chamber. In some such embodiments, the air conditioning system comprises at least one heating coil within the air conditioning passageway downstream of the at least one cooling coil such that the airflow flowing therethrough flows over the at least one heating coil, and the air conditioning system is configured to control the temperature of the at least one heating coil such that the supply airflow flowing through the at least one environmental cultivation chamber is maintained at a selected temperature at a location in the at least one environmental cultivation chamber. In some such embodiments, the air conditioning system further comprises a humidifier that is configured to control the absolute humidity of the supply airflow flowing through the at least one environmental cultivation chamber is maintained at a selected absolute humidity at a location in the at least one environmental cultivation chamber. In some embodiments, the air conditioning system further comprises at least one of: a carbon dioxide source, the air conditioning system being configured to selectively introduce carbon dioxide from the carbon dioxide source into the at least one environmental cultivation chamber; and an oxygen source, the air conditioning system being configured to selectively introduce oxygen from the oxygen source into the at least one environmental cultivation chamber.

In some embodiments, the system further comprises an air handling second rack system fluidically coupled to the air conditioning system via the at least one supply base plenum and the at least one return base plenum. In some such embodiments, the second rack system comprises: at least one second frame supply plenum extending upwardly from a bottom side of the second rack system; at least one second frame return plenum extending upwardly from the bottom side of the second rack system; at least one second input diffusion assembly physically supported by and fluidically coupled to the at least one second frame supply plenum, the at least one second diffusion assembly being configured to direct a supply airflow flowing through the at least one second frame supply plenum downwardly from an underside thereof; and at least one second plant support tray assembly physically supported by and fluidically coupled to the at least one second frame return plenum, the at least one second plant support tray assembly being positioned below the at least one input diffusion assembly to form at least one second environmental cultivation chamber therebetween, the second rack system being configured to direct the supply airflow through the at least one second environmental cultivation chamber from the at least one second input diffusion assembly to the at least one second plant support tray assembly past at least one plant positioned on a support side of the at least one second plant support tray assembly and into the at least one second frame return plenum as a second portion of the return airflow.

In some such embodiments, the an air conditioning system is fluidically coupled to the at least one second frame supply plenum via the at least one supply base plenum and fluidically coupled to the at least one second frame return plenum via the at least one return base plenum, the air conditioning system configured to force the supply airflow through the at least one supply base plenum and to the at least one second frame supply plenum under positive pressure, and draw the return airflow through the at least one return base plenum from the at least one second frame return plenum under negative pressure.

In some embodiments, the first rack system further comprises a plurality of panels that collectively extend about a periphery of at least a portion of the at least one second environmental cultivation chamber to substantially enclose the at least one environmental cultivation chamber. In some such embodiments, the plurality of panels are configured to prevent the supply airflow flowing into the at least one environmental cultivation chamber from the at least one input diffusion assembly from flowing therethrough. In some other such embodiments, the plurality of panels extend about a periphery of the at least one input diffusion assembly, the at least one plant support tray assembly and the at least one environmental cultivation chamber to substantially enclose the at least one environmental cultivation chamber. In some other such embodiments, the plurality of panels comprise a plurality of sealing panels coupled to the first rack system. In some such embodiments, the plurality of sealing panels each comprise an inner surface that faces the at least one environmental cultivation chamber and is configured to reflect at least about 75% of light emitted from the at least one lighting device. In some other such embodiments, the plurality of panels are light-proof. In some other such embodiments, the plurality of sealing panels are configured to prevent the supply airflow flowing into the at least one environmental cultivation chamber from the at least one input diffusion assembly from flowing therethrough.

In another aspect, the present disclosure provides a method of cultivating a plant, comprising positioning at least one on the support side of the at least one plant support tray assembly of the first rack system of a horticulture system described above.

In some embodiments, the method further comprises forming the supply airflow and the return airflow via an air conditioning system. In some such embodiments, forming the supply airflow and the return airflow via the air conditioning system comprises applying a positive pressure to the at least one second frame supply plenum and a negative pressure to the at least one second frame return plenum via the air conditioning system, and maintaining the at least one environmental cultivation chamber at a positive pressure via the air conditioning system.

In some embodiments, the method further comprises maintaining an absolute humidity level of the supply airflow flowing through the at least one environmental cultivation chamber at a selected absolute humidity level at a location in the at least one environmental cultivation chamber via the air conditioning system. In some such embodiments, the method further comprises maintaining a temperature of the supply airflow flowing through the at least one environmental cultivation chamber at a selected temperature at a location in the at least one environmental cultivation chamber via the air conditioning system.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits and advantages described herein.

These and other objects, features and advantages of this disclosure will become apparent from the following detailed description of the various aspects of the disclosure taken in conjunction with the accompanying drawings.

BRIEF DESCRIPTION OF THE DRAWINGS

These and other features, aspects, and advantages of the present disclosure will become better understood when the following detailed description is read with reference to the accompanying drawings. It should be understood that at least some of the drawings are not necessarily to scale (but at least some of the drawings may be drawn to scale). In certain figures, details that are not necessary for an understanding of the disclosure or that render other details difficult to perceive may have been omitted. It should be understood, of course, that the disclosure is not necessarily limited to the particular embodiments illustrated in the figures. Like reference numerals are utilized throughout the figures to represent like aspects illustrated in the drawings, wherein.

DETAILED DESCRIPTION OF THE DRAWINGS

Figure 1:
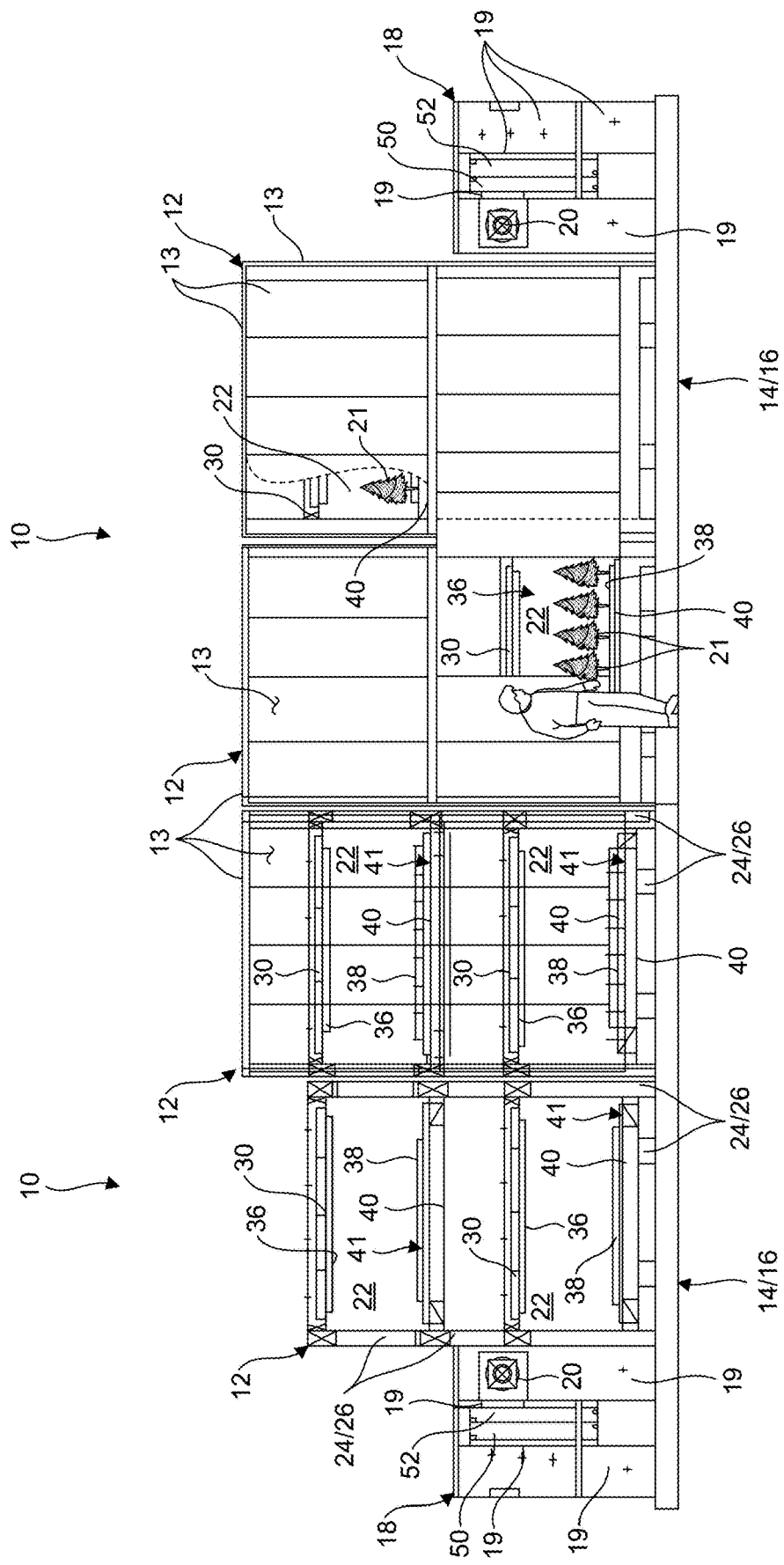
FIG. 1 illustrates a front view of a pair of horticulture systems according to one embodiment of the present disclosure.

Aspects of the present disclosure and certain examples, features, advantages, and details thereof, are explained more fully below with reference to the non-limiting examples illustrated in the accompanying drawings. Descriptions of well-known components, aspects, materials, fabrication mechanisms, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout disclosure, may be applied to modify any quantitative representation that could permissibly vary without resulting in a change in the basic function to which it is related. Accordingly, a value modified by a term or terms, such as "terms "substantially", "approximately", "about", "relatively," or other such similar terms is not limited to the precise value specified, and is used to describe and account for small fluctuations, such as due to variations in processing, from a reference or parameter. Such small fluctuations include a zero fluctuation from the reference or parameter as well. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one example" are not intended to be interpreted as excluding the existence of additional examples that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any examples that "comprises," "has," "includes" or "contains" one or more step or element possesses such one or more step or element, but is not limited to possessing only such one or more step or element. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As used herein and unless otherwise indicated, the term "entirety" (and any other form of "entire") means at least a substantial portion, such as at least 95% or at least 99%. The term "entirety" (and any other form of "entire"), as used herein, is thereby not limited to 100%, unless otherwise indicated.

The terms "connect," "connected," "contact," "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to," "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in fluid contact with one another. Moreover, two components that are fluidly/fluidically connected, fluidly/fluidically coupled or in fluid/fluidic communication may or may not be in direct physical contact, and one or more other components may be positioned therebetween.

The air handling horticulture rack systems and methods of the present disclosure provide precise and repeatable adjustable/selectable air environment conditions (e.g., air flow characteristics and/or patterns, air humidity, and air temperature) and lighting conditions. The systems and methods maximize the use of space (e.g., square footage) and help minimize energy consumption, and provides for precise and uniform/repeatable adjustable/selectable environmental growing conditions (e.g., air and lighting conditions). The systems and methods deliver consistent horticultural product output regardless of the physical system location, and are able to alter a plant's biological processes to obtain a desired plant biological profile.

The systems and methods deliver conditioned air to one or more racks/levels containing a substantially sealed growing environmental growing chamber/space, ensure a substantial majority of supply air flows past/through the plant canopy, pass air that flows past/through the plant canopy to an air conditioning system that treats the air, and return the treated air back to the growing chamber/pod. The systems and methods also provide adjustable conditioned airflow through, and lighting to, a plant canopy on each rack/level thereof during growth, such as to effectuate or induce a phenotypic change of the plants if desired. The systems and methods may be configured as single or multi-level growing arrangements, which may be fixed or adjustable, while maintaining specific selected/specified environmental conditions for desired/optimal plant growth. The systems and methods positively pressurize each growing chamber to ensure that contaminants are prevented from entering each chamber, and each chamber comprises a particularly selected air environment during the entire growing operation/time period, thereby allowing for precise and uniform air environments from one grow operation to a subsequent grow operation to ensure plant uniformity between the batches. The systems and methods can thereby be utilized to phenotypically cultivate one or more plants in the controlled environmental chamber of the system. The systems and methods substantially eliminate environmental variation within each chamber, which reduces or eliminates the potential for mold and/or mildew growth. Some embodiments of the systems and methods provide multi-level vertical planting within vertically arranged/spaced growing chambers, while maintaining the specific selected/specified environmental conditions in each vertically arranged/spaced chamber.

The systems and methods are well suited for a variety of plants, and particularly plants that are desirable to grow indoors and/or in the presence of artificial lighting elements. For example, many different spermatophytes, including angiosperms/flowering plants and gymnosperms/ovule producing plants may be particularly and repeatedly grown utilizing the systems and methods. The systems and methods thereby comprise good manufacturing practice (GMP) systems and methods that ensure the horticultural products produced thereby are consistently produced and controlled according to quality standards.

The systems and methods include pressurization of the environmental cultivation chambers to assist in controlling the environment experienced by the plants grown therein, and air filtration (of supply and/or return airflows) that removes/prevents unwanted material (e.g., particulates and/or gases) from the growing air environment in the environmental cultivation chambers (which may be produced/introduced by the plants/growing media in the environmental cultivation chambers, for example). The systems and methods isolate each growing chamber/plant from the air conditioning and/or mechanical systems thereof, and the conditioning and/or mechanical systems from each growing chamber/plant. The isolation of each growing chamber/plant negates the need for pesticides, fungicides and/or herbicides, for example, contamination thereof is controlled/eliminated. The precise environmental control and uniformity of the systems throughout the production/growing chambers and throughout a growth cycle provide for substantially uniform horticultural products from one batch to another (which may limit testing requirements).

The systems and method provide a substantially/aggregate unidirectional airflow through each growing chamber allowing hyperbolic (inversely proportional) velocity increase as plant mass increases. This effect increases transpiration of the plants through increasingly turbulent flow, which can cause a substantial increase in plant growth rate. Such increased/high levels of transpiration allow for underlighting to be utilized efficiently to increase crop density, for example. The controlled growing environment (air and lightning environment) of each growing chamber of, and the manipulation thereof by, the systems and methods can effect expression of desired physiological phenotypic traits of the plants grown therein (which may be passed down through subsequent generations). For example, DNA methylation and histone modification are two such instances of how gene expression can be altered through environmental variation. Increased terpene and flavonoid production are examples of potential induced phenotypic responses to plants grown via the systems and methods via environmental stress at certain stages of life cycle development thereof through modification/configuration of the air (and potentially lighting) environment within a growing chamber. The systems and methods can be utilized to increase diversity of horticultural product mix, and potentially horticultural product.

The growing/cultivation chambers of the systems and methods provide environmental and containment isolation to allow plants to grow therein in an optimal or desired environment, and allows personnel to operate outside the growing/cultivation chambers. The systems and methods can utilize high mass flow/air change rates within the growing/cultivation chambers to minimize temperature and moisture differentials throughout the plant canopy, and/or remove air boundary layers on the plant canopy, to create maximum transpiration throughout the plant canopy and minimize risk of microclimates.

The systems and methods create and maintain a positive pressure within the growing/cultivation chambers to enable full air environment control (and prevent contaminant) thereof. Closable and openable entrances/exits are provided for ingress and egress. The systems and methods allow the growing/cultivation chambers thereof to operate independent of the surrounding environment, thereby allowing multiple systems and methods with growing/cultivation chambers including differing environmental conditions to be operated within the same room/physical are (without contaminating or otherwise effecting each other).

The systems and methods can be configured as single tier/level/height/rack arrangements, or multi-tier/level/height/rack arrangements, of the growing/cultivation chambers. Further, the heights of the growing/cultivation chambers of the systems and methods can be configured with fixed-height growing/cultivation chambers, or height-adjustable growing/cultivation chambers. Systems and methods with fixed height growing/cultivation chambers provide for flow velocity, volumetric flow and/or flow profile (e.g., laminar/turbulent) adjustment to selectively adjust the airflow within each growing/cultivation chamber that interacts with the plant canopy. Systems and methods with adjustable/variable height growing/cultivation chambers provide for growing/cultivation chamber height adjustment to selectively adjust the airflow within each growing/cultivation chamber that interacts with the plant canopy. Systems and methods with adjustable/variable height growing/cultivation chambers provide for growing/cultivation chamber height adjustment to selectively adjust the airflow (and potentially the lighting conditions) within each growing/cultivation chamber that interacts with the plant canopy.

The systems and methods utilize plenums as frame members of the rack system that both physically support the components of the system and provide for flowpaths/ductwork for the flow/passage of airflow therethrough and to and from each growing/cultivation chamber. The systems and methods thereby eliminate the need for external/additional ductwork, and can utilize flexible water lines and electric lines. The systems and methods may utilize a rolling/movable carriage mounting to provide for translation/transportation thereof.

Figure 2:
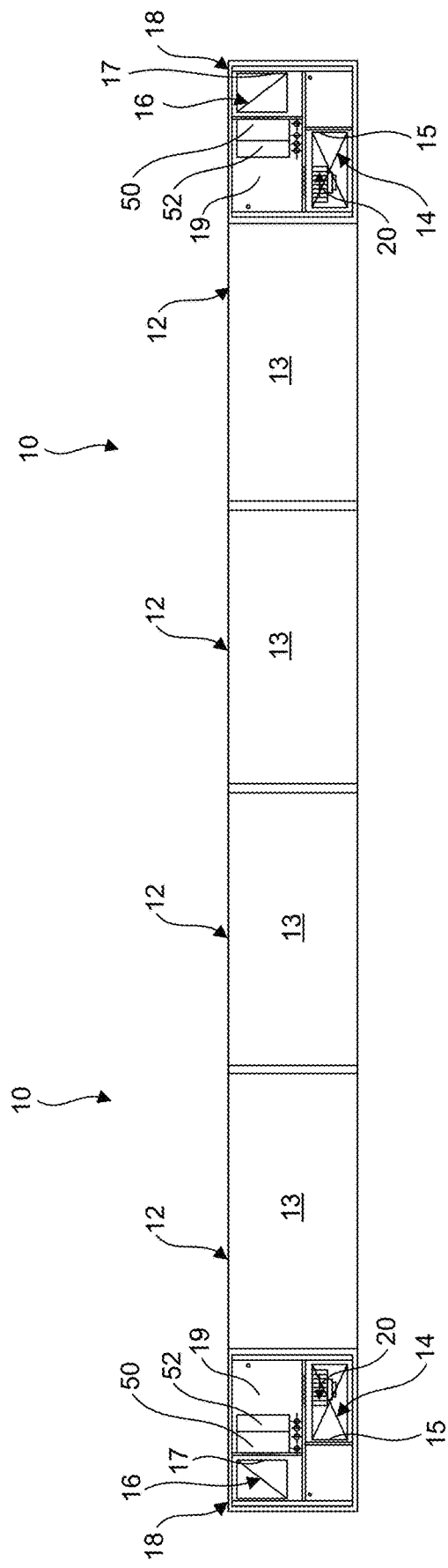
FIG. 2 illustrates a top view of the horticulture systems of FIG. 1 according to one embodiment of the present disclosure.
Figure 3:
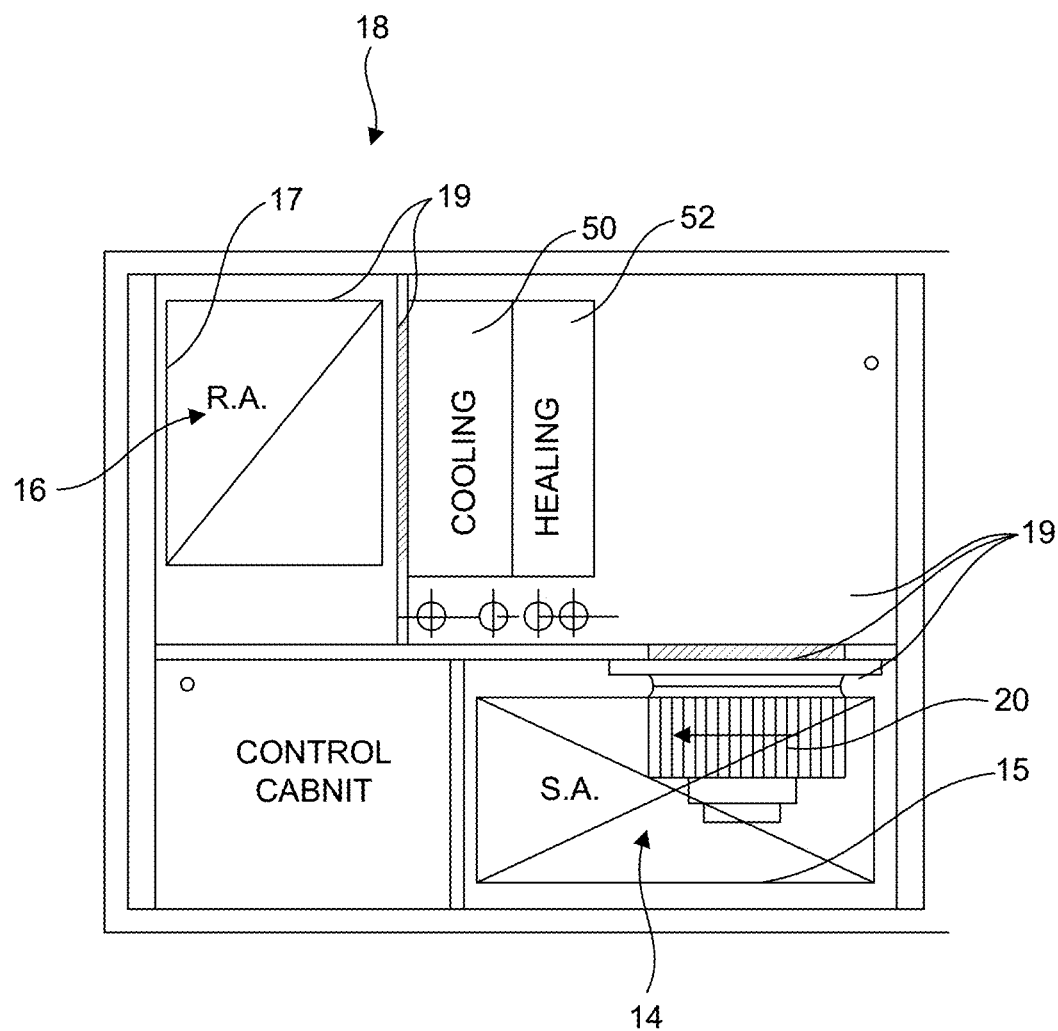
FIG. 3 illustrates a top view of an air handling unit portion of a horticulture systems of FIG. 1 according to one embodiment of the present disclosure.
Figure 4:
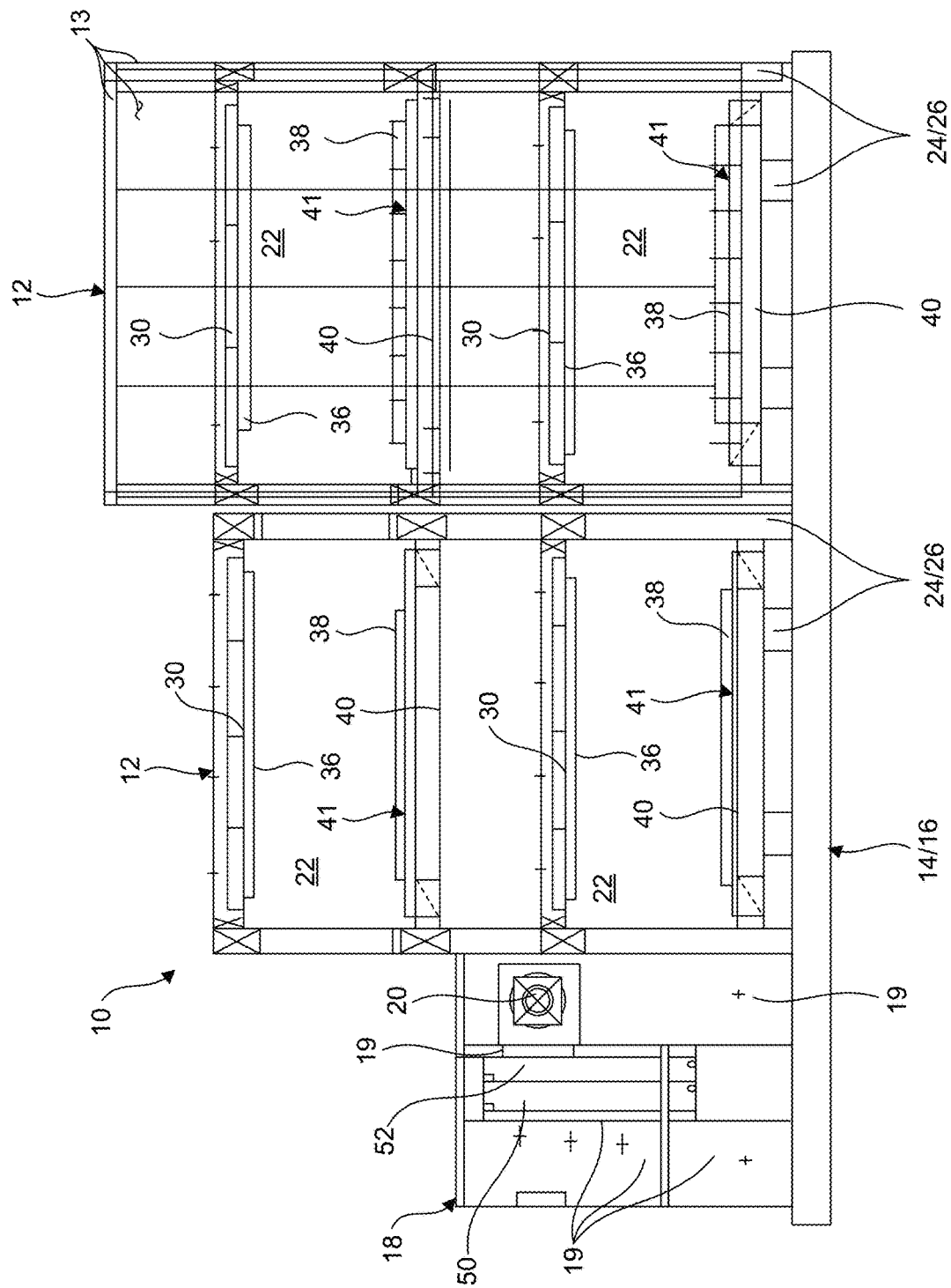
FIG. 4 illustrates a front view of a first horticulture system of the pair of horticulture systems of FIG. 1 according to one embodiment of the present disclosure.

Exemplary embodiments of horticulture systems that may be utilized by the systems and methods according to the present disclosure are shown in FIGS. 1 and 2 and generally indicated herein by reference numeral 10. As shown in FIGS. 1 and 2, a plurality of the horticulture systems 10 may be combined or arranged together (which may form a system) at a particular site (e.g., in a building or room, or outdoors). For example, a plurality of horticulture systems 10 may be aligned end-to-end to form a row, as shown in FIGS. 1 and 2. When a plurality of horticulture systems 10 are utilized, the horticulture systems 10 are configured such that they can operate independently (i.e., can be configured differently, as discussed below), and the growing conditions provided by one system 10 will not effect, alter or contaminate the growing conditions provided by another system 10. However, it is noted that a single horticulture system 10 may be utilized independently.

As shown in FIGS. 1-35, a horticultural system 10 may include at least one air handling rack system 12, an air handling unit 18 of an air handling system, and a base plenum/duct portion/unit that includes at least one supply base plenum (or duct/passageway) 14 and at least one return base plenum (or duct/passageway) 16 fluidically coupling the at least one air handling rack system 12 and the air handling unit 18. In some embodiments, the horticultural system 10 may include only one air handling rack system 12. In some other embodiments, as shown in FIGS. 1, 2, 4 and 9-12, the horticultural system 10 may include a plurality of rack systems 12, such as a pair of rack systems 12. It is noted that although the illustrated exemplary horticultural system 10 of FIGS. 1, 2, 4 and 9-12 includes a pair of rack systems 12 positioned adjacent to each other at a lateral end of the horticultural system 10 (and the supply base plenum 14 and the return base plenum 16) and the air handling unit 18 positioned at an opposing lateral end of the horticultural system 10 (and the supply base plenum 14 and the return base plenum 16), the air handling unit 18 may equally be positioned laterally between the pair of rack systems 12. Further, the horticultural system 10 may include more than two rack systems 12 and/or more than one air handling unit 18.

The supply base plenum 14 defines or includes at least one internal, substantially airtight, airflow passageway (or cavity/pathway) that is configured to house and direct a flow of supply air (i.e., a supply airflow), and the return base plenum 16 defines or includes at least one internal, substantially airtight, airflow passageway (or cavity/pathway) that is configured to house and direct a flow of return air (i.e., a return airflow), as shown in FIGS. 22-24, 34 and 35. The supply base plenum 14 may operate at a positive pressure, and the return base plenum 16 may operate at lower or negative pressure, as discussed further below. For example, the air conditioning unit 18 of the air condition system may be configured to force the supply airflow through the supply base plenum 14 under positive pressure, and draw the return airflow through the return base plenum 16 under negative pressure.

The supply base plenum 14 and the return base plenum 16 may be separate and distinct plenums that define internal airflow passageways, or may comprise two distinct internal airflow passageways formed by a common duct or like member(s). As shown in FIGS. 9-12, 34 and 35, in some embodiments the supply base plenum 14 and the return base plenum 16 may comprise separate and distinct plenums/ducts that are positioned adjacent to each other and/or extend parallel to each other.

As shown in FIGS. 1, 2, 4 and 9-12, in some embodiments the supply base plenum 14 and the return base plenum 16 may extend beneath the at least one air handling rack system 12 and/or the air conditioning unit 18 of the horticulture system 10. For example, the supply base plenum 14 and the return base plenum 16 may directly underly the at least one air handling rack system 12 and the air conditioning unit 18 of the horticulture system 10. The supply base plenum 14 and the one return base plenum 16 may extend between a ground surface and the at least one air handling rack system 12 and/or the air conditioning unit 18 of the horticulture system 10. In embodiments wherein the supply base plenum 14 and the return base plenum 16 extend below the at least one air handling rack system 12 and/or the air conditioning unit 18 of the horticulture system 10, the supply base plenum 14 and the return base plenum 16 may physically support the at least one air handling rack system 12 and/or the air conditioning unit 18. For example, the supply base plenum 14 and the return base plenum 16 may carry or physically support the weight of the at least one air handling rack system 12 and/or the air conditioning unit 18, and transfer such to a ground surface (directly or indirectly). In some such embodiments, the supply base plenum 14 and the return base plenum 16 may include, be coupled to and/or engage wheels, rollers, skids or other translation mechanisms that provide, or assist in, translation of the horticulture system 10 over a ground surface.

The supply base plenum 14 and the return base plenum 16 may thereby be relatively rigid and substantially strong. In some embodiments, the supply base plenum 14 and the return base plenum 16 are formed of at least one rigid duct.

In some such embodiments, the supply base plenum 14 and/or the return base plenum 16 are formed of a plurality of rigid ducts physically and fluidically coupled together. In some embodiments, the supply base plenum 14 and/or the return base plenum 16 is formed of a metal, such as but not limited to via an extruding and/or forming process/processes. The supply base plenum 14 and the return base plenum 16 may define any size and cross-sectional shape such that the internal passageways thereof are able to carry a sufficient volumetric flow, velocity and pressure of the supply and return airflows, respectively.

The supply base plenum 14 and the return base plenum 16 may be fluidically, and physically, coupled to the at least one air handling rack system 12 and the air conditioning unit 18 of the horticulture system 10 such that the at least one air handling rack system 12 and the air conditioning unit 18 are in fluid communication/fluidically coupled thereby. Specifically, the supply base plenum 14 may be fluidically (and potentially physically) coupled to a supply side of an air conditioning passageway 19 of the air conditioning unit 18 and fluidically (and potentially physically) coupled to at least one frame supply plenum 24 of the at least one air handling rack system 12 to direct/carry the supply airflow generated (at least in part) by the air conditioning unit 18 to the to at least one frame supply plenum 24 of the at least one air handling rack system 12, as shown in FIGS. 3, 10, 12, 22-23, 34 and 35. Similarly, as also shown in FIGS. 3, 10, 12, 22-23, 34 and 35, the return base plenum 16 may be fluidically (and potentially physically) coupled to a return side of the air conditioning passageway 19 of the air conditioning unit 18 and fluidically (and potentially physically) coupled to at least one frame return plenum 26 of the at least one air handling rack system 12 to direct/carry the return airflow formed in the air handling rack system 12 (generated (at least in part) by the air conditioning unit 18) to the return side of the air conditioning passageway 19 of the air conditioning unit 18. In some embodiments, as shown in FIGS. 3, 22-24, 34 and 35, the supply base plenum 14 is fluidically (and potentially physically) coupled to a bottom end of the least one frame supply plenum 24 at the bottom side of each rack system 12 of the horticulture system 10 via at least one aperture or through hole 23 in an upper side/surface portion of the supply base plenum 14, and fluidically (and potentially physically) coupled to a bottom end of the air conditioning passageway 19 of the air conditioning unit 18 of the horticulture system 10 via at least one aperture or through hole 15 in another upper side/surface portion of the supply base plenum 14. In some embodiments, as shown in FIGS. 3, 22-24, 34 and 35, the return base plenum 16 is fluidically (and potentially physically) coupled to a bottom end of the least one frame return plenum 26 at the bottom side of each rack system 12 of the horticulture system 10 via at least one aperture or through hole 25 in an upper side/surface portion of the return base plenum 16, and fluidically (and potentially physically) coupled to a bottom end of the air conditioning passageway 19 of the air conditioning unit 18 of the horticulture system 10 via at least one aperture or through hole 17 in another upper side/surface portion of the return base plenum 16.

As shown in FIGS. 1 and 4-33, each air handling rack system 12 of the of the horticulture system 10 may include the at least one frame supply plenum (or duct) 14 extending upwardly from the bottom side of the rack system 12, the at least one frame return plenum (or duct) 16 extending upwardly from the bottom side of the rack system 12, at least one input diffusion assembly physically 30 physically and fluidically coupled to the at least one frame supply plenum 14, and at least one plant support tray assembly physically 40 and fluidically coupled to the at least one return supply plenum 16 below the at least one input diffusion assembly 30 to form at least one environmental cultivation chamber therebetween 22. The at least one input diffusion assembly 30 is physically supported by and fluidically coupled with the at least one frame supply plenum 24. As discussed further below, the at least one input diffusion assembly 30 is configured to direct a supply airflow flowing through the at least one frame supply plenum 24 downwardly from an underside thereof. The at least one plant support tray assembly 40 is physically supported by and fluidically coupled to the at least one frame return plenum 14. As discussed further below, the at least one plant support tray assembly 40 is configured to direct the supply airflow flowing through the at least one environmental cultivation chamber (from the at least one input diffusion assembly 30) and past at least one plant 21 positioned on a support side 41 of the at least one plant support tray assembly 40 into the at least one frame return plenum 26 as the return airflow.

The at least one frame supply plenum 24 and the at least one frame return plenum 26 are thereby structural members (or assemblies or portions) of the rack system 12 that physically form a frame of the rack system 12 that physically supports (at least in part) the at least one input diffusion assembly 30, the at least one plant support tray assembly physically 40, the plant(s) 21 on the at least one plant support tray assembly 40, and other components of the rack system 12. The at least one frame supply plenum 24 and the at least one frame return plenum 26 extend upwardly from bottom ends thereof (which may define the bottom end of the rack system 12) to space the at least one input diffusion assembly 30 and the at least one plant support tray assembly physically 40 along a height (or vertical) direction (to form the at least one cultivation chamber 22 therebetween). The at least one frame supply plenum 24 and the at least one frame return plenum 26 may thereby be relatively rigid and substantially strong. In some embodiments, the at least one frame supply plenum 24 and/or the at least one frame return plenum 26 are formed of at least one rigid duct. In some embodiments, the at least one frame supply plenum 24 and/or the at least one frame return plenum 26 are formed of a plurality of rigid ducts physically and fluidically coupled together. In some embodiments, at least one frame supply plenum 24 and/or the at least one frame return plenum 26 is formed of a metal, such as but not limited to via an extruding and/or forming process/processes.

Figure 22:
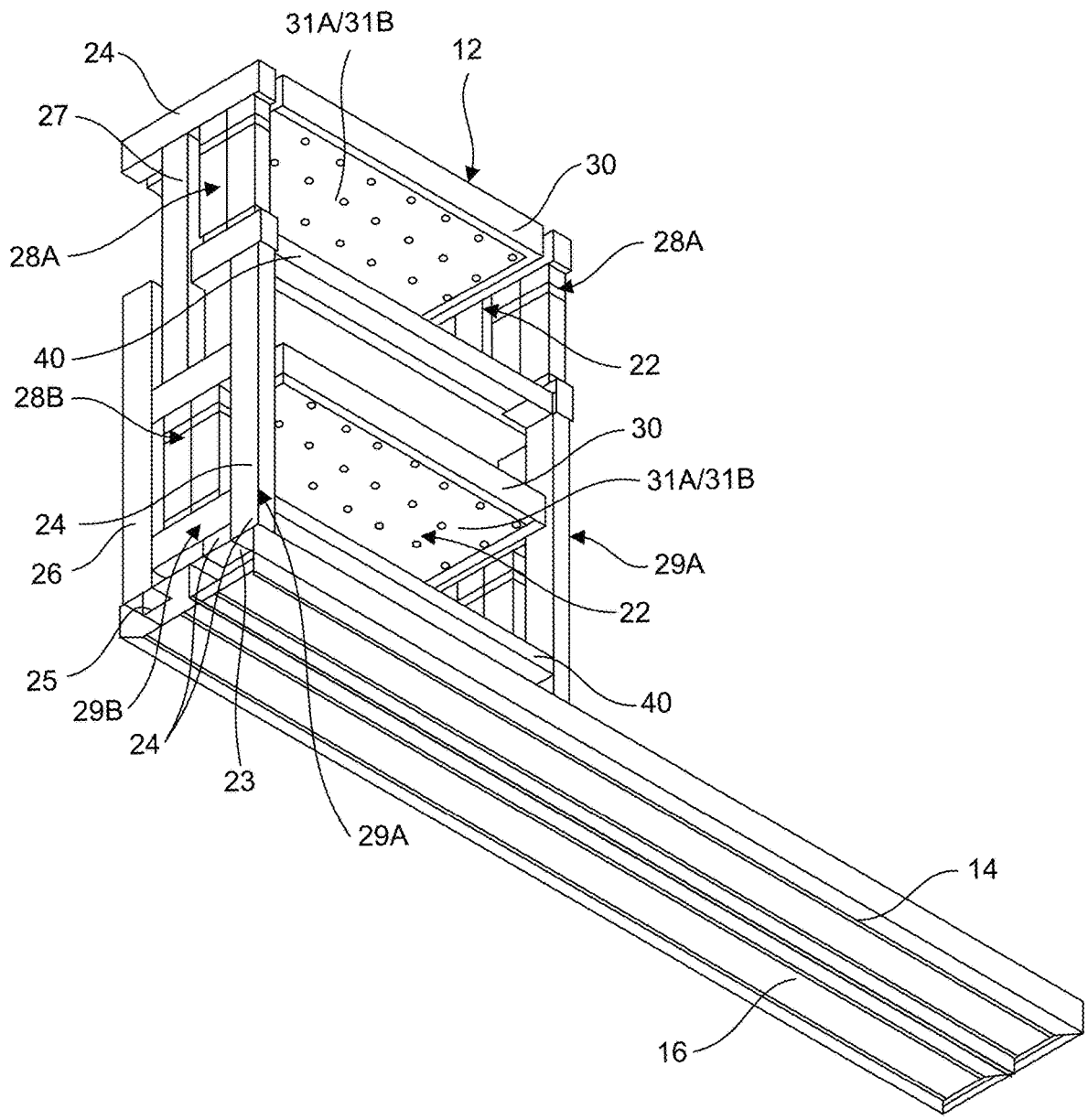
FIG. 22 illustrates another bottom back perspective view of the air handling rack system and the base plenum portion of FIG. 13 with an end portion of supply and return base plenums removed according to one embodiment of the present disclosure.
Figure 23:
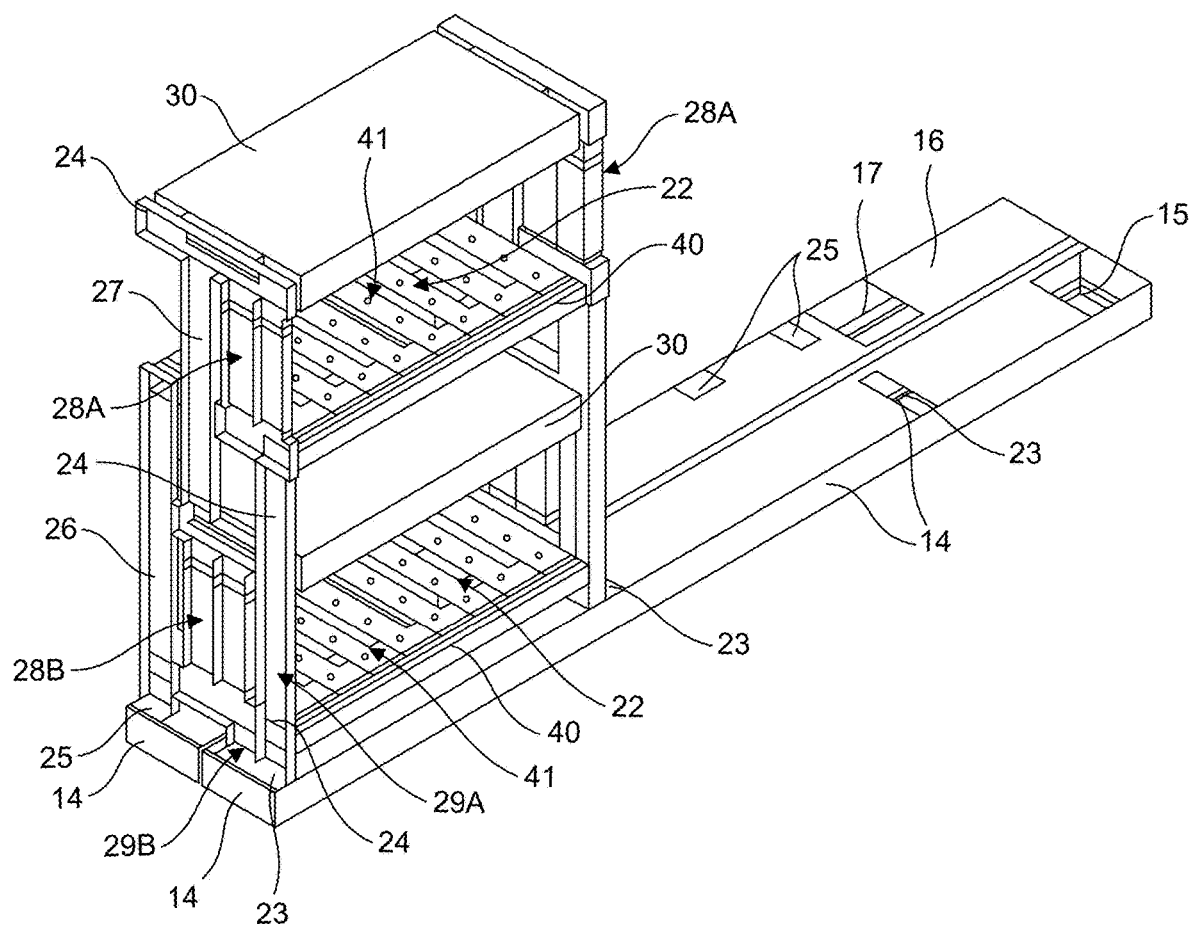
FIG. 23 illustrates an elevational back cross-sectional perspective view of the air handling rack system and the base plenum portion of FIG. 13 according to one embodiment of the present disclosure.
Figure 24:
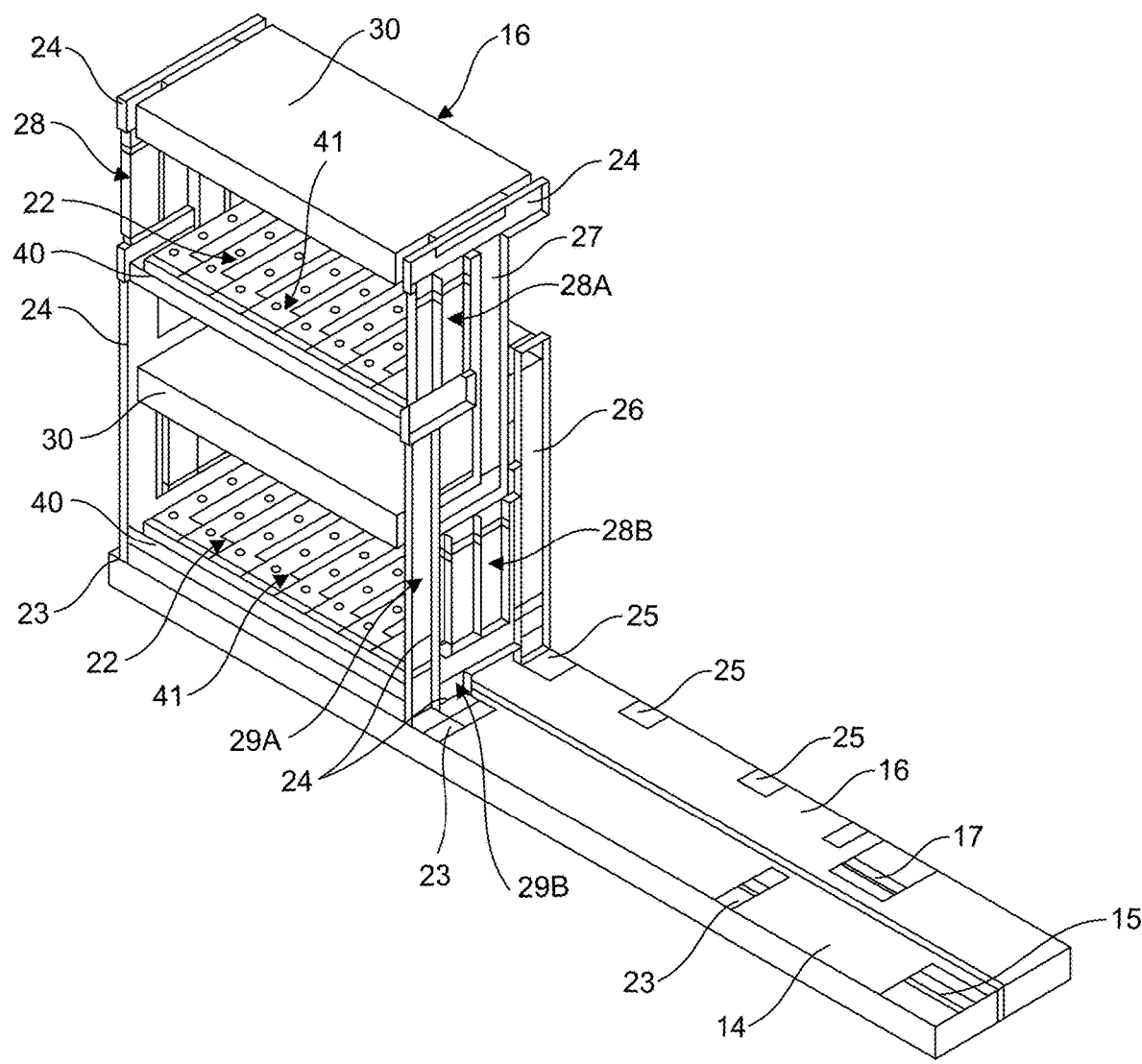
FIG. 24 illustrates another elevational back cross-sectional perspective view of the air handling rack system and the base plenum portion of FIG. 13 according to one embodiment of the present disclosure.
Figure 25:
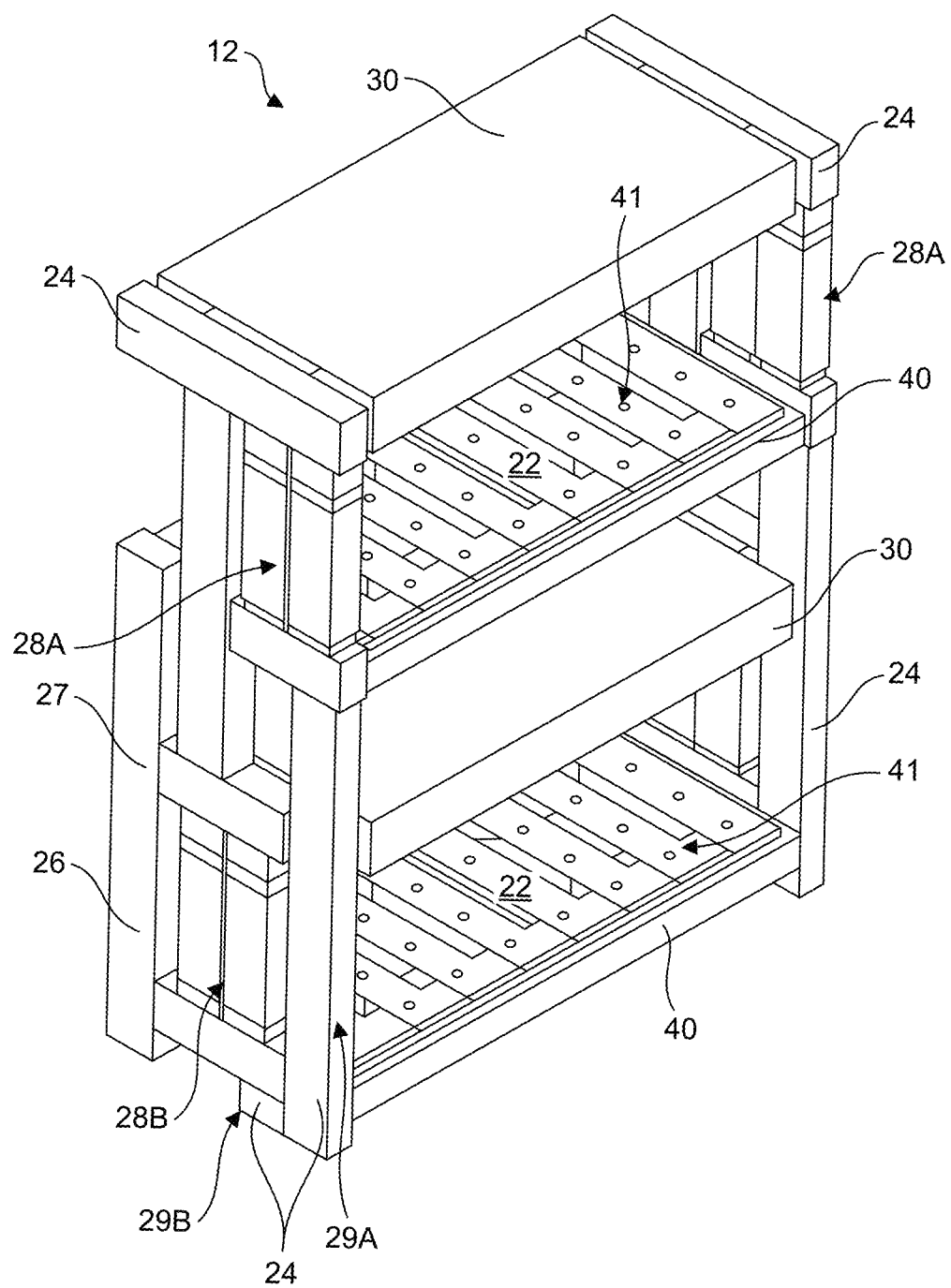
FIG. 25 illustrates an elevational front perspective view of the first rack system of FIG. 5 according to one embodiment of the present disclosure.
Figure 26:
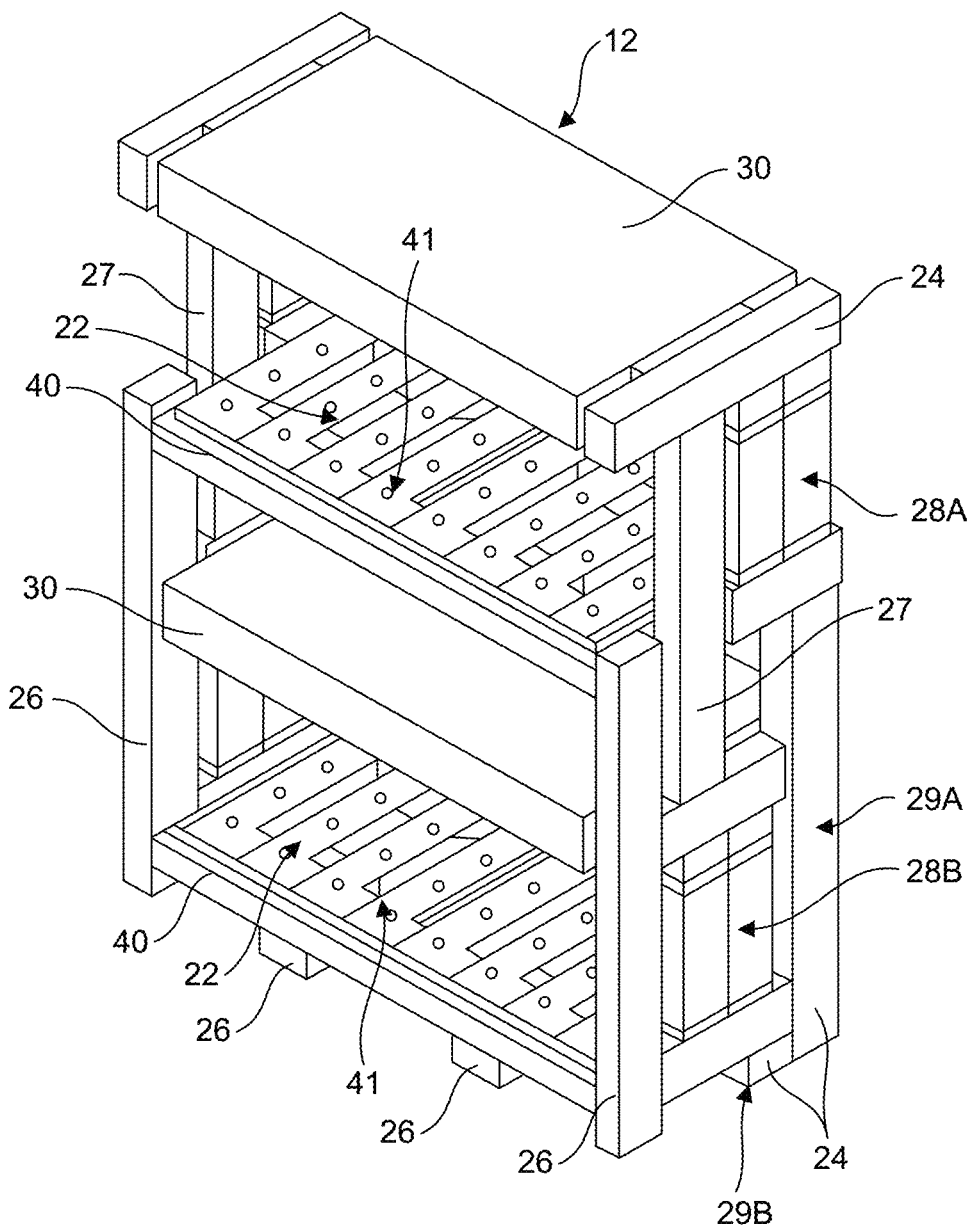
FIG. 26 illustrates another elevational front perspective view of the first rack system of FIG. 5 according to one embodiment of the present disclosure.
Figure 27:
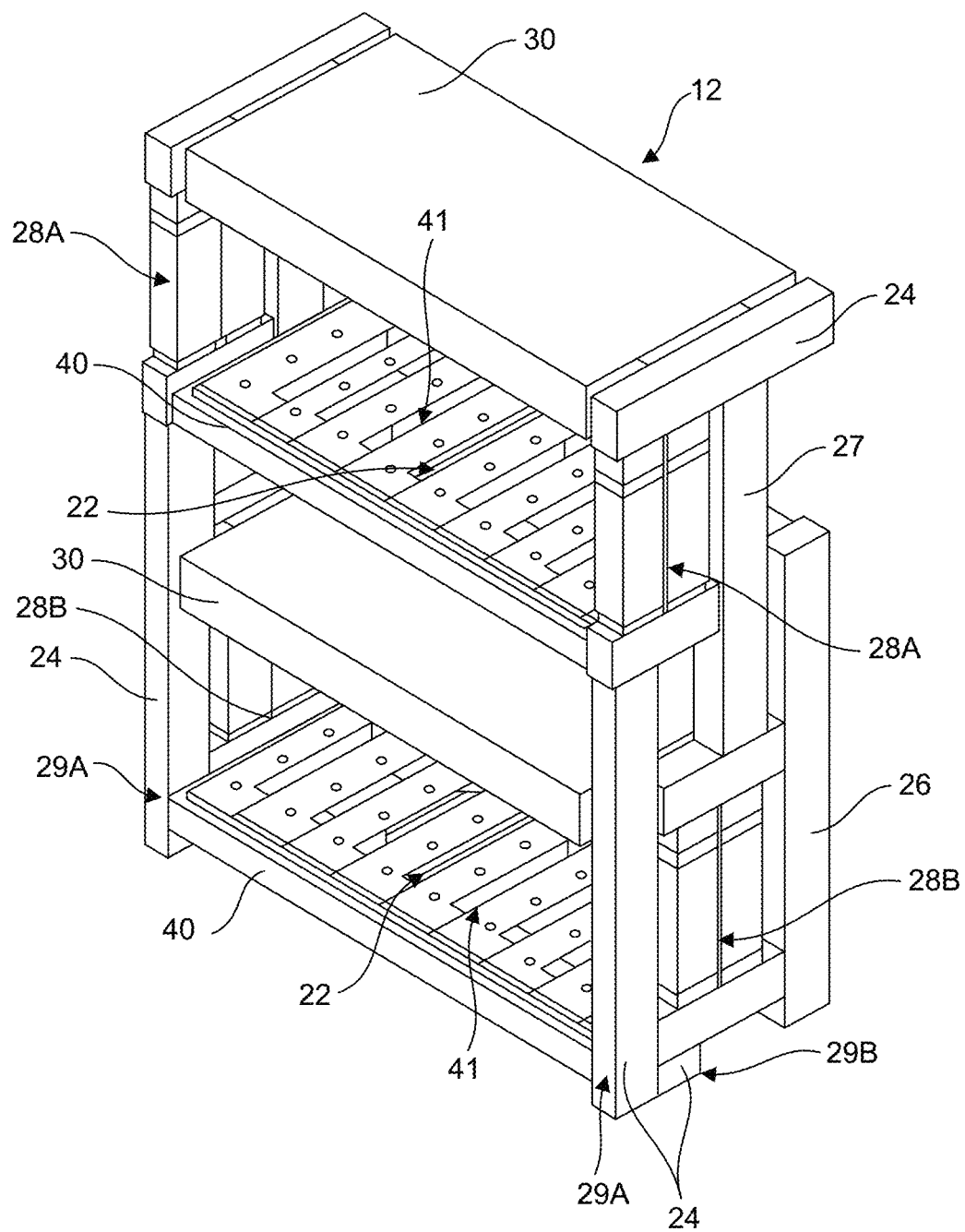
FIG. 27 illustrates an elevational back perspective view of the first rack system of FIG. 5 according to one embodiment of the present disclosure.
Figure 28:
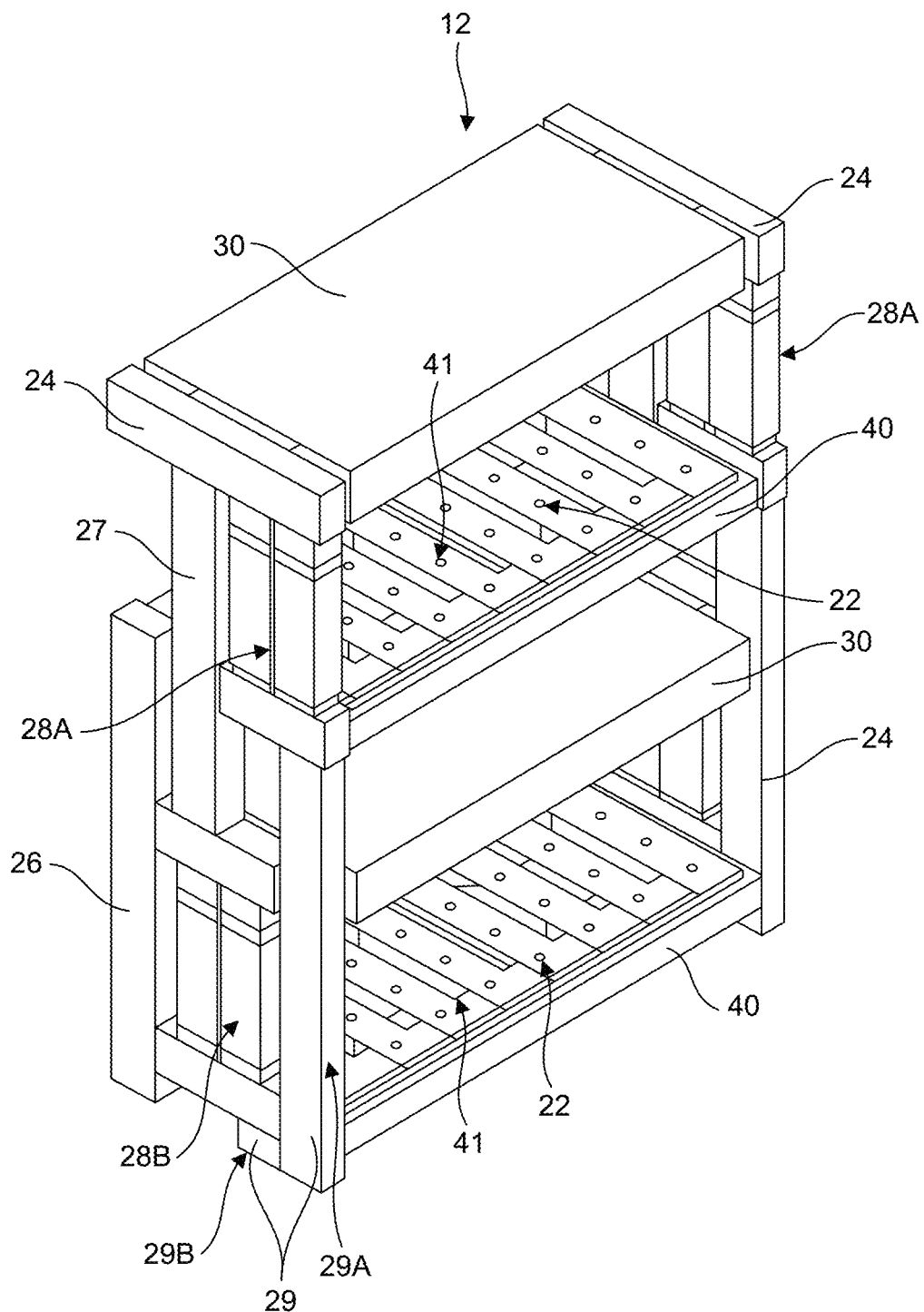
FIG. 28 illustrates another elevational back perspective view of the first rack system of FIG. 5 according to one embodiment of the present disclosure.
Figure 29:
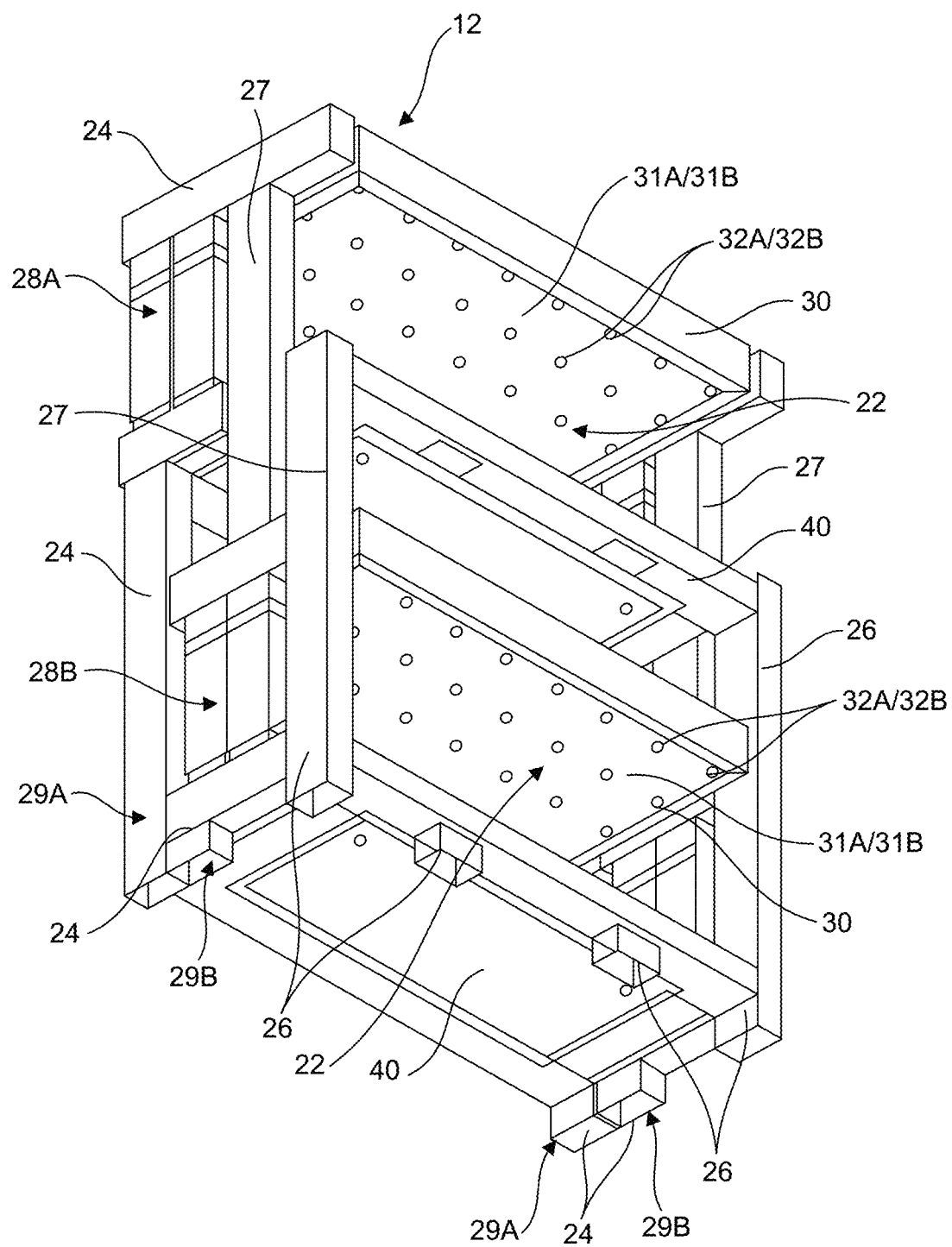
FIG. 29 illustrates a bottom front perspective view of the first rack system of FIG. 5 according to one embodiment of the present disclosure.
Figure 30:
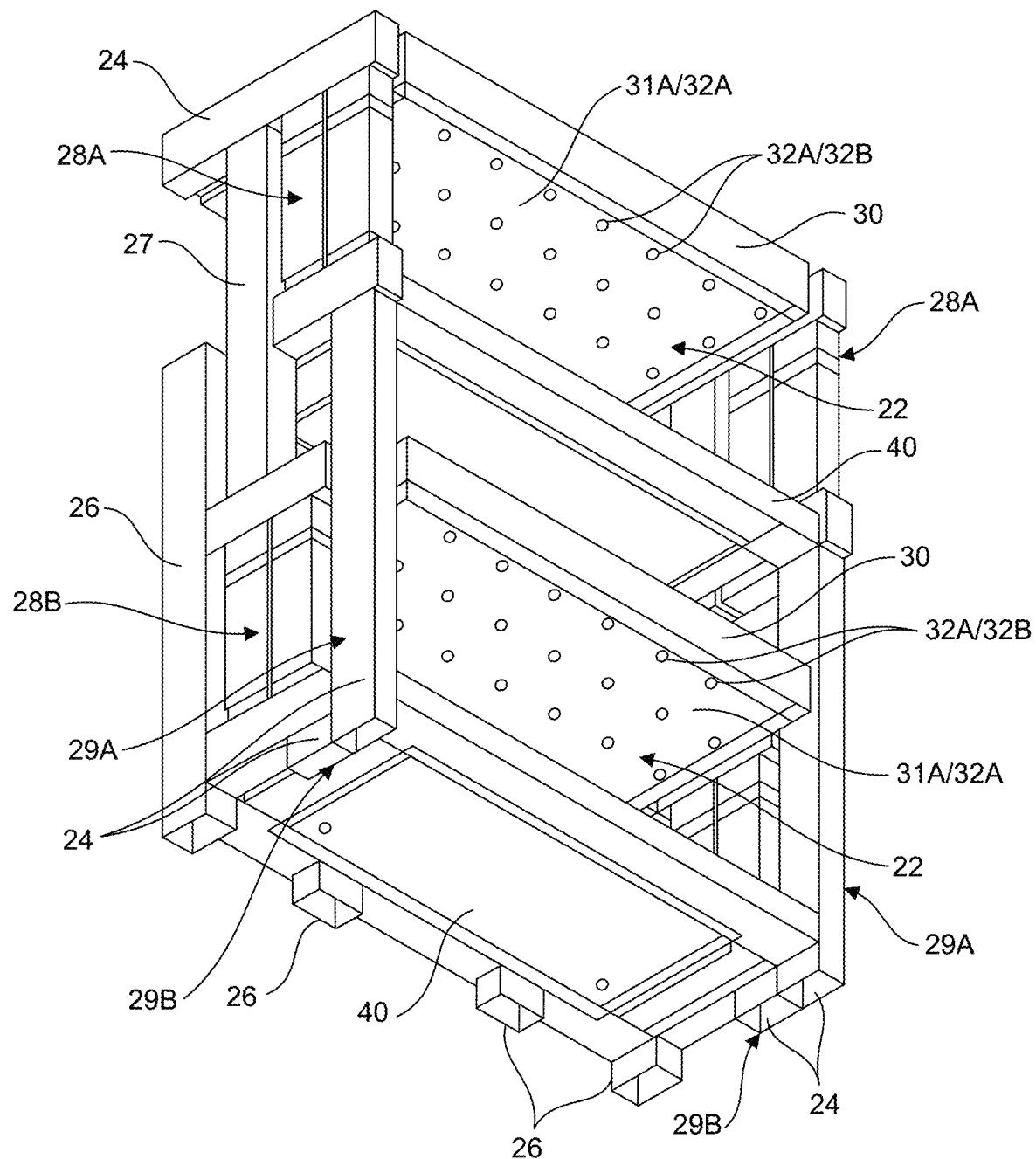
FIG. 30 illustrates a bottom back perspective view of the first rack system of FIG. 5 according to one embodiment of the present disclosure.
Figure 31:
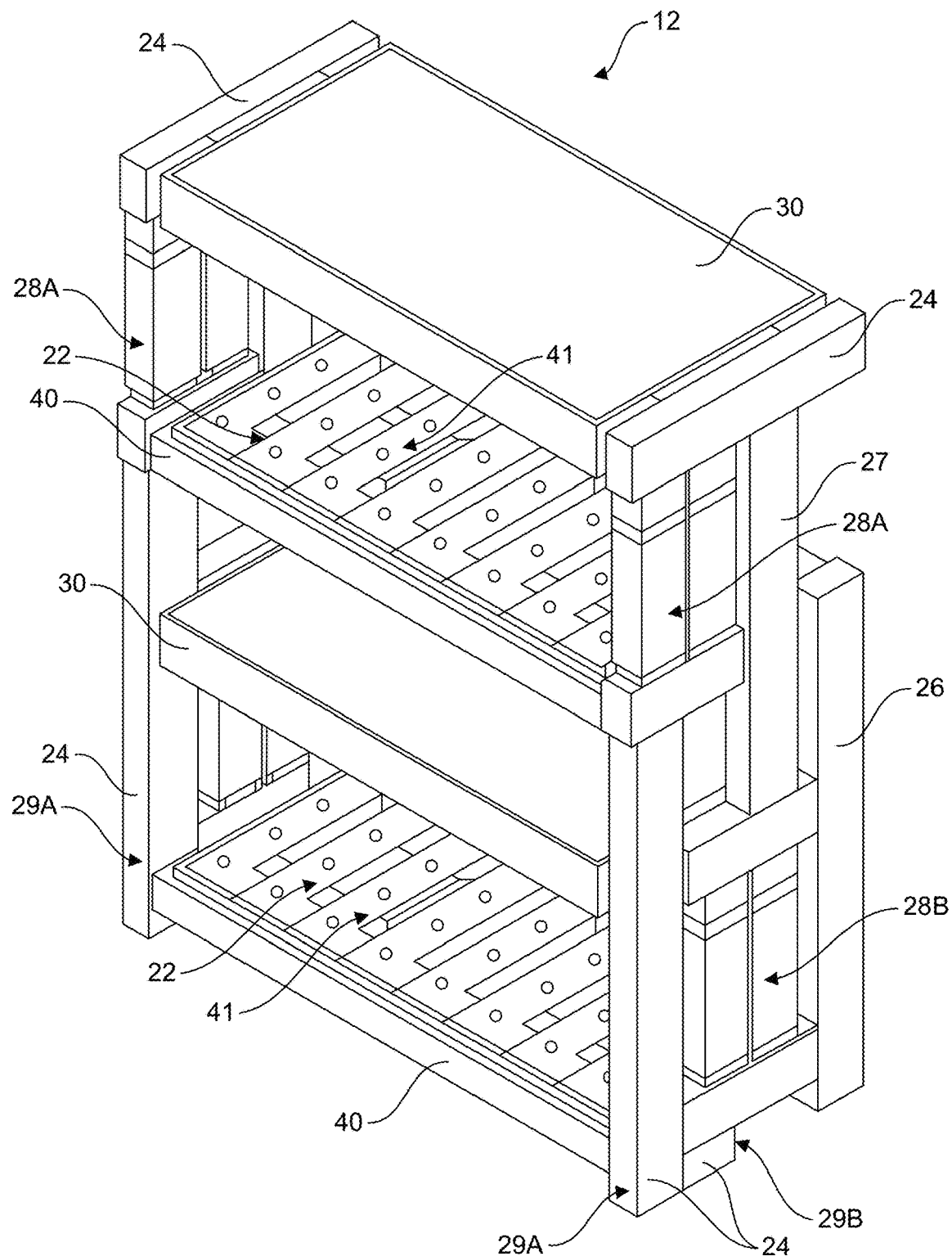
FIG. 31 illustrates another elevational back perspective view of the first rack system of FIG. 5 according to one embodiment of the present disclosure.
Figure 32:
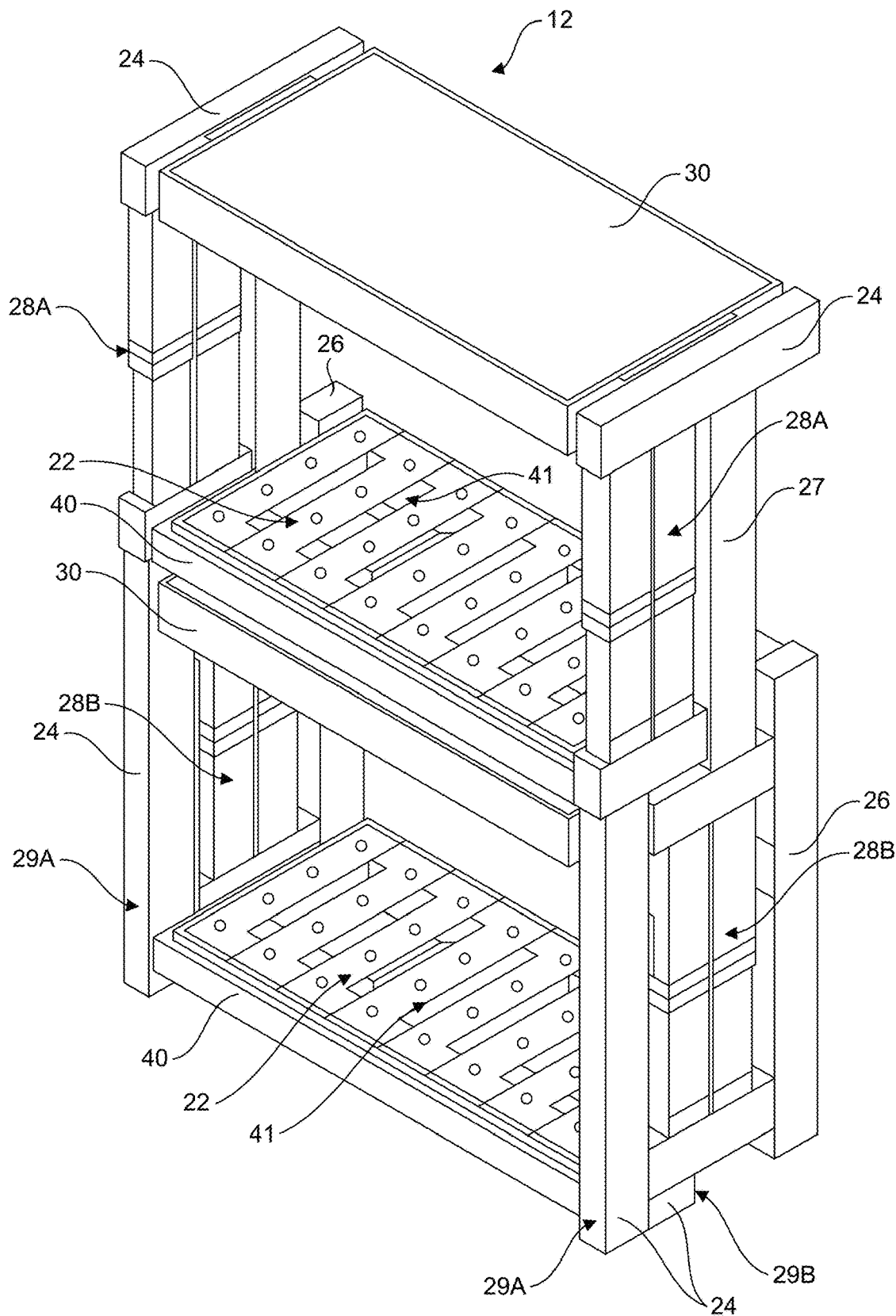
FIG. 32 illustrates an elevational back perspective view of the first rack system of FIG. 6 according to one embodiment of the present disclosure.

In addition to physically supporting the (at least in part) the at least one input diffusion assembly 30, the at least one frame supply plenum 24 directs the supply airflow from the at least one supply base plenum 14 to the at least one input diffusion assembly 30. The at least one frame supply plenum 24 defines or includes at least one internal, substantially airtight, airflow passageway (or cavity/pathway) that is configured to house and direct a flow of the supply airflow, as shown in FIGS. 22-24. The at least one frame supply plenum 24 may operate at a positive pressure, as discussed further below. For example, the air conditioning unit 18 of the air condition system may be configured to force the supply airflow through the supply base plenum 14 and the at least one frame supply plenum 24 (and the at least one input diffusion assembly 30) under positive pressure.

Similarly, in addition to physically supporting the (at least in part) the at least one plant support tray assembly 40, the at least one frame return plenum 26 directs the return airflow from the at least one plant support tray assembly 40, to the at least one return base plenum 16. The at least one frame return plenum 26 defines or includes at least one internal, substantially airtight, airflow passageway (or cavity/pathway) that is configured to house and direct a flow of the return airflow, as shown in FIGS. 22-24 The at least one frame return plenum 26 may operate at a negative pressure, as discussed further below. For example, the air conditioning unit 18 of the air condition system may be configured to draw the return airflow through the return base plenum 16 and the at least one frame return plenum 26 (and the at least one plant support tray assembly 40,) under negative pressure.

The at least one frame supply plenum 24 and the at least one frame return plenum 26 may be separate and distinct plenums/ducts that define internal airflow passageways, or may comprise two distinct internal airflow passageways formed by a common plenum/duct or like member(s). The at least one frame supply plenum 24 and the at least one frame return plenum 26 may define any size and cross-sectional shape such that the internal passageways thereof are able to carry a sufficient volumetric flow, velocity and pressure of the supply and return airflows, respectively.

As shown in FIGS. 10, 12, 15-24 and 34-37, in some embodiments the at least one frame supply plenum 24 and the at least one frame return plenum 26 may comprise separate and distinct plenums/ducts that extend parallel to each other. As shown in FIGS. 1, 4-33 and 35-37, the rack system 12 may include a plurality of frame supply plenums 24 and a plurality of frame return plenums 26. Specifically, the rack system 12 includes a pair of frame supply plenums 24 for each input diffusion assembly 30, and a pair of frame return plenums 26 for each input diffusion assembly 30. However, the rack system 12 may include fewer frame supply plenums 24 and/or frame return plenums 26, additional frame supply plenums 24 and/or frame return plenums 26.

In the illustrated exemplary embodiment, as shown in FIGS. 1, 4-33 and 35-37, the rack system 12 comprises first and second frame supply plenums 24 positioned proximate to a first end of the rack system 12 and a first face of the rack system 12, and third and fourth frame supply plenums 24 positioned proximate to a second end of the rack system 12 and the first face of the rack system 12. The first and third frame supply plenums 24 physically support (at least in part) and are fluidically coupled between only a first upper input diffusion assembly 30 and the supply base plenum 14, and the second and fourth frame supply plenums 24 physically support (at least in part) and are only fluidically coupled between a second lower input diffusion assembly 30 and the supply base plenum 14. Further, in the illustrated exemplary embodiment, as shown in FIGS. 9-33, the rack system comprises a first frame return plenum 26 positioned proximate to the first end of the rack system 12 and a second face of the rack system 12, a second frame return plenum 26 positioned proximate to the second end of the rack system 12 and the second face of the rack system 12, and third and fourth frame return plenums 26 positioned proximate to the second face of the rack system 12 between the first and second frame return plenums 26 in a medial portion of the lateral length rack system 12. The first and second frame return plenums 26 physically support (at least in part) and are only fluidically coupled between a first upper plant support tray assembly 40 and the return base plenum 16, and the third and fourth frame return plenums 26 physically support (at least in part) and are only fluidically coupled between a second lower plant support tray assembly 40 and the return base plenum 16.

However, it is noted that each input diffusion assembly 30 may be physically supported by any frame supply plenum 24 (one or more) and be fluidically coupled with any frame supply plenum 24 (one or more), and each plant support tray assembly 40 may be physically supported by any frame return plenum 26 (one or more) and be fluidically coupled with any frame return plenum 26 (one or more). For example, an input diffusion assembly 30 may be physically supported by a first frame supply plenum 24 and not fluidically coupled thereto, and fluidically coupled to a second frame supply plenum 24 and not physically supported thereby, and/or an plant support tray assembly 40 may be physically supported by a first frame return plenum 26 and not fluidically coupled thereto, and fluidically coupled to a second frame return plenum 26 and not physically supported thereby. As another example, an input diffusion assembly 30 may be both physically supported and fluidically coupled to at least one common frame supply plenum 24, and/or a plant support tray assembly 40 may be physically supported by and fluidically coupled to at least one common frame return plenum 26.

In some embodiments, a height of the at least one input diffusion assembly 30 of a rack system 12 relative to that of the at least one plant support tray assembly 40 immediately below the at least one input diffusion assembly 30 is fixed such that a height of the at least one environmental cultivation chamber 22 therebetween is fixed. In such embodiments of the rack system 12, the rack system 12 may thereby comprise a fixed-height, multi-level air handling rack system (if a plurality of input diffusion assemblies 30 and plant support tray assemblies 40, and thereby a plurality of environmental cultivation chambers 22, are provided) or a fixed-height, single-level air handling rack system (if one input diffusion assembly 30 and plant support tray assembly 40, and thereby one environmental cultivation chamber 22, is provided).

Figure 5:
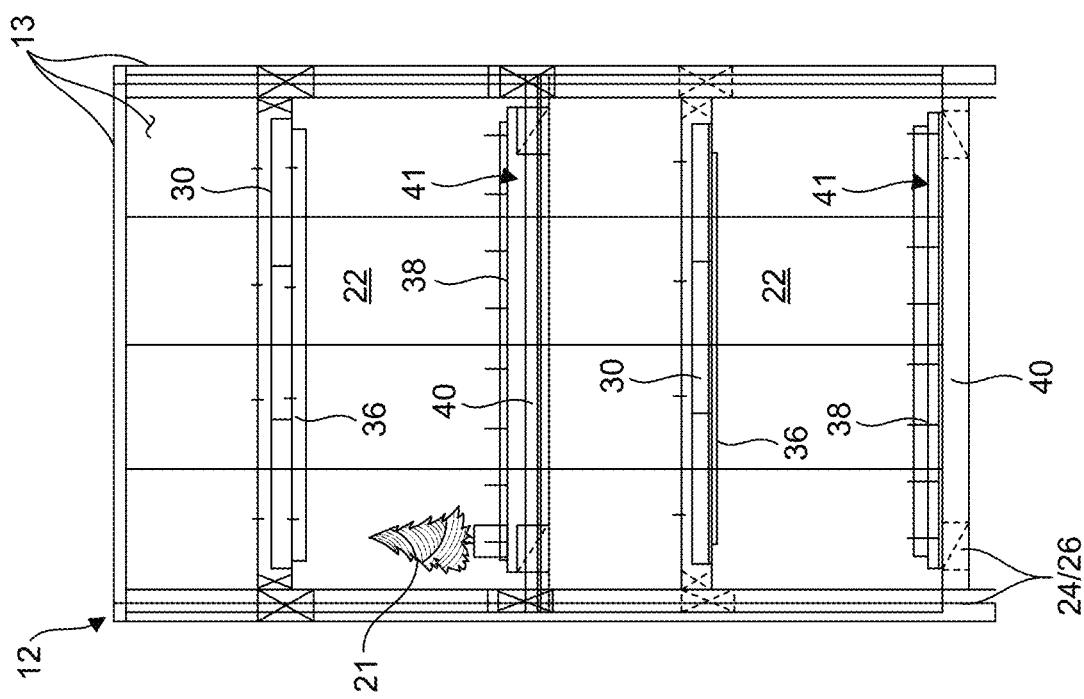
FIG. 5 illustrates a front view of an adjustable-height, two-level air handling first rack system of the first horticulture system of FIG. 1 with environmental cultivation chambers adjusted to a first height to accommodate one or more relatively short plants according to one embodiment of the present disclosure.
Figure 7:
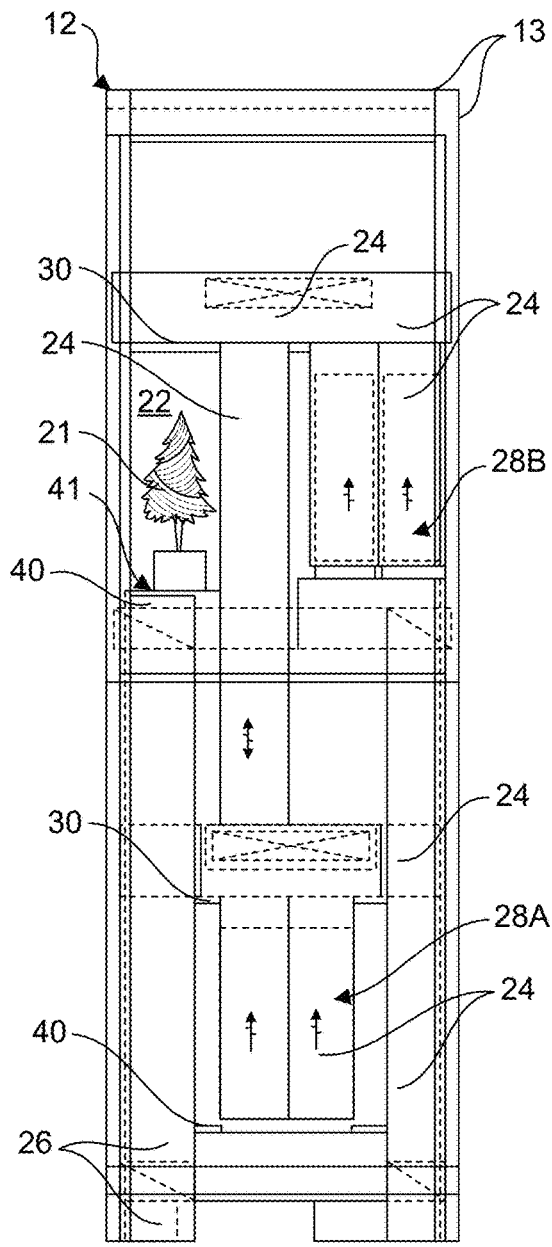
FIG. 7 illustrates a side view of the first rack system of FIG. 5 according to one embodiment of the present disclosure.
Figure 8:
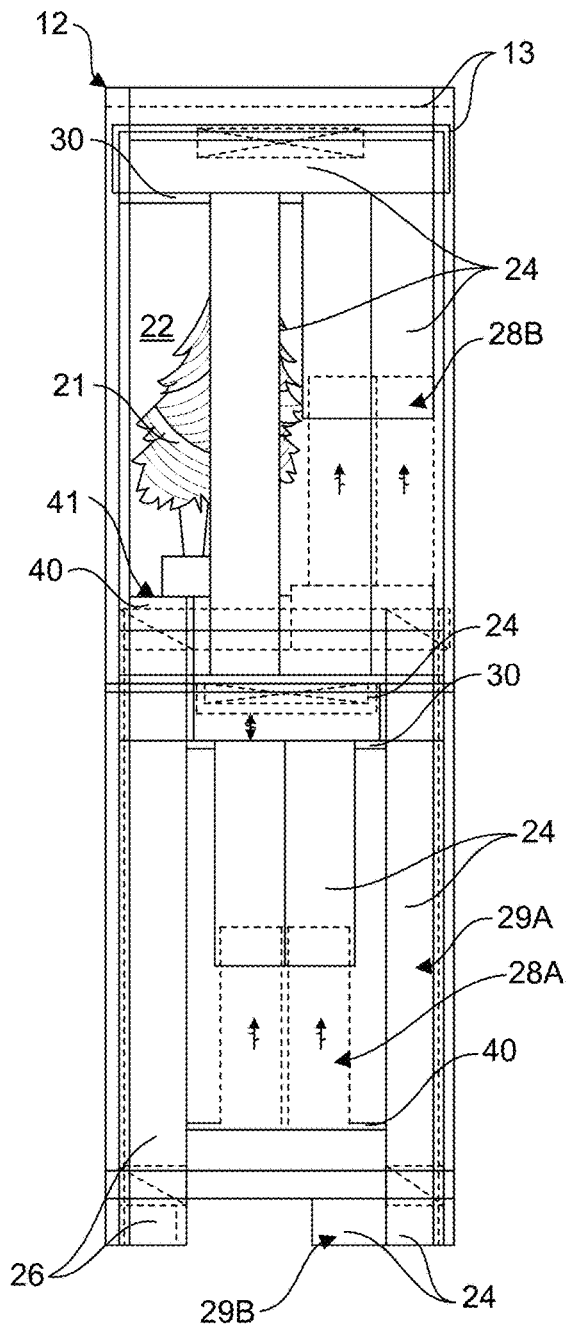
FIG. 8 illustrates a side view of the first rack system of FIG. 6 according to one embodiment of the present disclosure.
Figure 9:
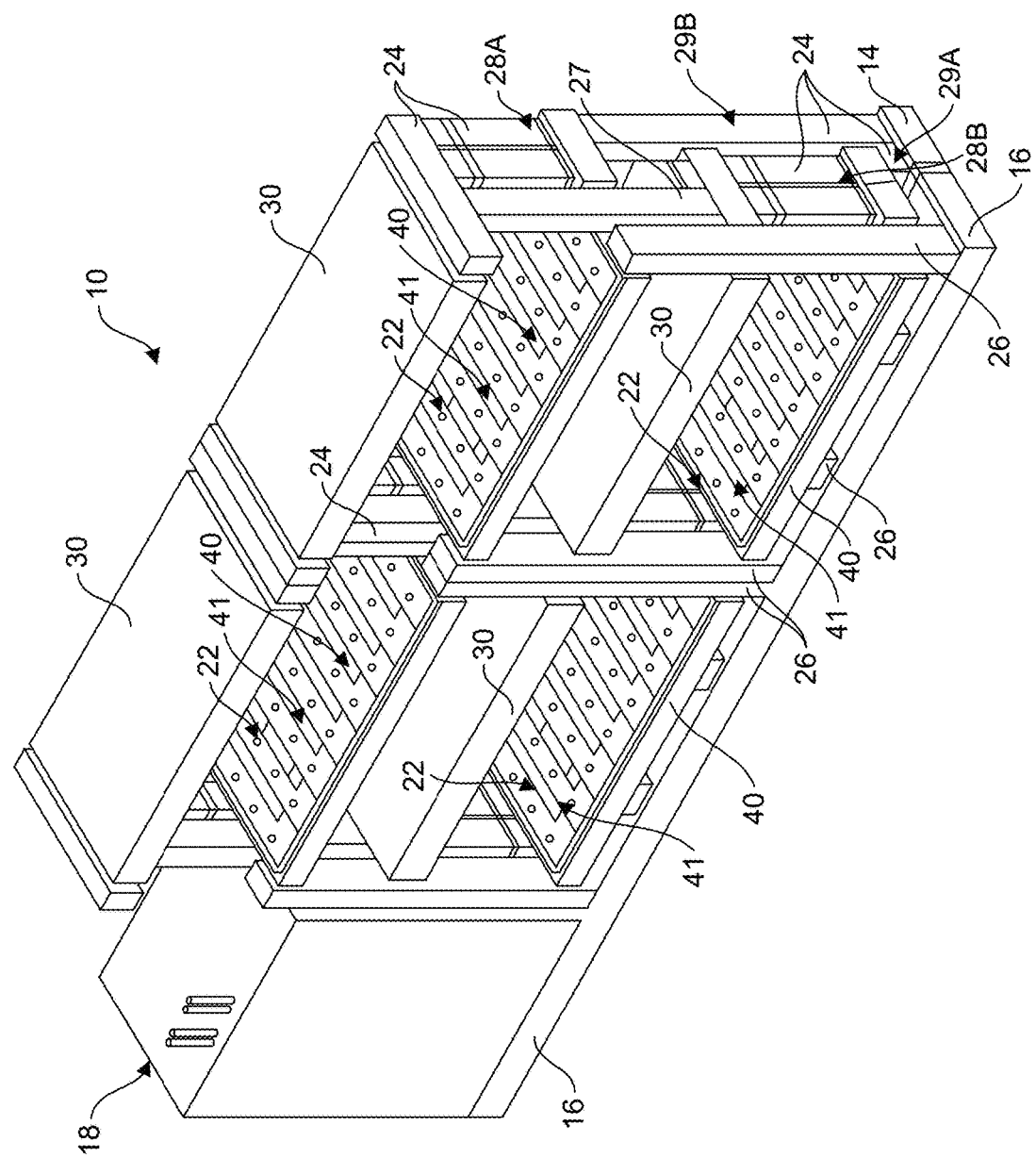
FIG. 9 illustrates an elevational front perspective view of the horticulture system of FIG. 4 according to one embodiment of the present disclosure.
Figure 10:
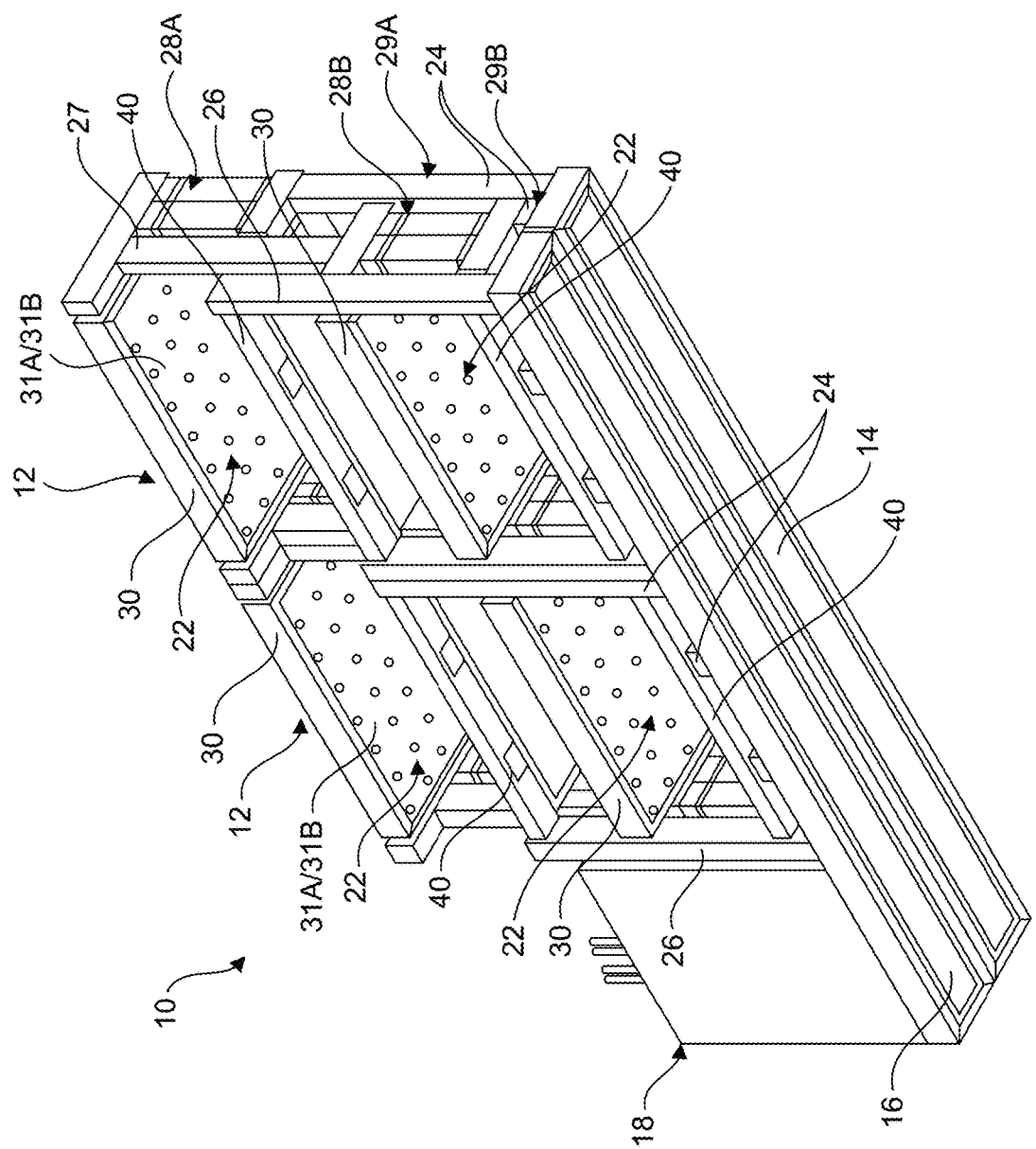
FIG. 10 illustrates a bottom front perspective view of the horticulture system of FIG. 4 according to one embodiment of the present disclosure.
Figure 11:
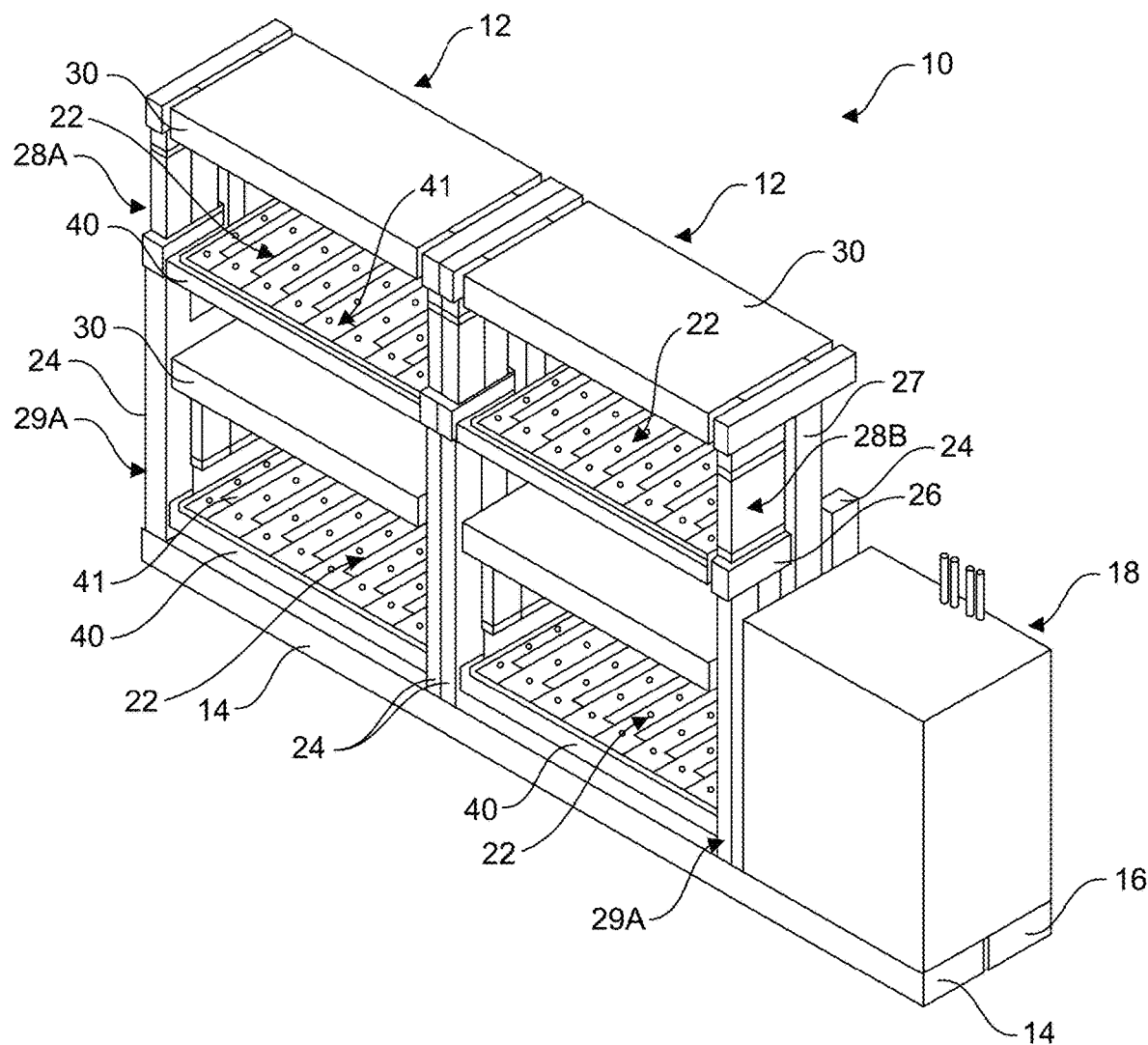
FIG. 11 illustrates an elevational back perspective view of the horticulture system of FIG. 4 according to one embodiment of the present disclosure.
Figure 12:
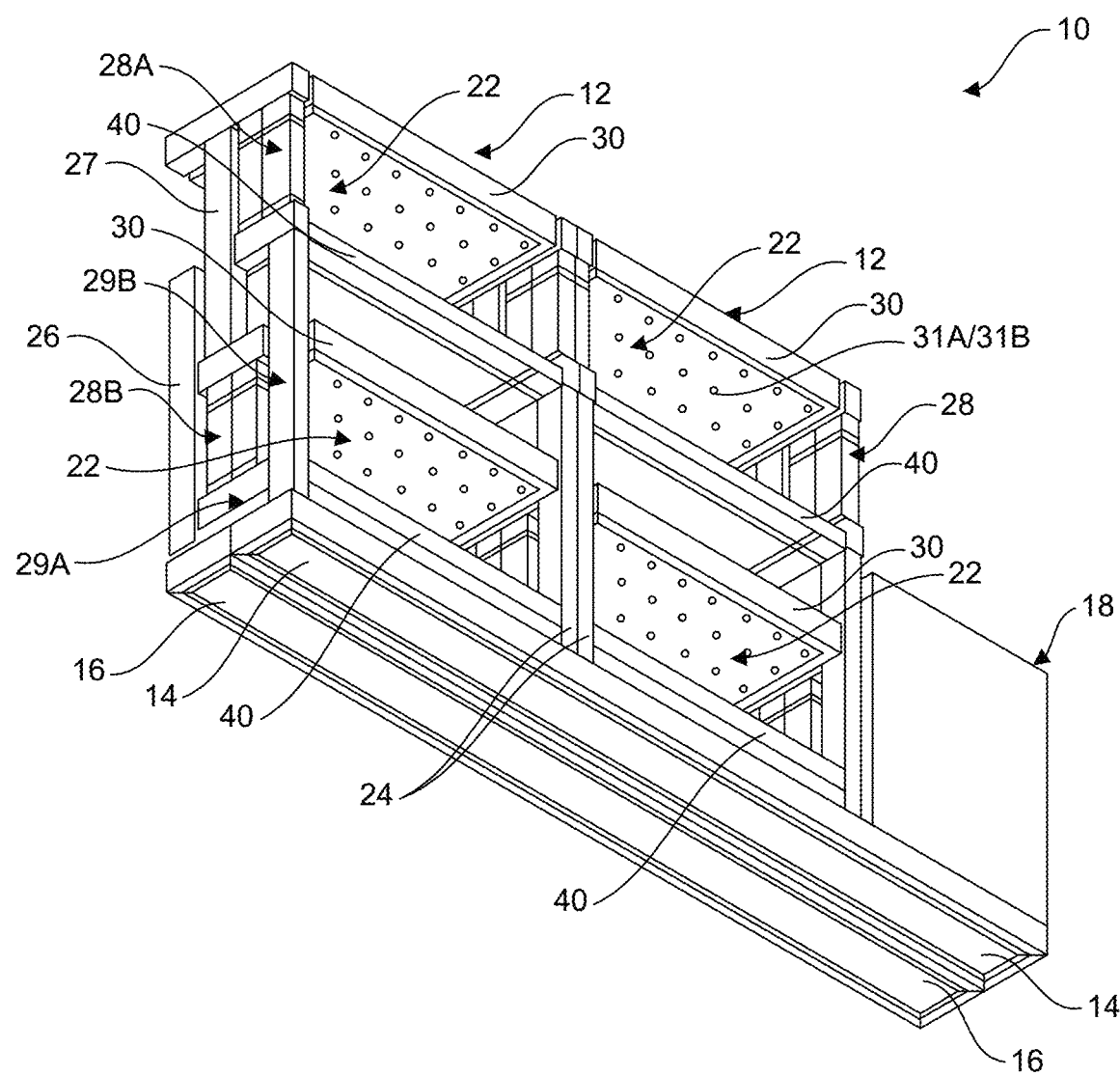
FIG. 12 illustrates a bottom back perspective view of the horticulture system of FIG. 4 according to one embodiment of the present disclosure.
Figure 13:
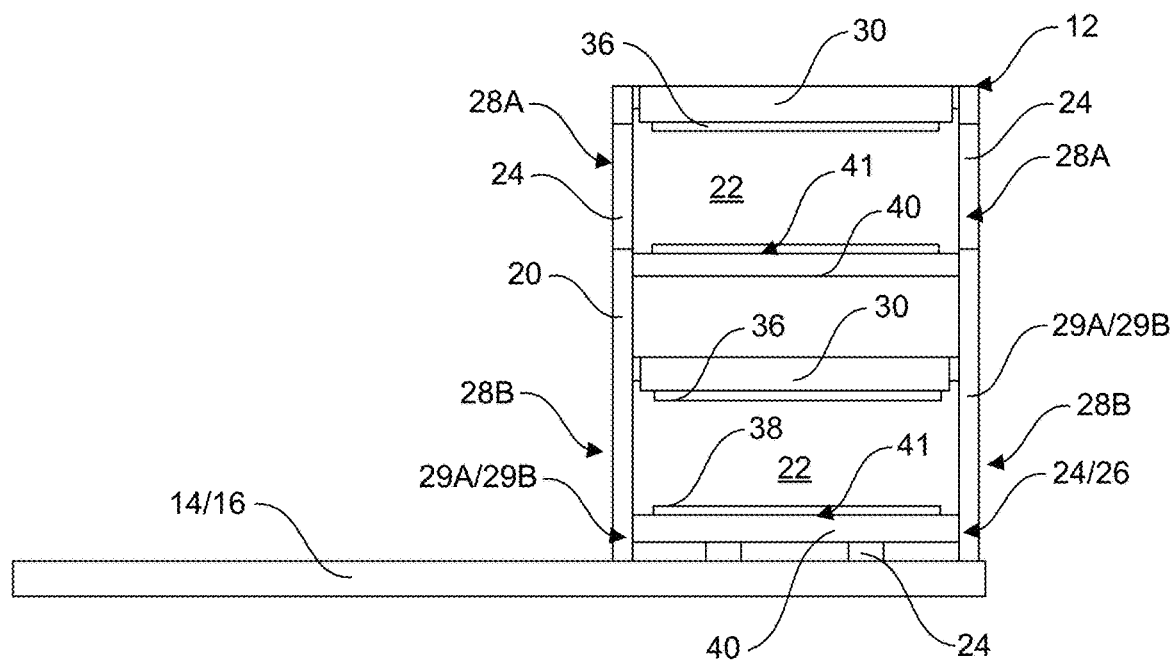
FIG. 13 illustrates a front view of the first rack system of FIG. 5 and a base plenum portion of the first horticulture system of FIG. 1 according to one embodiment of the present disclosure.
Figure 14:
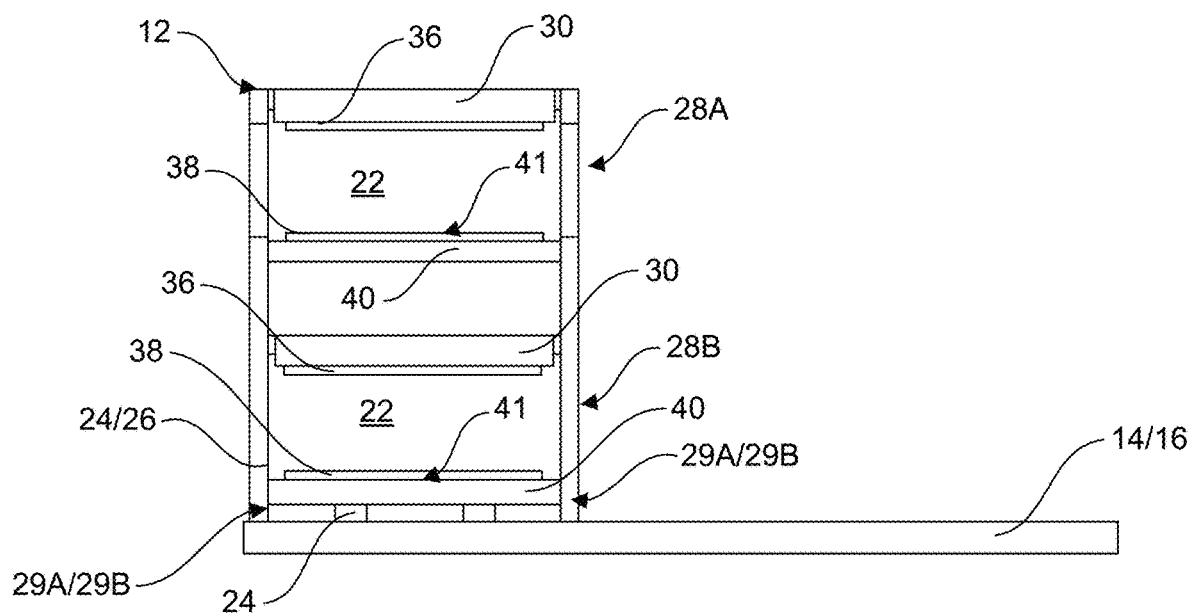
FIG. 14 illustrates a back view of the air handling rack system and the base plenum portion of FIG. 13 according to one embodiment of the present disclosure.
Figure 15:
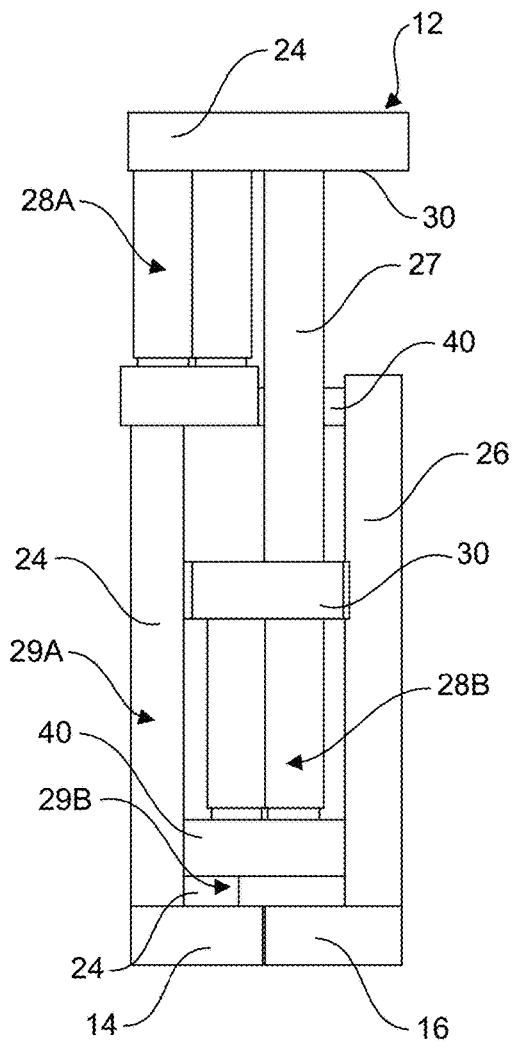
FIG. 15 illustrates a side view of the air handling rack system and the base plenum portion of FIG. 13 according to one embodiment of the present disclosure.
Figure 16:
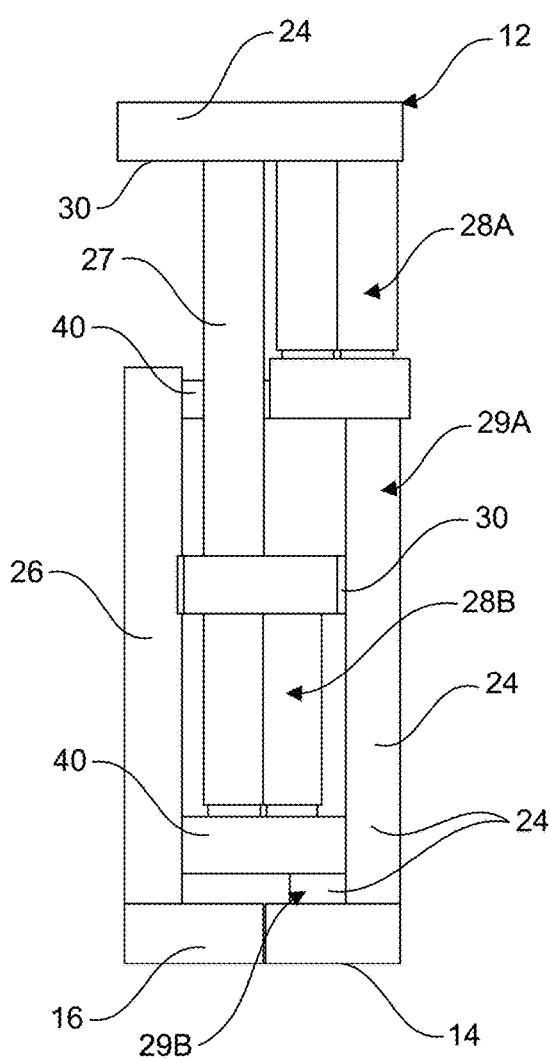
FIG. 16 illustrates another side view of the air handling rack system and the base plenum portion of FIG. 13 according to one embodiment of the present disclosure.
Figure 17:
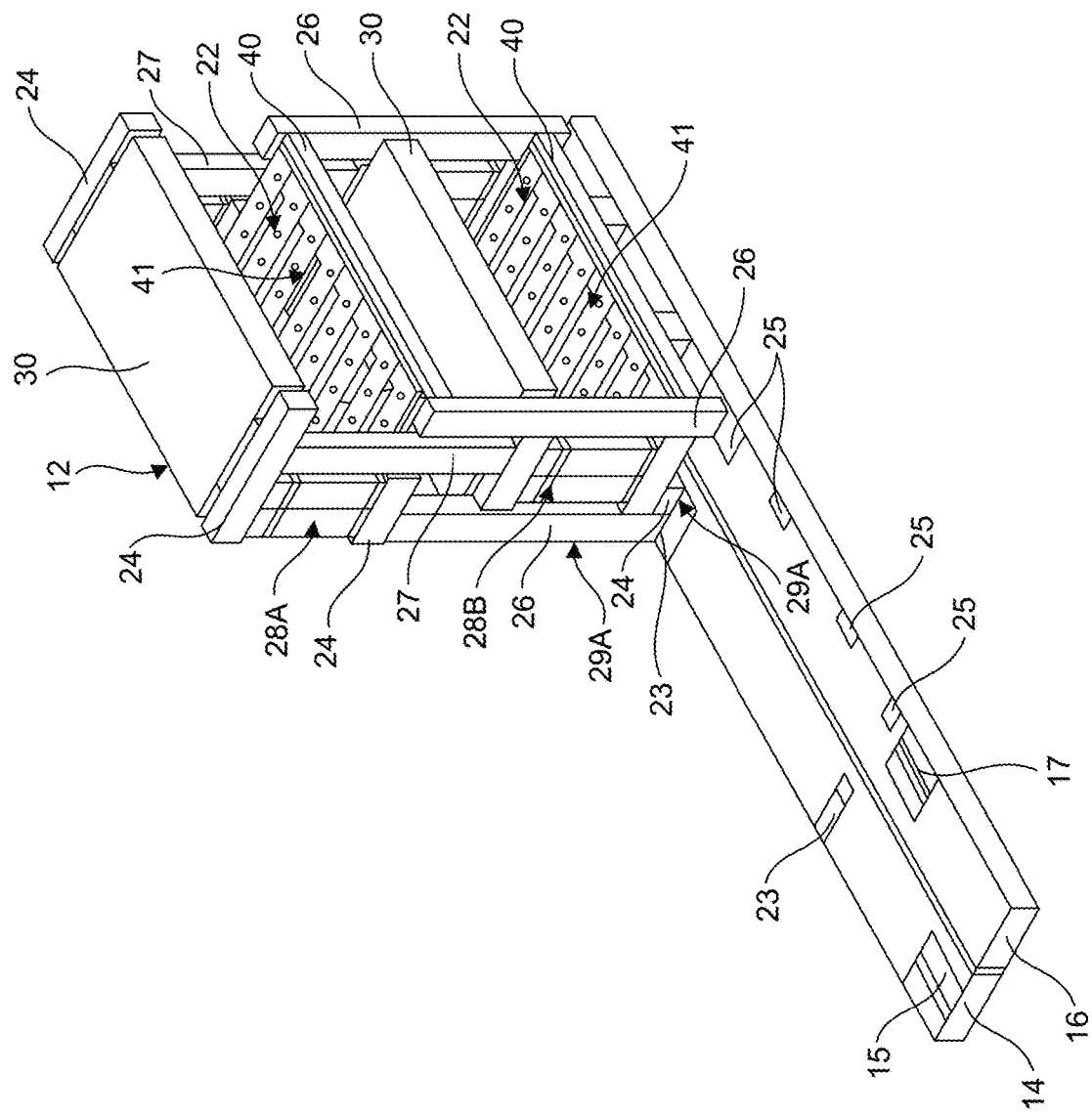
FIG. 17 illustrates an elevational front perspective view of the air handling rack system and the base plenum portion of FIG. 13 according to one embodiment of the present disclosure.
Figure 18:
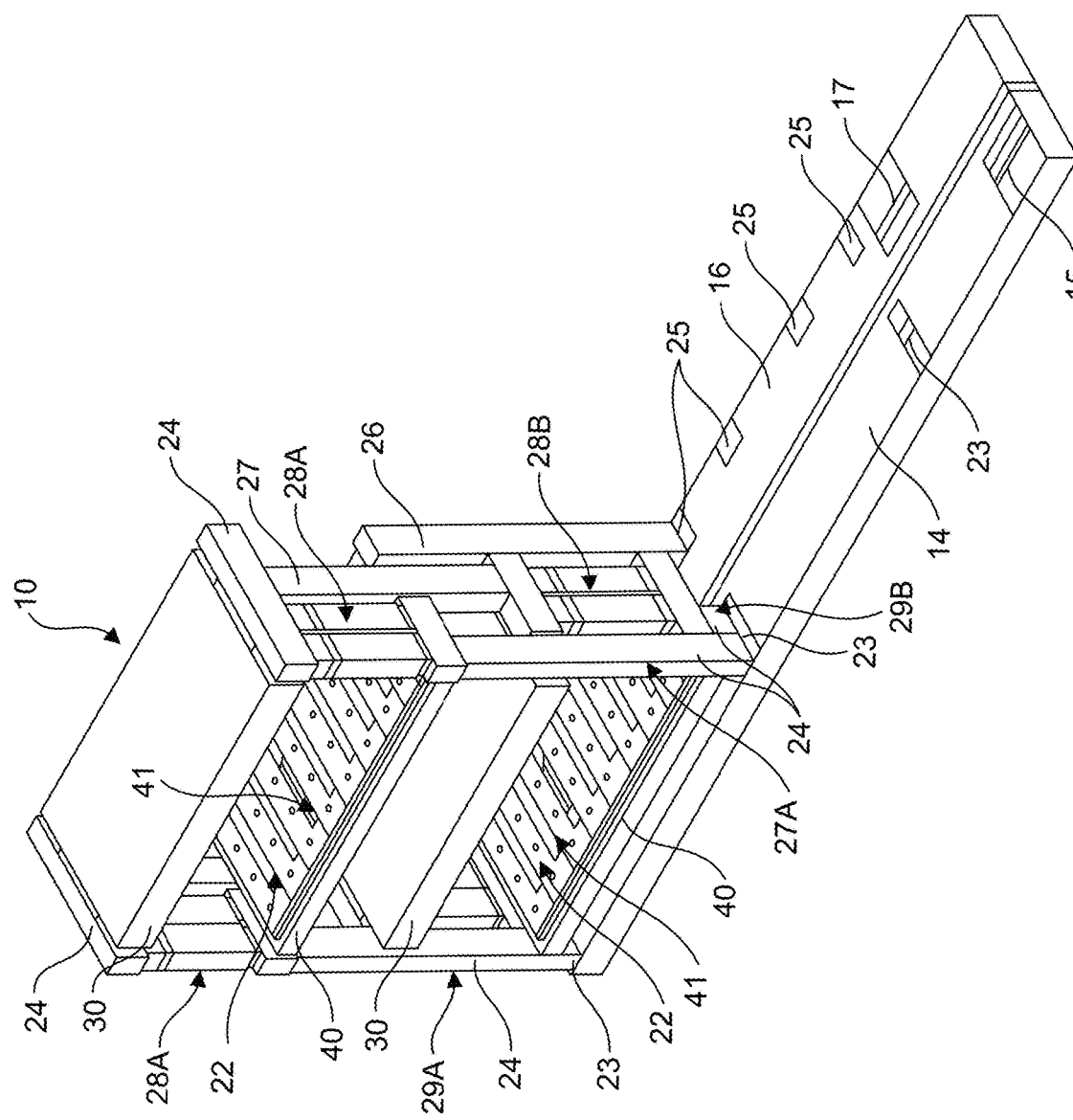
FIG. 18 illustrates an elevational back perspective view of the air handling rack system and the base plenum portion of FIG. 13 according to one embodiment of the present disclosure.
Figure 19:
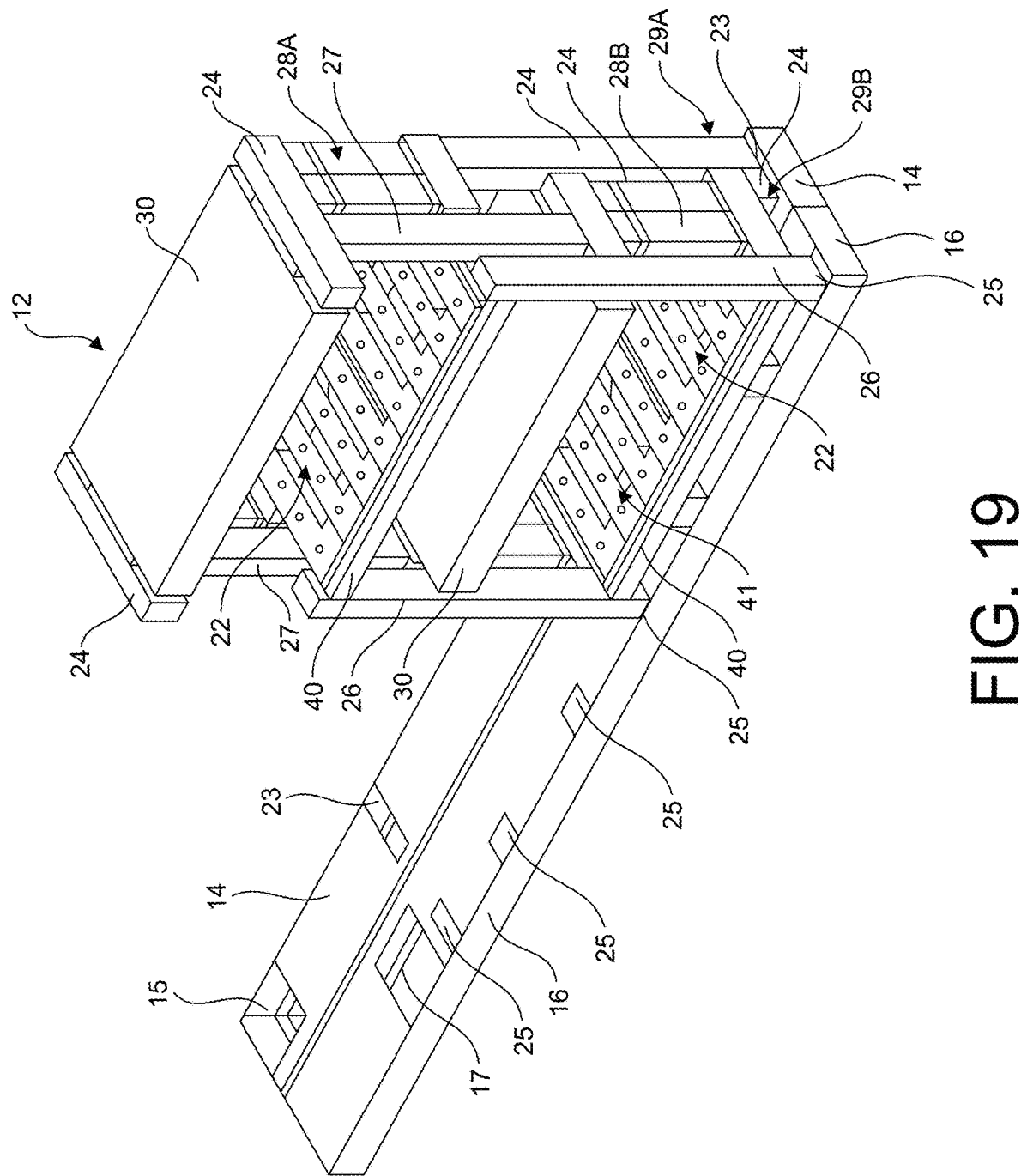
FIG. 19 illustrates another elevational front perspective view of the air handling rack system and the base plenum portion of FIG. 13 according to one embodiment of the present disclosure.
Figure 20:
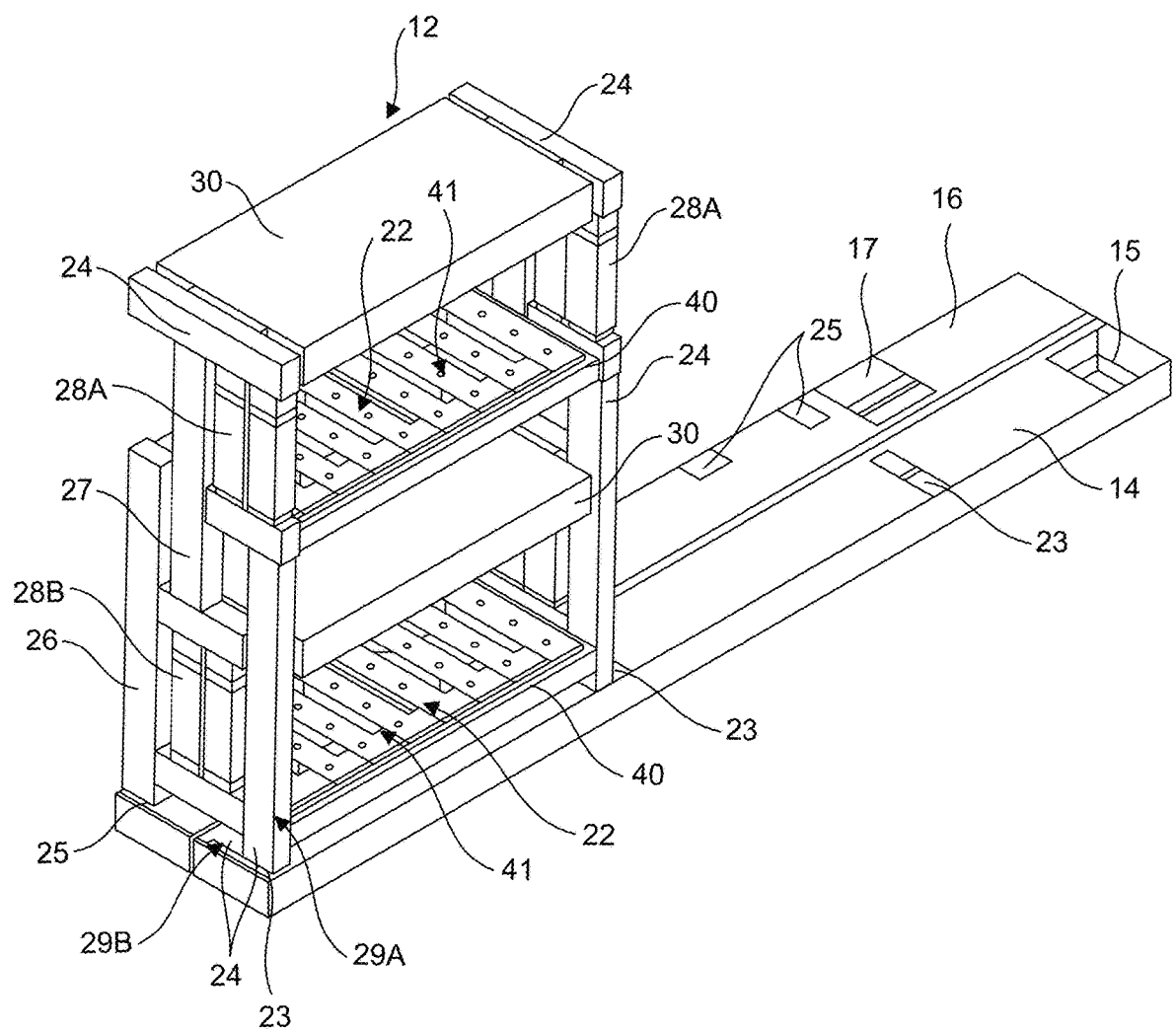
FIG. 20 illustrates another elevational back perspective view of the air handling rack system and the base plenum portion of FIG. 13 according to one embodiment of the present disclosure.
Figure 21:
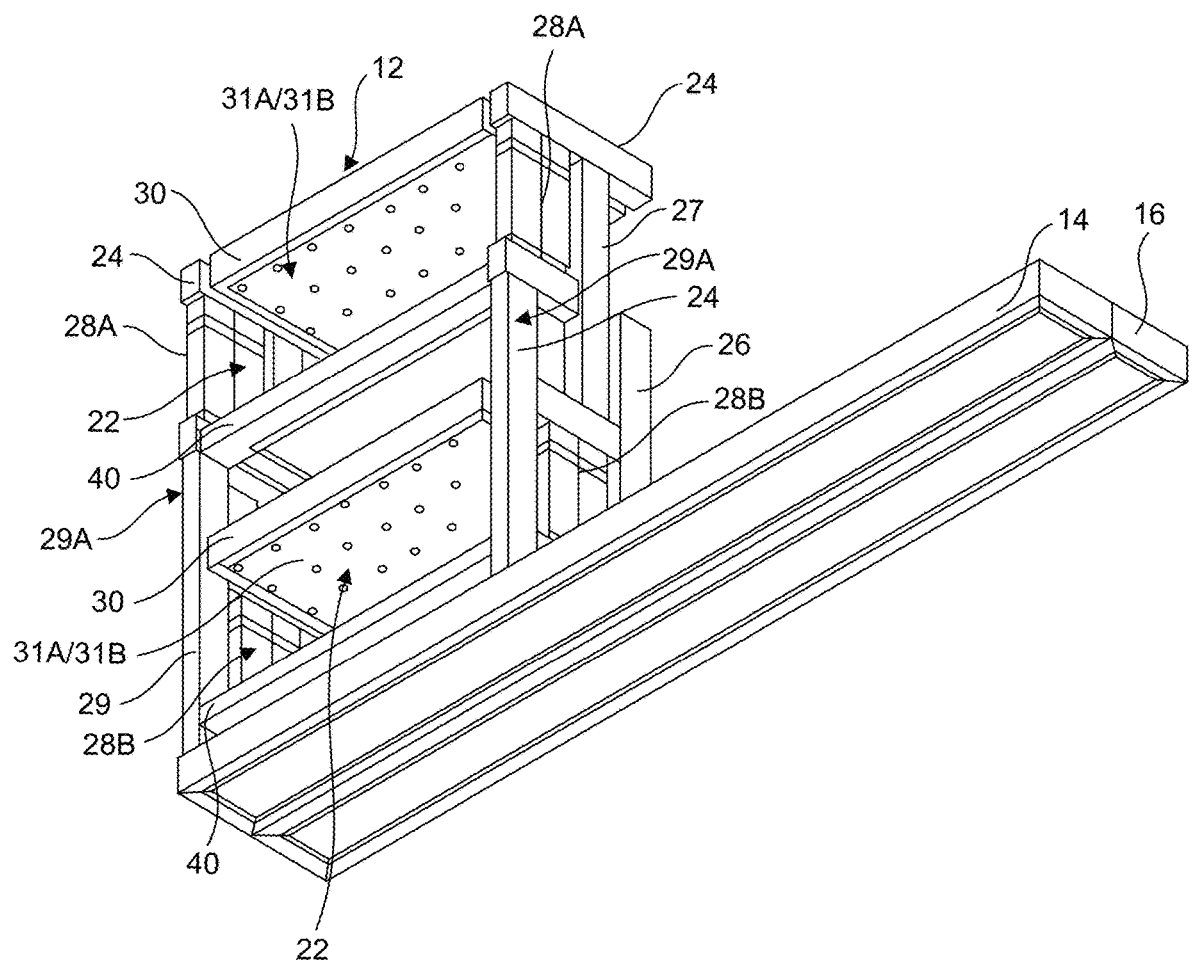
FIG. 21 illustrates a bottom back perspective view of the air handling rack system and the base plenum portion of FIG. 13 according to one embodiment of the present disclosure.

In some other embodiments, a height of the at least one input diffusion assembly 30 of a rack system 12 relative to that of the at least one plant support tray assembly 40 immediately below the at least one input diffusion assembly 30 is adjustable such that a height of the at least one environmental cultivation chamber 22 therebetween is adjustable. In such embodiments of the rack system 12, the rack system 12 may thereby comprise an adjustable height, multi-level air handling rack system (if a plurality of input diffusion assemblies 30 and plant support tray assemblies 40, and thereby a plurality of environmental cultivation chambers 22, are provided) or an adjustable height, single-level air handling rack system (if one input diffusion assembly 30 and plant support tray assembly 40, and thereby one environmental cultivation chamber 22, is provided). In such embodiments, the at least one frame supply plenum 24 may comprise at least one length adjustable plenum portion 28 positioned at least partially below the at least one input diffusion assembly 30 and above the at least one plant support tray assembly 40 immediately therebelow configured to adjust a height of the at least one input diffusion assembly 30 with respect to the at least one plant support tray 40 immediately therebelow, and thereby a height of the at least one environmental cultivation chamber 22 therebetween, as shown in FIG. 5 as compared to FIG. 6, FIG. 7 as compared to FIG. 8, and FIG. 31 as compared to FIG. 32.

Figure 33:
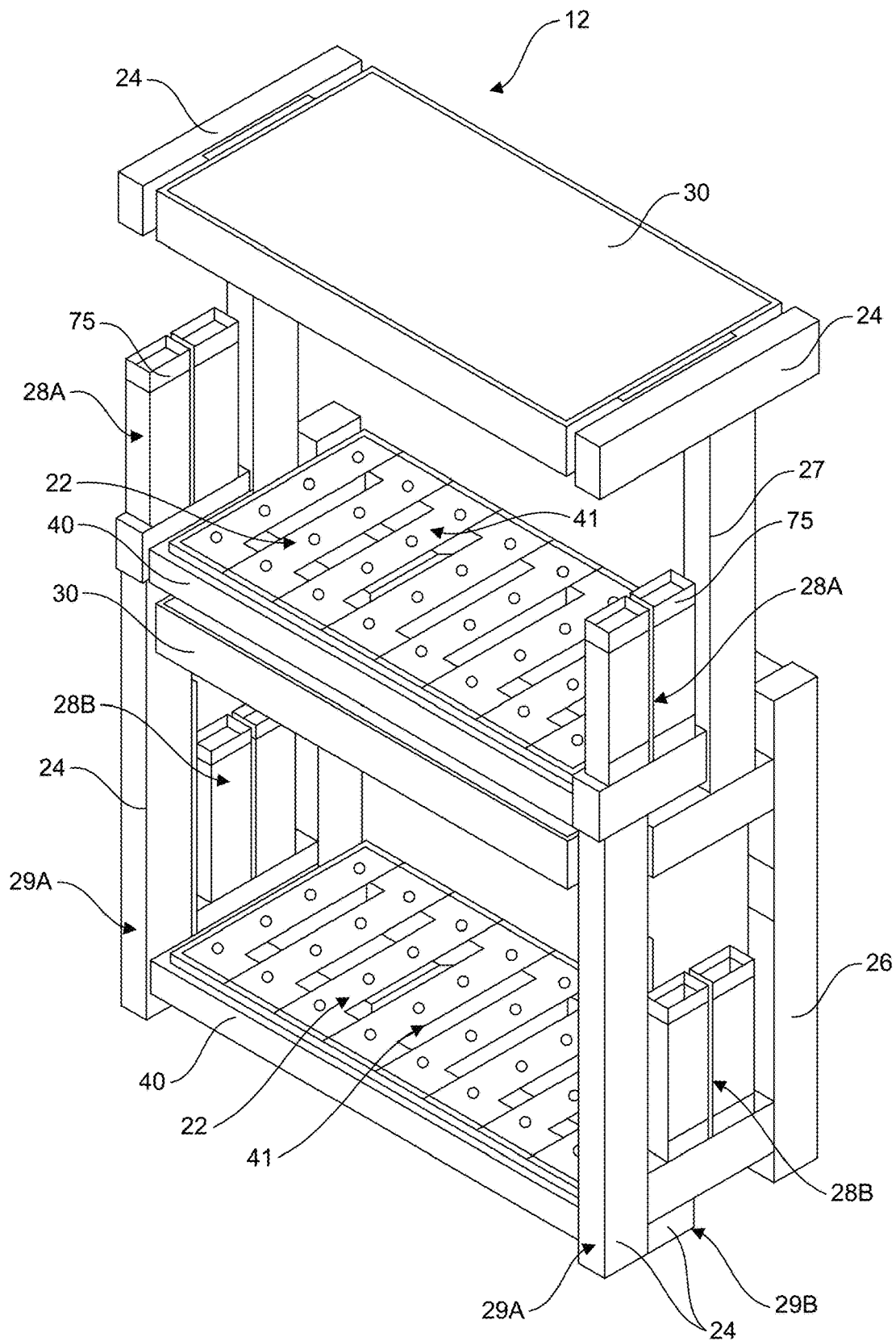
FIG. 33 illustrates an elevational back perspective view of a portion of the first rack system of FIG. 5 illustrating the adjustable portion of the supply frame plenum portion according to one embodiment of the present disclosure.
Figure 34:
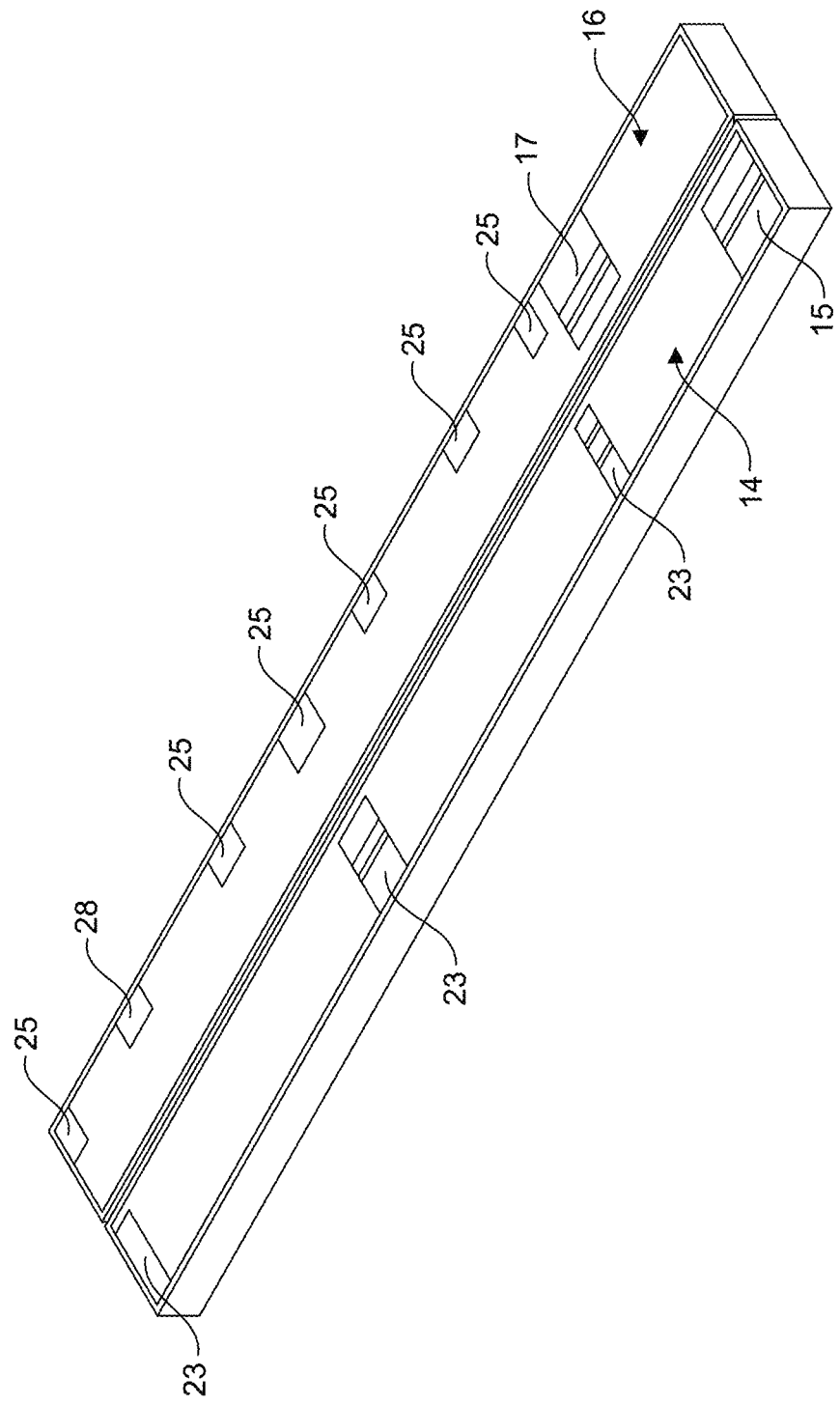
FIG. 34 illustrates an elevational back perspective view of the base plenum portion of one the first horticulture system of FIG. 1 according to one embodiment of the present disclosure.
Figure 35:
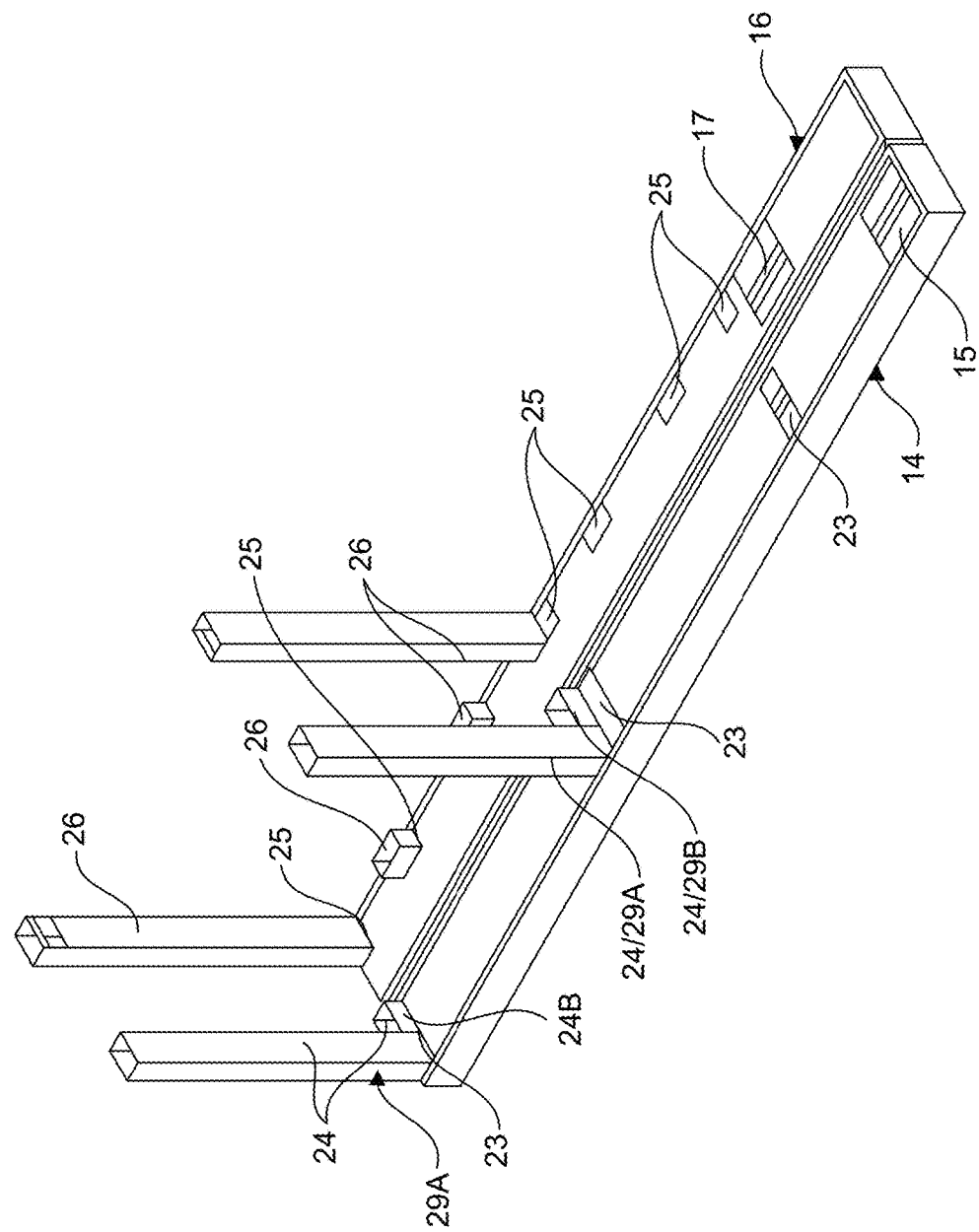
FIG. 35 illustrates an elevational back perspective view of the base plenum portion of FIG. 34 and supply and return frame plenum portions of the first rack system of the first horticulture system of FIG. 1 according to one embodiment of the present disclosure.

The at least one length adjustable plenum portion 28 may comprise any arrangement or configuration that allows for the height adjustment of the at least one environmental cultivation chamber 22. For example, the at least one length adjustable plenum portion 28 may be deformable or otherwise stretchable/compressible along the height direction to allow for/provide such height adjustment of the at least one environmental cultivation chamber 22. As shown in FIGS. 9-33, in some embodiments, at least one length adjustable plenum portion 28 may comprise a first adjustable plenum member and a second adjustable plenum member telescopingly arranged/coupled with the first adjustable plenum member. In some such embodiment, at least one of the first adjustable plenum member and a second adjustable plenum member may include a seal 75 provided thereon/therein to substantially seal the joint therebetween, as shown in FIG. 33.

In some length-adjustable embodiments of the rack system 12, the rack system may comprise at least one length adjustable mechanism (not shown) associated with one or more of the at least one length adjustable plenum portion 28 configured to vary the length thereof to selectively adjust the height of the at least one input diffusion assembly 30 with respect to the at least one plant support tray assembly 40 immediately therebelow, and thereby the height of the at least one environmental cultivation chamber 22 therebetween. In some embodiments, the at least one length adjustable mechanism may comprise a length adjustable linear actuator. In some other embodiments, the at least one length adjustable mechanism may comprise an ACME screw mechanism, pneumatic lifting system, chain drive, or any other extending mechanism. In some embodiments, the rack system 12 may further comprise at least one sensor associated with one or more of the at least one length adjustable mechanism configured to sense the operation thereof. For example, the rack system 12 may comprise a length adjustable linear actuator as the at least one length adjustable mechanism, and may comprise at least one sensor (e.g., a Hall effect sensor) configured to sense the operation of at least one actuator to effectively and accurately control the height of the at least one environmental cultivation chamber 22.

As shown in FIGS. 1 and 4-33, one or more of the air handling rack systems 12 of the horticulture system 10 may comprise a multi-level, height-adjustable rack system. With reference to FIGS. 7-33, 36 AND 37, such a rack system 12 may include a first input diffusion assembly 30, a second input diffusion assembly 30 positioned below the first input diffusion assembly 30, a first plant support tray assembly 40 positioned above the second input diffusion assembly 30 and below the first input diffusion assembly 30 to form a first environmental cultivation chamber 22 therebetween, and a second plant support tray assembly 40 positioned below the second input diffusion assembly 30 to form a second environmental cultivation chamber 22 therebetween. In such an embodiment, a height of the first input diffusion assembly 30 relative to that of the second input diffusion assembly 30 may be fixed, a height of the first plant support tray assembly 40 relative to that of the second plant support tray assembly 40 may be fixed, a height of the first input diffusion assembly 30 relative to that of the first plant support tray 40 is adjustable such that a height of the first environmental cultivation chamber 22 is adjustable, and a height of the second input diffusion assembly 30 relative to that of the second plant support tray 40 is adjustable such that a height of the second environmental cultivation chamber 22 is adjustable, as shown in FIGS. 7-33, 36 and 37.

For example, as shown in FIGS. 7-33, 36 AND 37, the at least one frame supply plenum 24 may comprise a first length adjustable portion 28A positioned at least partially below the first input diffusion assembly 30 and above the first plant support tray 40 configured to adjust a height of the first input diffusion assembly 30 with respect to the first plant support tray 40, and a second length adjustable portion 28B positioned at least partially below the second input diffusion assembly 30 and above the second plant support tray 40 configured to adjust a height of the second input diffusion assembly 30 with respect to the second plant support tray 40. More specifically, as shown in FIGS. 7-33, 36 AND 37, the at least one frame supply plenum 24 comprises at least one first supply plenum 24A that comprises the first length adjustable portion 28A and is configured to direct the flow of supply airflow to the first input diffusion assembly 30, and at least one second supply plenum 24B that comprises the second length adjustable portion 28B and is configured to direct the flow of supply airflow to the second input diffusion assembly 30, the first and second supply plenums 245, 24 defining separate and distinct flow pathways of the supply airflow. In the exemplary illustrated embodiment, the rack system 12 include a pair first supply plenums 24A and a pair of second supply plenum 24B, each disposed at opposing lateral ends of the rack system 12, as shown in FIGS. 7-33, 36 AND 37.

As also shown in FIGS. 7-33, 36 AND 37, the rack system 12 may further comprise at least one pressure equalizing plenum portion 27 of a fixed height physically and fluidically coupled to, and extending between, an upper portion of the first length adjustable portion 28A of the at least one first frame supply plenum 24A and an upper portion of the second length adjustable portion 28B of the at least one second frame supply plenum 24B. The pressure equalizing plenum portion 27 may allow the pressure of the supply airflow flowing through the associated at least one first and second frame supply plenums 24A, 24B (at each lateral side of the rack system 12).

In some embodiments, the at least one first frame supply plenum 24A of the rack system 12 may further comprise a first fixed height plenum leg portion 29 that extends upwardly from the bottom side of the rack system 12 to the first length adjustable portion 28A, and/or the second supply plenum 24B may further comprise a second fixed length plenum leg portion 29B that extends upwardly from the bottom side of the rack system 12 to the second length adjustable portion 28, the first and second fixed height plenum leg portions 29A, 29B defining separate and distinct flow pathways for the flow of the supply airflow therethrough, as shown in FIGS. 7-33, 36 AND 37. In some such embodiments, the first fixed height plenum leg portion 29A includes at least one damper (not shown) therein configured to control the volumetric flow rate of the supply airflow flowing therethrough, and/or the second fixed height plenum leg portion 29B includes at least one damper (not shown) therein configured to control the volumetric flow rate of the supply airflow flowing therethrough.

As discussed above, the at least one supply base plenum 14 and the at least one frame supply plenum 24 is in fluid communication with the air conditioning unit 18 such that the air conditioning unit 18 forms a supply airflow that flows through and is directed/carried by the at least one supply base plenum 14 and the at least one frame supply plenum 24 to the at least one at least one input diffusion assembly 30 (see, for example, FIGS. 22-24) (the at least one input diffusion assembly 30 being physically supported by and fluidically coupled to the at least one frame supply plenum 24). As also noted above, the at least one input diffusion assembly 30 is configured to direct supply airflow flowing through the at least one frame supply plenum 24 that is fluidically coupled thereto downwardly from an underside thereof.

Figure 36:
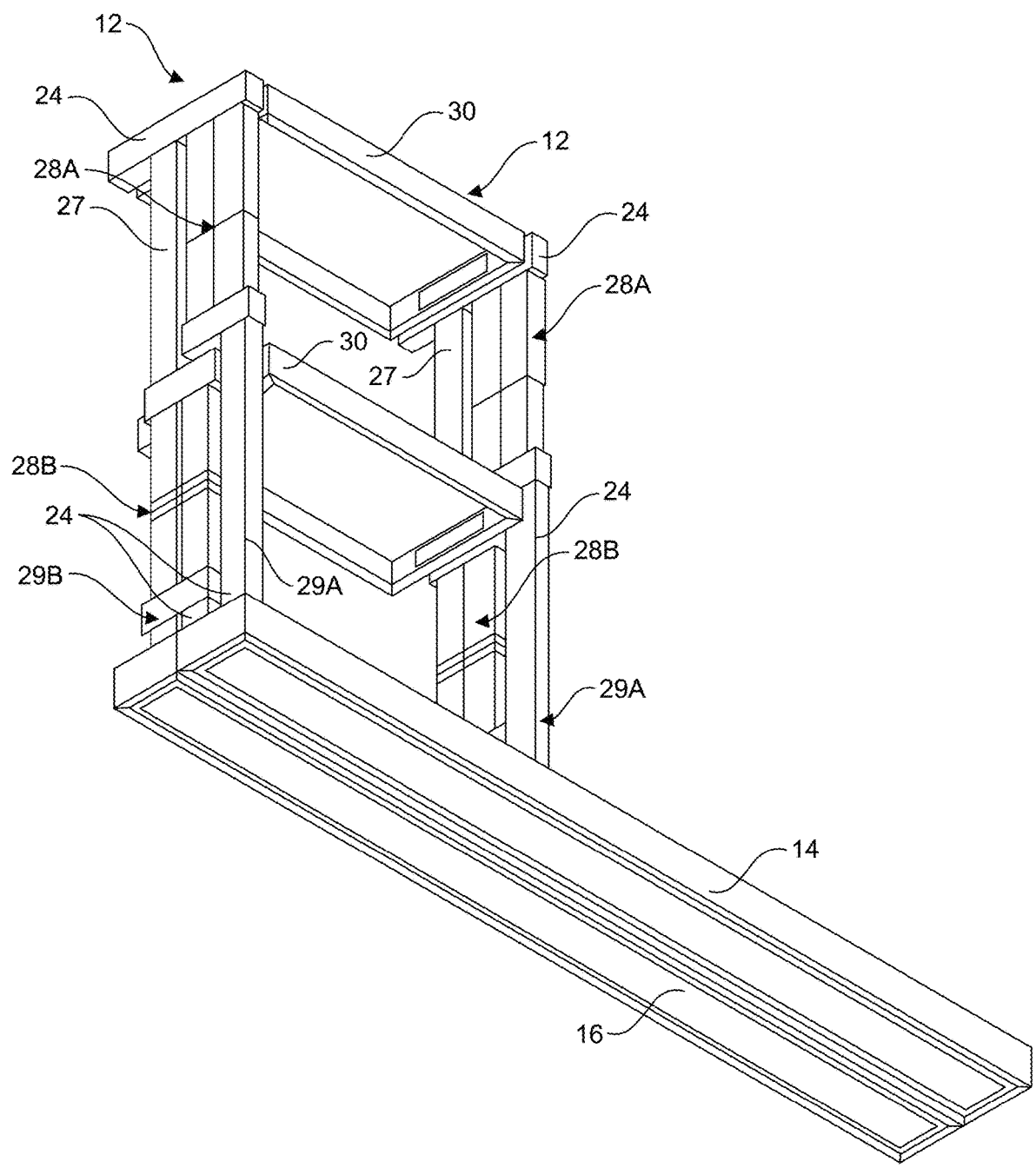
FIG. 36 illustrates a bottom front perspective view of a portion of input distribution assemblies and supply plenums of the first rack system of the first horticulture system of FIG. 1 according to one embodiment of the present disclosure.
Figure 37:
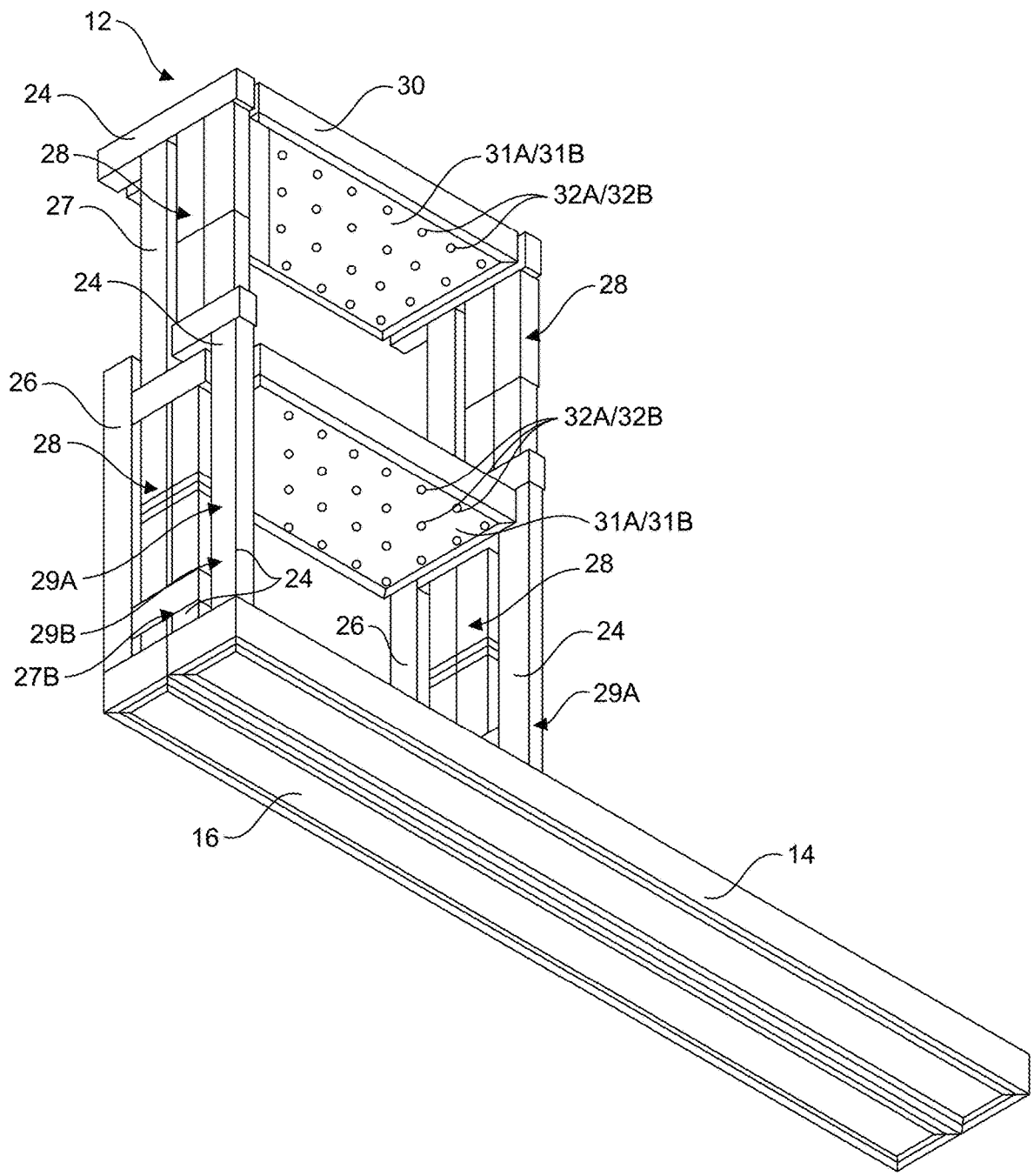
FIG. 37 illustrates the bottom front perspective view of the input distribution assemblies and supply plenums of the first rack system of FIG. 36 with at least one distribution plate installed according to one embodiment of the present disclosure

With reference to FIGS. 10, 12, 21, 22, 29, 30, 37 and 38, in some embodiments the at least one input diffusion assembly 30 comprises at least one diffusion plate 31A, 31B with a plurality of input apertures 32A, 32B in fluid communication with the at least one frame supply plenum 24 in fluid communication with the at least one input diffusion assembly 30 configured to direct the supply airflow flowing thereto downwardly therefrom toward the at least one plant support tray assembly 40. In some embodiments, the at least one diffusion plate 31A, 31B comprises a first diffusion plate 31A with a plurality of first input apertures 32A and a second diffusion plate 31A with a plurality of second input apertures 32B that are configured to at least partially overlap the plurality of first input apertures 32A, as shown in FIGS. 36 and 37. The first and second diffusion plates 31A, 31B may be movable coupled together such that the degree or nature of overlap between the first and second input apertures 32A, 32B is adjustable to adjust the velocity of the supply airflow flowing therethrough. For example, the first and second diffusion plates 31A, 31B may overly each other, and a sliding mechanism (electronically or manually controlled) may be configured to translate at least one of the first and second diffusion plates 31A, 31B with respect to the other (e.g., laterally and/or longitudinally) to adjust/alter the degree or nature of overlap of the first and second input apertures 32A, 32B to adjust the velocity of the supply airflow flowing therethrough. In some non-limiting examples, the sliding mechanism may comprise a track system with gear-driven pieces (e.g., using stepper motors), manually adjustable through ACME screw mechanisms or cranks, or layered panels floating/sliding on top of each other and manually adjusted over time.

In some embodiments, the at least one input diffusion assembly 30 (and/or the air conditioning unit 18) is configured such that the velocity of the supply airflow flowing through the plurality of input apertures 32A, 32B is within the range of about 25 ft/min to about 2,500 ft/min. In some embodiments, the at least one input diffusion assembly 30 (and/or the air conditioning unit 18) is configured such that the supply airflow flowing through the at least one environmental cultivation chamber 22 comprises a turbulent flow at a leaf canopy of plant(s) 21 on the at least one plant support tray assembly 40 with an average velocity of about 25 ft/min to about 1,000 ft/min.

Figure 38:
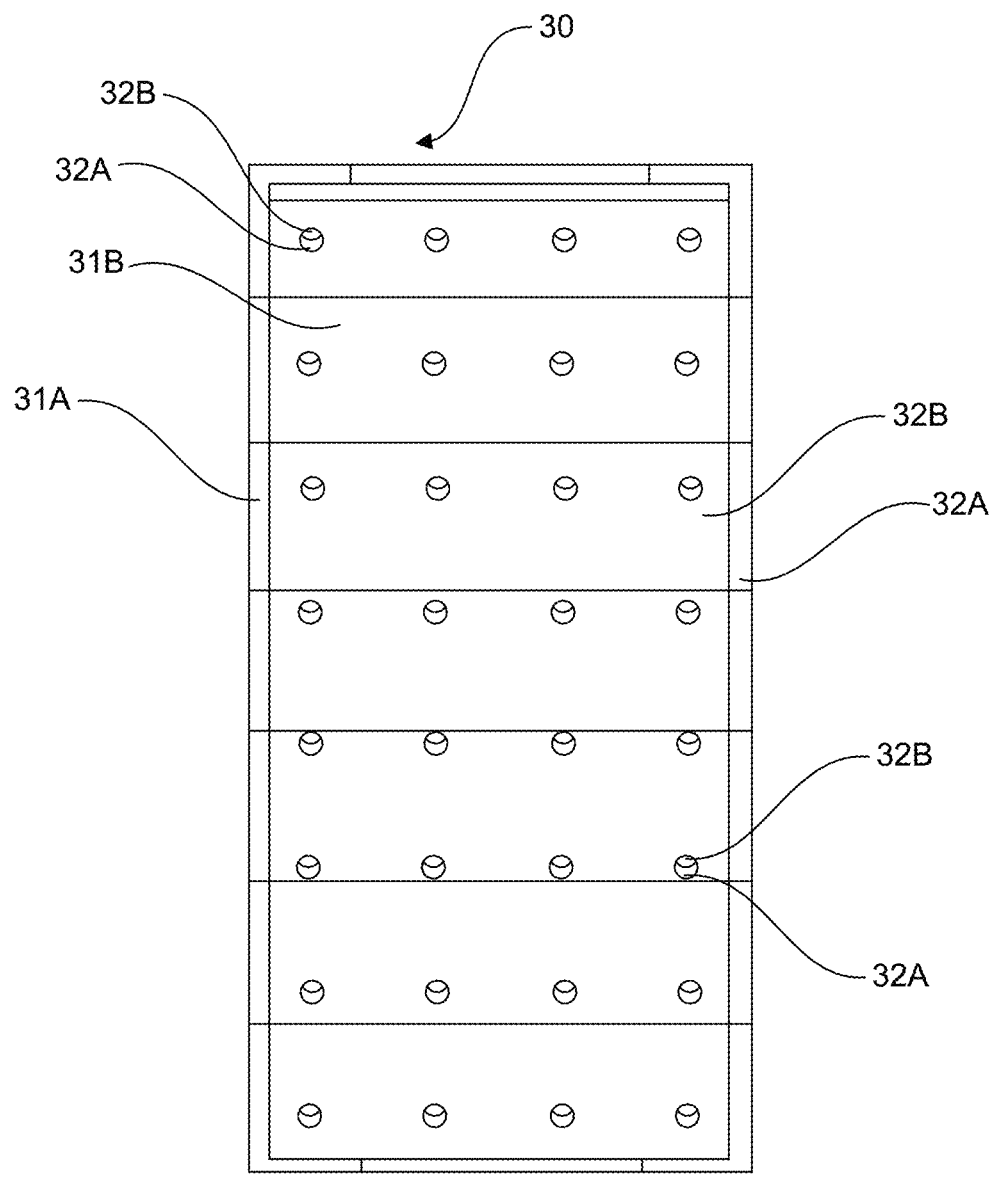
FIG. 38 illustrates a bottom view of an input distribution assembly of FIG. 36 according to one embodiment of the present disclosure.
Figure 39:
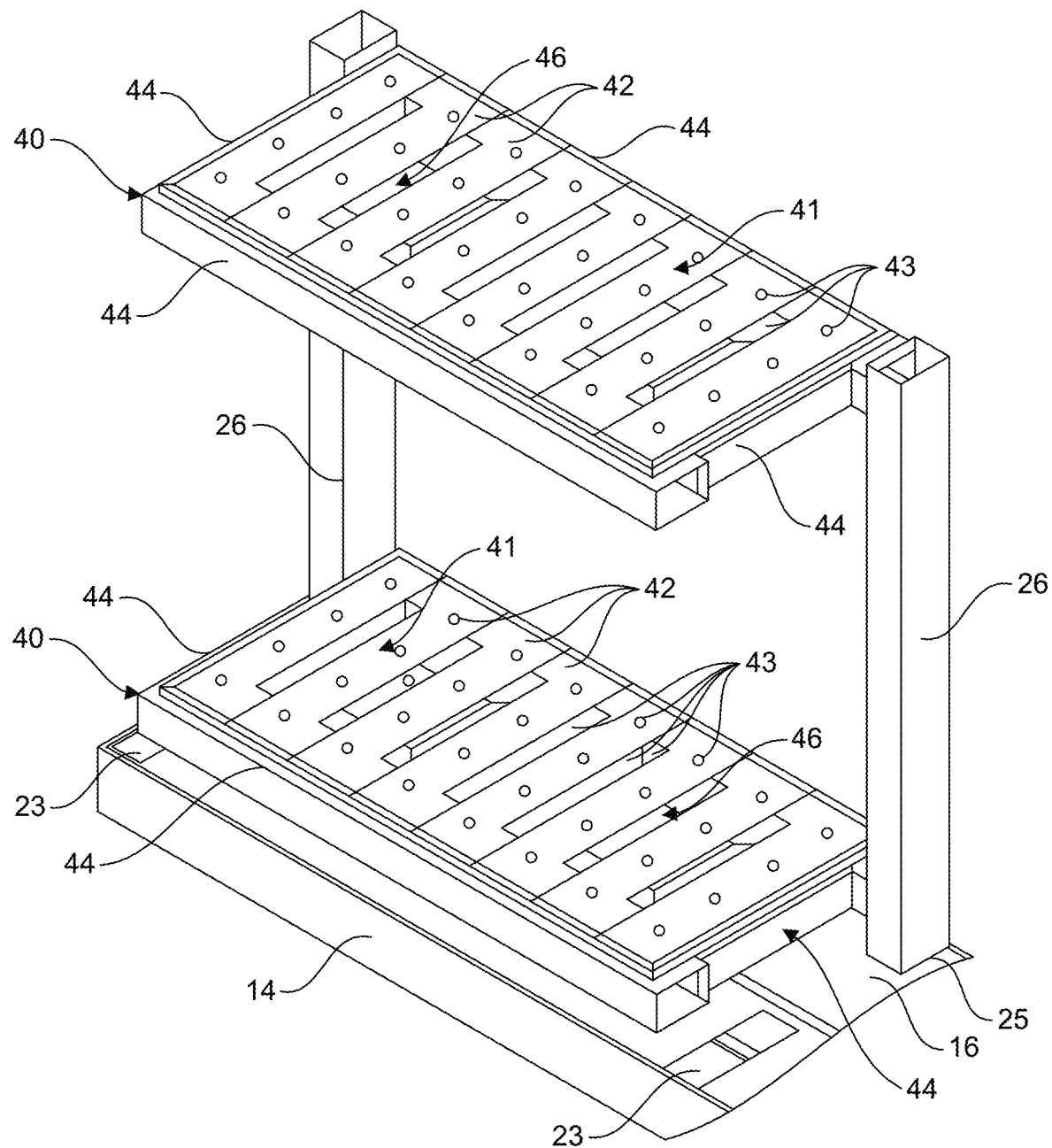
FIG. 39 illustrates an elevational back perspective view of plant support tray assemblies and return plenums of the first rack system of the first horticulture system of FIG. 1 according to one embodiment of the present disclosure.

As shown in FIG. 36, the at least one input diffusion assembly 30 includes comprises at least one input passageway 33 in communication with the at least one frame supply plenum 24 configured to direct/pass the flow of the supply airflow therethrough from the at least one frame supply plenum 24. For example, as shown in FIG. 36, the at least one input diffusion assembly 30 includes a pair of input passageways 33 at the lateral ends of the at least one input diffusion assembly 30 (and the rack system 12 itself) in communication with a pair of the frame supply plenums 24. As also shown in FIGS. 36-38, the at least one input diffusion assembly 30 includes an internal cavity 34 that is in fluid communication (i.e., fluidically coupled) with the plurality of input apertures 32A, 32B and in fluid communication with the at least one input passageway 33. In some embodiments, the internal cavity 34 is formed between a frame portion, a back panel portion and the at least one diffusion plate 31A, 31B, as shown in FIGS. 36-38.

In some embodiments, the at least one input passageway 33 extends directly between the internal cavity 34 and the at least one frame supply plenum 24 such that it includes at least one open end or aperture 35 that terminates at/in the internal cavity 34, as shown in FIG. 36. In some other embodiments (not shown), the input passageway extends along a length along the first lateral end, the second lateral end, the first longitudinal face, the second longitudinal face or a combination thereof. In such embodiments (not shown), the at least one input passageway 33 may include a plurality of the apertures 33 positioned along a combination of the lateral ends and longitudinal faces of the rack system 12. In some embodiments (not shown), the rack system 12 includes at least one filter or filter media extending over and/or within each aperture 35 in the at least one input passageway 33 that prevents particles larger than a predefined size, and/or predefined gases or materials, from flowing with the supply airflow into the internal cavity 34 and, ultimately, through the plurality of input apertures 32A, 32B of the at least one diffusion input plate 31A, 31B into the at least cultivation chamber 22.

The at least one environmental cultivation chamber 22 of the rack system 12 may include at least one lighting device positioned therein configured to emit light sufficient for horticulture. For example, in some embodiments, as shown in FIGS. 1 and 5-8, the at least one environmental cultivation chamber 22 of the rack system 12 may comprise at least one top lighting device 36 positioned proximate to the underside/at least one diffusion plate 31A, 31B of the at least one input diffusion assembly 30 and distal to the plant support side 41 of the at least one plant support tray assembly 40 such that the at least one top lighting device 36 is positioned at above a leaf canopy of one or more plants 21 within the at least one environmental cultivation chamber 22 (positioned on the support side 41 of the at least one plant support tray assembly 40). The at least one top lighting device 36 may be coupled to the at least one input diffusion assembly 30, such as to the underside and/or the at least one diffusion plate 31A, 31B thereof, for example. In some further embodiments, as also shown in FIGS. 1 and 5-8, the at least one environmental cultivation chamber 22 of the rack system 12 may comprise at least one bottom lighting device 38 positioned proximate to the support side 41 of the at least one plant support tray assembly 40 and distal to the underside/at least one diffusion plate 31A, 31B of the at least one input diffusion assembly 30 such that the at least one bottom lighting device 38 is positioned below a leaf canopy of one or more plants 21 within the at least one environmental cultivation chamber 22 (positioned on the support side 41 of the at least one plant support tray assembly 40). The at least one bottom lighting device 36 may be coupled to the at least one plant support tray assembly 40, such as to the plant support side 41 thereof, for example.

To retain the supply airflow in the at least one environment cultivation chamber 22, prevent contamination of the environment within the at least one environment cultivation chamber 22, and/or retain light emitted from the at least one lighting device of the rack system 12 within the at least one environment cultivation chamber 22, some embodiments of the rack system 12 may include a plurality of panels 13 that collectively extend about a periphery of at least a portion of the at least one environmental cultivation chamber to substantially enclose the at least one environmental cultivation chamber, as shown in FIGS. 1, 2 and 4-8. The plurality of panels 13 may extend about each environment cultivation chamber 22 of the rack system 12. In some embodiments, the plurality of panels 13 about a periphery of the at least one input diffusion assembly 30, the at least one plant support tray assembly 40 and the at least one environmental cultivation chamber 22 therebetween to substantially enclose the at least one environmental cultivation chamber 22. It is noted that some of the plurality of panels 13 of the exemplary rack system 12 illustrated in FIGS. 1, 2 and 4-8, and all the plurality of panels 13 of the exemplary rack system 12 in FIGS. 3 and 9-44, are not shown so that they do not obscure the details of the rack system 12 for explanatory purposes.

In some embodiments, the plurality of panels 13 are substantially solid such that they are configured to prevent the supply airflow flowing into the at least one environmental cultivation chamber 22 from the at least one input diffusion assembly 30 from flowing therethrough. In some embodiments, the plurality of panels 13 comprise a plurality of sealing panels that are coupled (e.g., removably or fixedly) to the rack system 12, such as coupled (directly or indirectly) to the at least one frame supply plenum 24, the at least one frame return plenum 26, the at least one input diffusion assembly 30 and/or the at least one plant support may be coupled to the rack system 12 via a support frame. In some embodiments, the plurality of panels 13 may not be coupled to the rack system 12 and/or may be spaced from the rack system 12. For example, the plurality of panels 13 may comprise walls and/or inner surfaces of a horticulture/grow room or enclosure. In some embodiments, the plurality of panels 13 may extend about at least a portion of one or more environmental cultivation chambers 22 of a plurality of rack systems 12, such as of a plurality of rack systems 12 of a particular horticulture system 10 or a plurality of differing/separate and distinct horticulture systems 10.

In some embodiments, the plurality of panels 13 extend over and/or along the lateral sides, the front and back faces and the top of each rack system 12 of the horticulture system 10. At least some of the plurality of panels 13 may be removably or movable coupled to the rack system 12 such that the can be opened to provide ingress and egress into/from the rack system 12, such as into/from the at least one environment cultivation chamber 22. In some embodiments, the plurality of panels 13 each comprise an inner surface that faces the at least one environmental cultivation chamber 22 and is configured to reflect at least about 75% of light emitted from the at least one lighting device. In some such embodiments, the plurality of panels 13 are light-proof.

Figure 6:
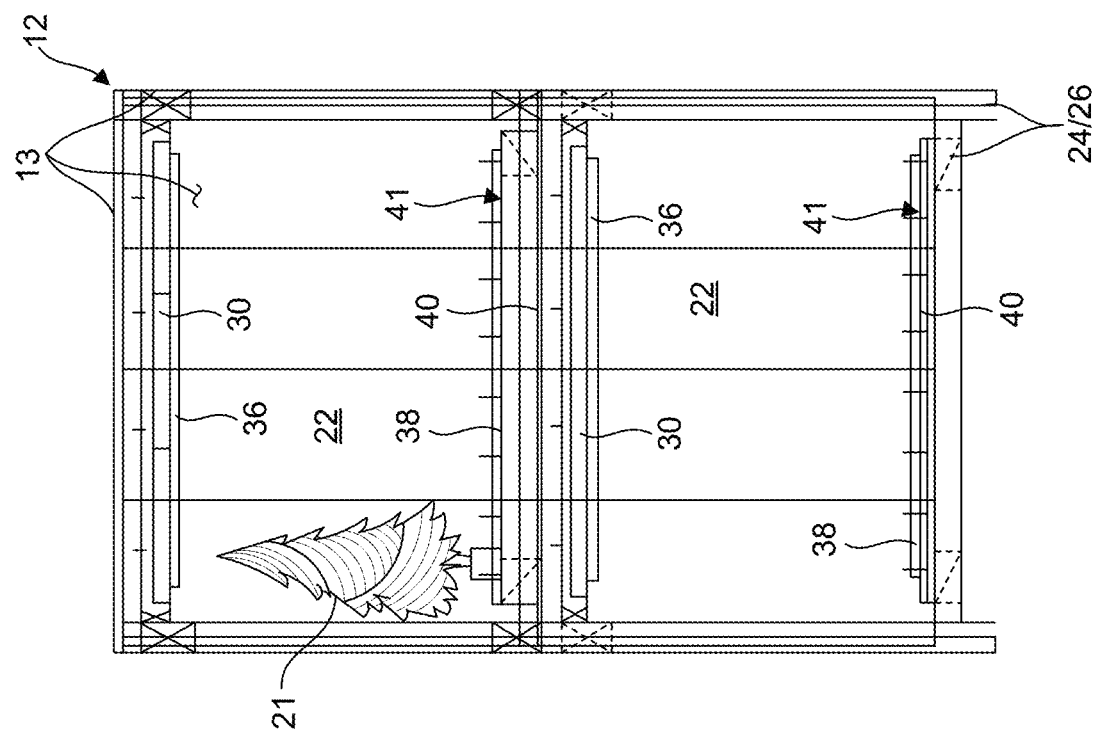
FIG. 6 illustrates a front view of the first rack system of FIG. 5 with the environmental cultivation chambers adjusted to a second height to accommodate one or more relatively tall plants according to one embodiment of the present disclosure.

As shown in FIGS. 1, 4-9, 11, 13, 14, 17-20, 23-28, 31-33, 39, 44 and 45, the at least one plant support tray assembly 40 of each rack system 12 of the horticulture systems 10 includes an support side 41 that is positioned within the at least one environmental cultivation chamber 22 and that faces the underside/at least one diffusion plate 31A, 31B of the at least one input diffusion assembly 30 positioned immediately above the respective plant support tray assembly 40. The support side 41 provides a side/surface on which plants 21 can be placed and grow within the at least one environmental cultivation chamber 22, as shown in FIGS. 1, 5 and 6. In some embodiments, the support side 41 may comprise a substantially planar surface or surfaces. In some embodiments, the at least one plant support tray assembly 40 may include one or more projections extending upwardly therefrom.

Figure 43:
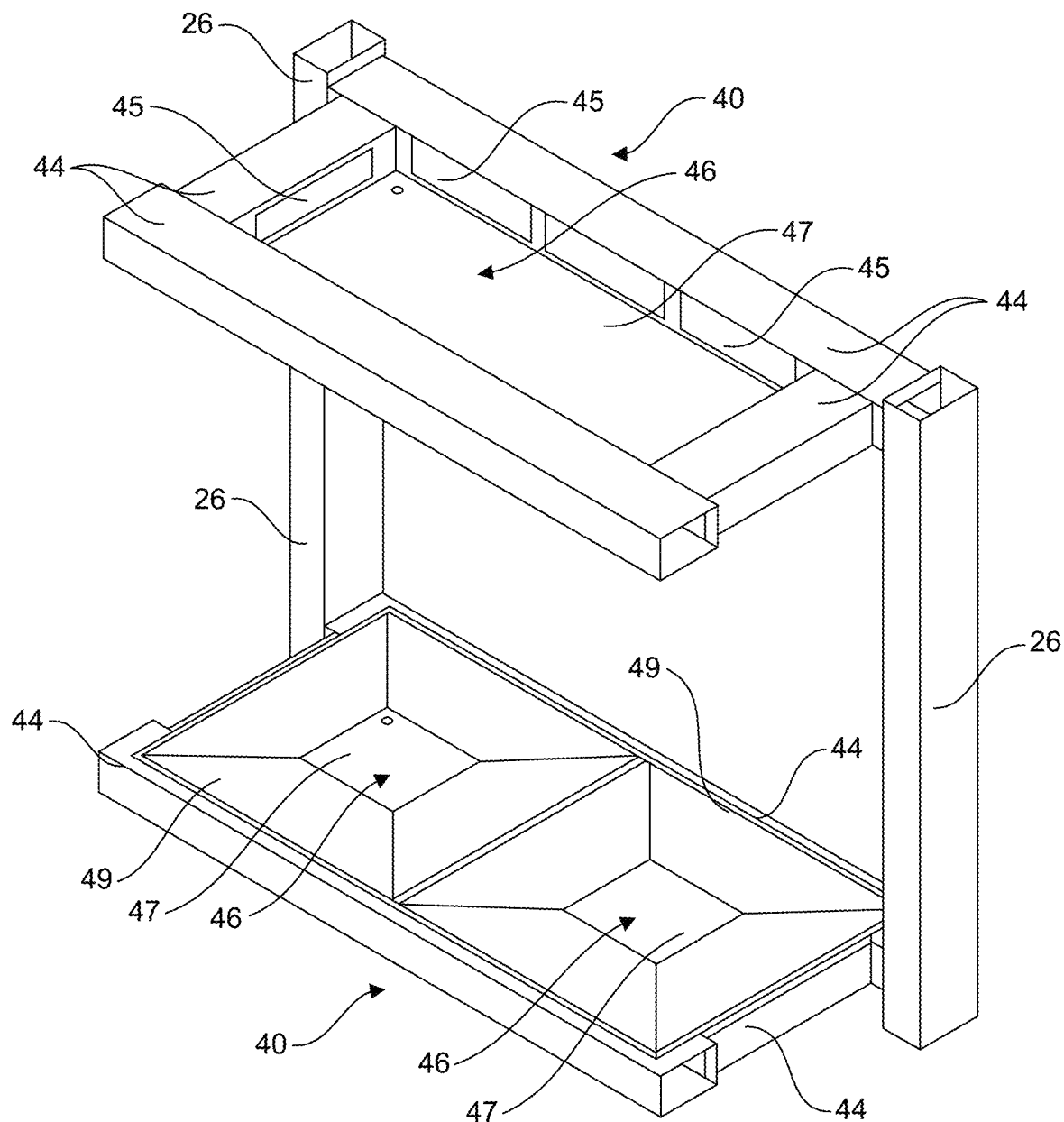
FIG. 43 illustrates an elevational back perspective view of another portion of the plant support tray assemblies and the return plenums of FIG. 39 according to one embodiment of the present disclosure.
Figure 44:
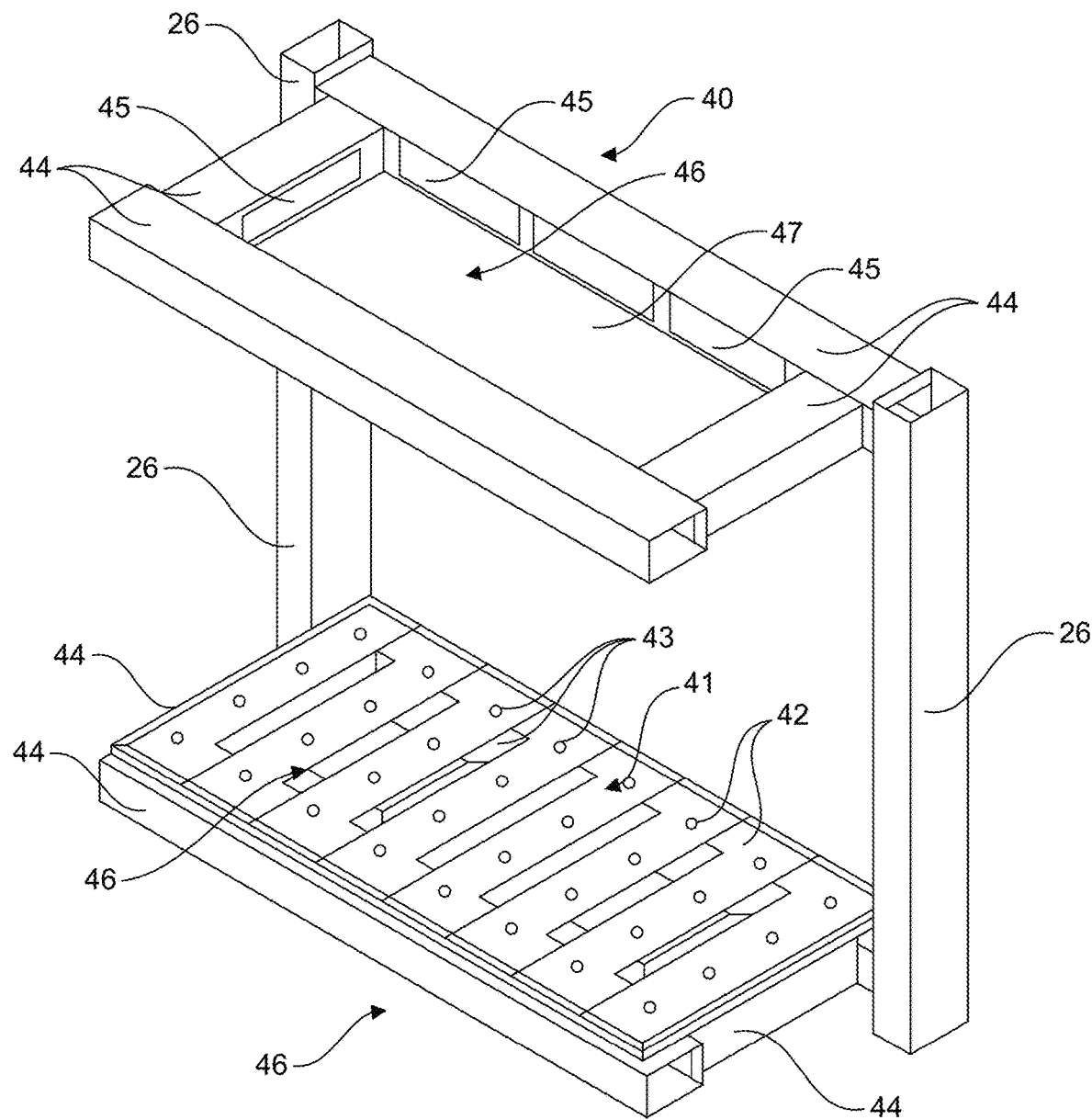
FIG. 44 illustrates an elevational back perspective view of another portion of the plant support tray assemblies and the return plenums of FIG. 39 according to one embodiment of the present disclosure.
Figure 45:
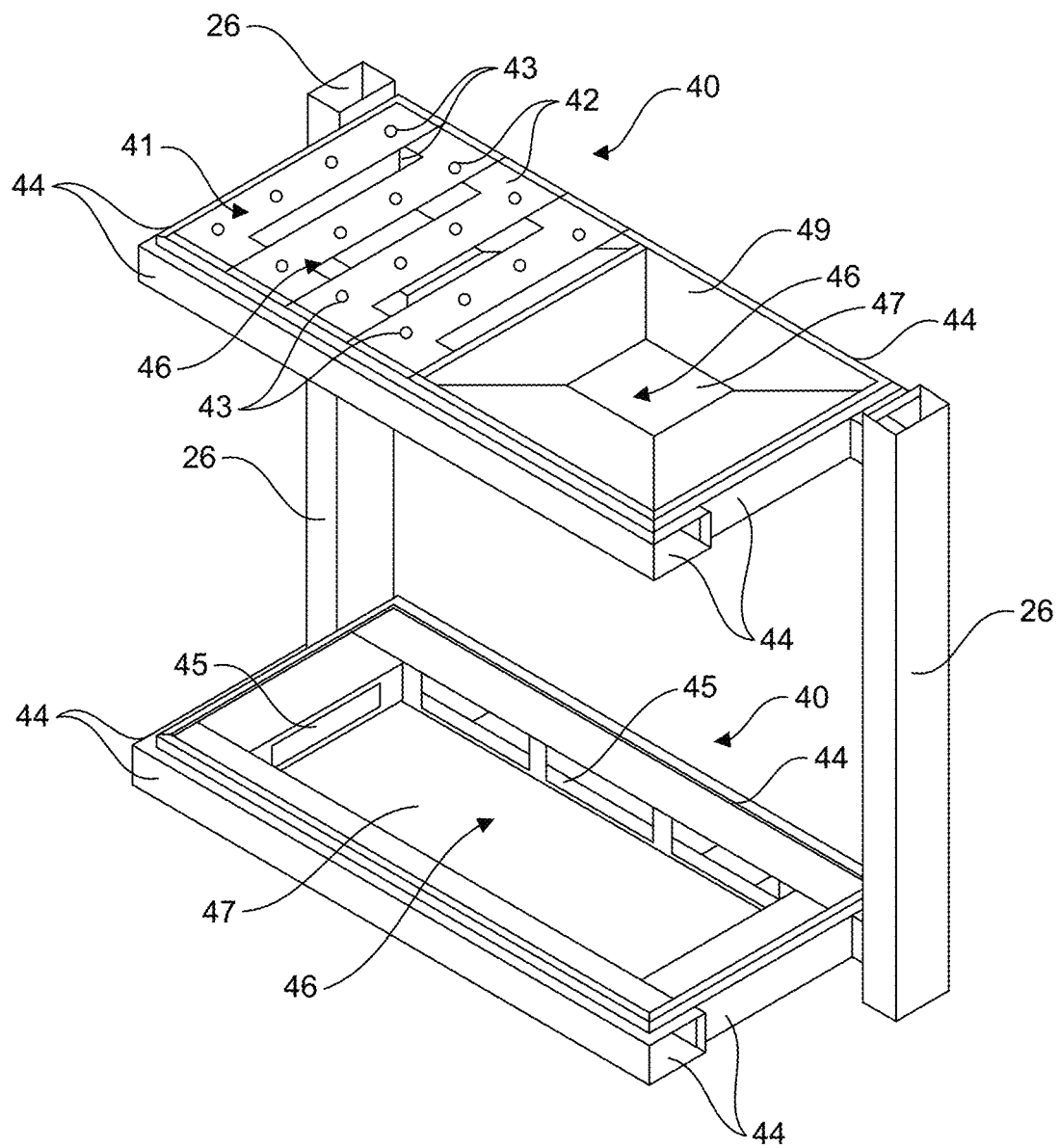
FIG. 45 illustrates an elevational back perspective view of another portion of the plant support tray assemblies and the return plenums of FIG. 39 according to one embodiment of the present disclosure.

As shown in FIGS. 38, 43 and 44, in some embodiments the at least one plant support tray assembly 40 comprises a plant support platform 42 that defines the support side 41. The plant support platform 42 includes a plurality of return apertures 43 extending therethrough. The plurality of return apertures 43 allow for the supply airflow that flows past the plants 21 to flow therethrough as the return airflow. The plurality of return apertures 43 also allow for water (or other liquids and gases) to flow through the plant support platform 42 and off/past/through the support side 41. In some embodiments, the plurality of return apertures 43 include apertures that are configured to be positioned underneath a plant 21 growing on the support side 41 in the at least one environmental cultivation chamber 22, such as to allow water/liquid to flow therefrom into the respective plant support tray assembly 40 and/or gases to flow to the underside/roots of the plants 21. The plurality of return apertures 43 may include apertures that are configured to be positioned at least partially between/adjacent plants 21 growing on the support side 41 in the at least one environmental cultivation chamber 22, such as to allow water/liquid to flow therefrom into the respective plant support tray assembly 40 and/or gases to flow to the underside/roots of the plants 21.

As shown in FIGS. 38, 43 and 44, in some embodiments, the plant support platform 42 of the at least one plant support tray assembly 40 comprises a plurality of removable slats or like members. In some other embodiments, the plant support platform 42 comprises an integral member or assembly, and/or may or may not be removable. In some embodiments, the plant support platform 42 of the at least one plant support tray assembly 40 may include at least one screen, mesh, filter or other substantially porous material/member (not shown) that extends across one or more (e.g., all or each) of the plurality of return apertures 43. For example, the at least one screen (not shown) may extend across a plurality of the return apertures 43 that are configured to be positioned at least partially between/adjacent plants 21 growing on the support side 41 in the at least one environmental cultivation chamber 22. The at least one screen (not shown) can be configured to allow for the flow of the return airflow therethrough, but prevent material (e.g., solids) that is smaller than the plurality of return apertures 43 from flowing therethrough.

As shown in FIGS. 38-44, in some embodiments, the at least one plant support tray assembly 40 further comprises at least one return passageway 44 configured to direct and contain a flow of the return airflow therethrough to the at least one frame return plenum 26. The return passageway 44 may thereby being in fluid communication with the at least one frame return plenum 26, and may be physically supported thereby. In the exemplary illustrated embodiment, the return passageway 44 of each plant support tray assembly 40 is in fluid communication with a unique/differing pair of frame return plenums 26. The return passageway 44 (and thereby a plant support tray assembly 40 itself) may be physically coupled to and supported by one or more frame return plenums 26 in fluid communication therewith, and/or one or more frame return plenums 26 not in fluid communication therewith.

In some embodiments, the return passageway 44 of the at least one plant support tray assembly 40 may comprise a casing or frame formed by one or more plenums/ducts. The return passageway 44 may extend along a length one or more of the lateral sides of the rack system 12 and/or one or more of the longitudinal faces of the rack system 12. As shown in FIGS. 38-44, the at least one plant support tray assembly 40 may include or form an internal cavity 46 that is in fluid communication with the plurality of return apertures 43 of the plant support platform 42 and the return passageway 44 via at least one through hole 45 in the return passageway 44. In such embodiments, the internal cavity 46 is thereby in fluid communication with the return passageway 44.

As shown in FIGS. 38, 39 and 42-44, in one embodiment the internal cavity 46 may be formed by/between the input passageway 44, the underside of the plant support platform 42 (e.g., extending over and/or within the input passageway 44) and pan or bottom platform 47 (e.g., extending over and/or within the input passageway 44). As shown in FIGS. 39 and 42-44, in some embodiments, the input passageway 44 may include a plurality of the through holes 45, such as at least one through hole 45 positioned along the lengths of the return passageway 44 extending along each of the lateral ends and the longitudinal faces of the rack system 12.

Figure 40:
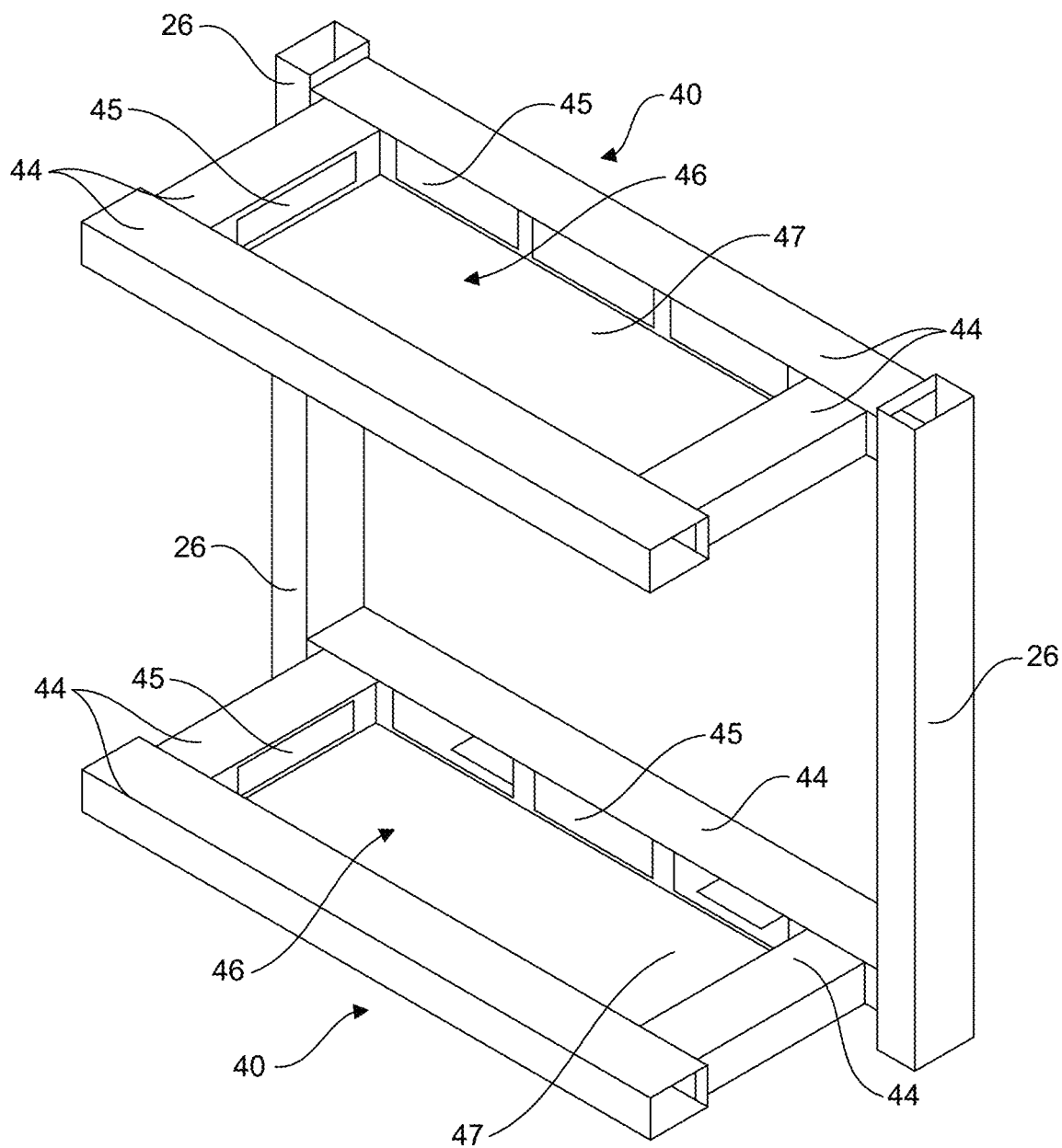
FIG. 40 illustrates an elevational back perspective view of a portion of the plant support tray assemblies and the return plenums of FIG. 39 according to one embodiment of the present disclosure.
Figure 41:
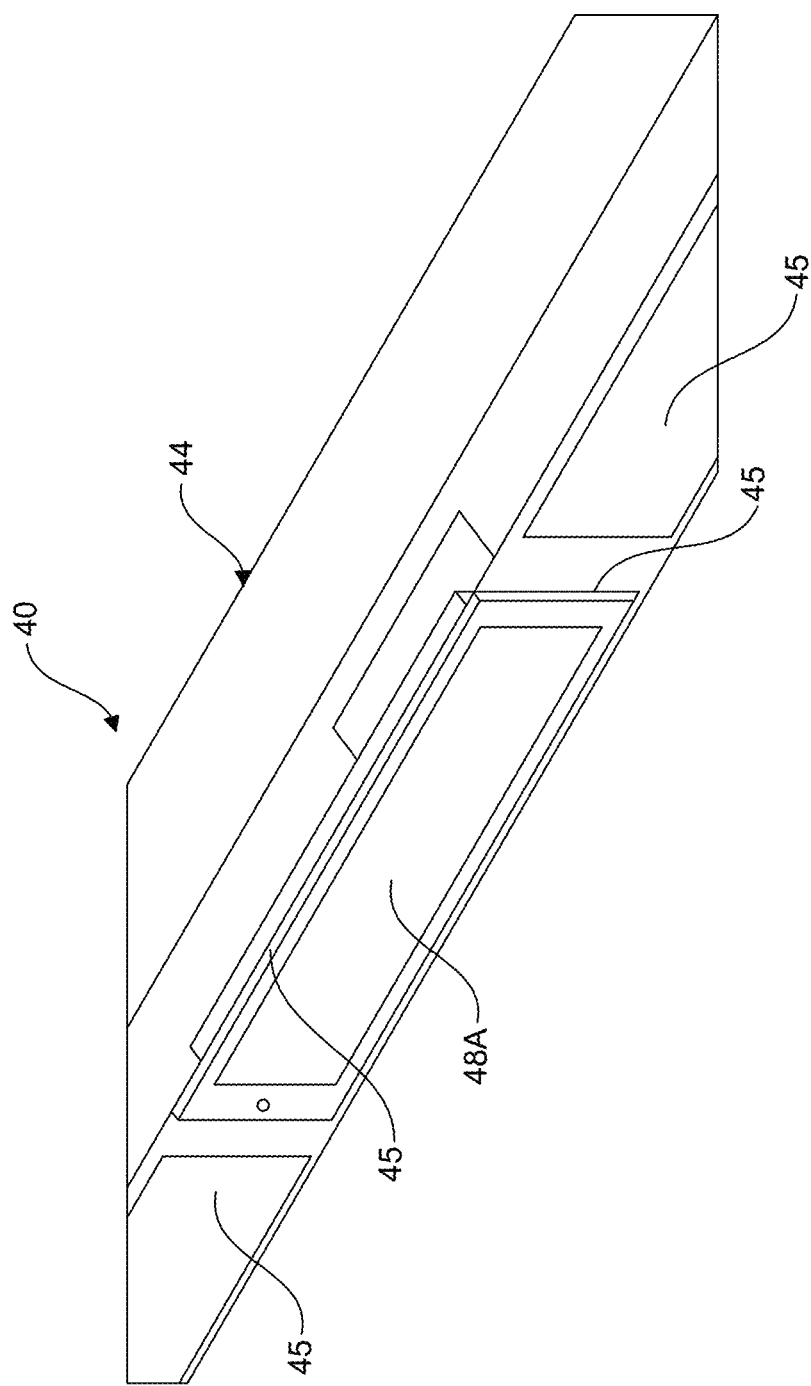
FIG. 41 illustrates an elevational back perspective view of a first filter installed in an airflow aperture of a plant support tray assembly of FIG. 39 according to one embodiment of the present disclosure.

As shown in FIGS. 40 and 41, the at least one through hole 45 of the at least one return passageway 44 may include at least one filter/filter media 48A, 48B extending therein/thereover such that the return airflow, and any other gases, liquids or solids flowing/translating through the plurality of return apertures 43 and the internal cavity 46, must flow/translate through the at least one filter/filter media 48A, 48B to travel into the at least one frame return plenum 26 in fluid communication with the input passageway 44. As discussed above, the at least one frame return plenum 26 is in fluid communication with the return base plenum 16, and the return base plenum 16 in fluid communication with the air conditioning unit 18. As explained further below, the air conditioning unit 18 is configured to condition/configure the return airflow flowing thereto, and form the supply airflow therewith. The horticulture system 10 is thereby a substantially closed loop system that recycles the return airflow (after conditioning it) flowing through the at least one environmental cultivation chamber 22 back to the one environmental cultivation chamber 22. In this way, the at least one filter/filter media 48A, 48B is configured to filter out certain predefined particles, liquids and/or gases that may be produced within the at least one environmental cultivation chamber 22 (e.g., by the plants 21 growing therein) or is otherwise introduced into the at least one environmental cultivation chamber 22 (or another part of the closed loop) from returning to the at least one environmental cultivation chamber 22 in the supply airflow. It is also noted that the pan or bottom platform 47 in the bottom portion of the internal cavity 46 may also trap or collect particles, liquids and/or gases and prevent them from flowing into the at least one return passageway 44, such as due to the pan or bottom platform 47 being lower than and/or offset from the at least one through hole 45 in the at least one return passageway 44. The pan or bottom platform 47 may comprise a drain pan, and include at least one opening for the flow/translation of material out of the internal cavity 46.

As shown in FIGS. 40 and 41, in some embodiments, the at least one through hole 45 of the at least one return passageway 44 may include a first filter/filter media 48A extending therein/thereover that is configured to filter/block first solids, liquid and/or gases, and a second filter/filter media 48B extending over/within the first filter media 48A that is configured to filter/block second solids, liquid and/or gases that differ from the first solids, liquid and/or gases. For example, in one embodiment, the first filter/filter media 48A may comprise a particulate filter (which may be composite in construction) configured to filter relatively larger particulate and/or provide gas phase filtration, and the second filter/filter media 48B may comprise a particulate filter configured to filter relatively small to sub-microscopic particulate. In some embodiments, the at least one filter/filter media 48A, 48B comprises a high-efficiency particulate air (HEPA) filter, or a higher grade filter.

Figure 42:
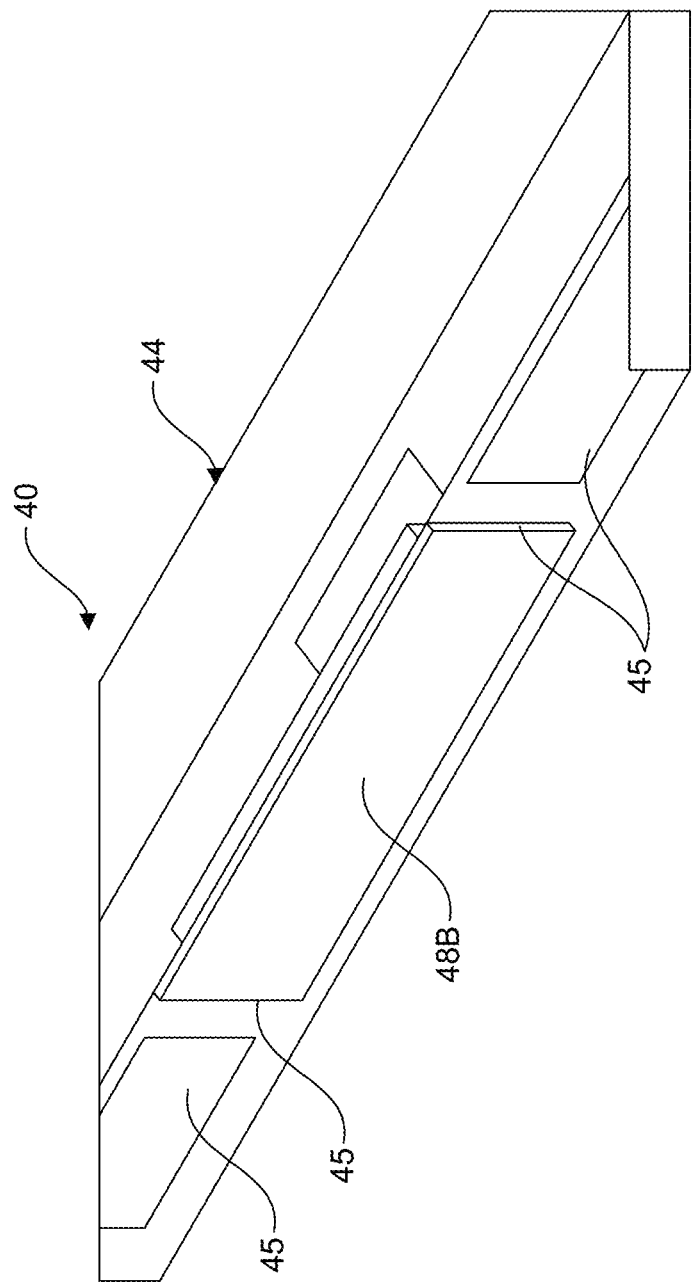
FIG. 42 illustrates an elevational back perspective view of the first filter and a second filter installed in the airflow aperture of the plant support tray assembly of FIG. 41 according to one embodiment of the present disclosure.

In some embodiments, as shown in FIGS. 42 and 44, the at least one plant support tray assembly 40 may further comprise at least one deflector plate 49 positioned between the plant support platform 42 and the internal cavity 46. The at least one deflector plate 49 includes upper deflector surfaces that extend downwardly and into a central/medial/interior portion of the internal cavity 46 as they extend away from the perimeter of the at least one plant support tray assembly 40 (and/or the lateral ends and the longitudinal of the first rack system 12) to an opening that is in communication with the internal cavity 46. The at least one deflector plate 49 is thereby configured to direct/shape/encourage the supply airflow to flow into the central/medial/interior portion of the at least one plant support tray assembly 40, which may assist in directing the return airflow into the internal cavity 46 and/or direct the supply airflow through the interior of the canopy of plants 21 growing on the support side 41.

As discussed above and with reference to FIGS. 1-4, the air conditioning system, and in particular the air conditioning unit 18, is configured to force the supply airflow from an air conditioning passageway 19 extending through the air conditioning unit 18 through the at least one supply base plenum 14, through the at least one frame supply plenum 24, through the at least one input diffusion assembly 30, and through the at least one environmental cultivation chamber 22 to the at least one plant support tray assembly 40 under positive pressure. The air conditioning system, and in particular the air conditioning unit 18, is also configured to draw the return airflow through the at least one plant support tray assembly 40, through the at least one frame return plenum 26, through the at least one return base plenum 16, and into the air conditioning passageway 19 of the air conditioning unit 18 under negative pressure.

More specifically, as shown in FIGS. 1-4, the air conditioning passageway 19 of the air conditioning unit 18 includes a fan 20 fluidically coupled to at least one frame supply plenum 24 via the at least one supply base plenum 14, and fluidically coupled to the at least one frame return plenum 26 via at least one return base plenum 16. The fan 20 is thereby configured to generate the supply airflow and force the supply airflow through a portion of the air conditioning passageway 19 (downstream of the fan 20), the at least one supply base plenum 14, the at least one frame supply plenum 24 and the input diffusion assembly 30 and under positive pressure, and draw the return airflow through the at least one plant support tray assembly 40, the at least one frame return plenum 26, the at least one return base plenum 16 and a portion of the air conditioning passageway 19 (upstream of the fan 20) under negative pressure.

The horticulture system 10 thereby generates a positive pressure in the at least one environmental cultivation chamber 22, and maintains the positive pressure. At least in part to maintain the positive pressure in the at least one environmental cultivation chamber 22, and to maintain a high flow rate and velocity of the supply airflow through the at least one environmental cultivation chamber 22, the fan 20 may comprise a variable speed fan. The air conditioning unit 18 can be configured to vary the rotational speed of the fan 20 to maintain a selected constant volumetric flow rate of the supply airflow flowing through the at least environmental cultivation chamber 22 (and into the at least one plant support tray assembly 40 and/or the at least one frame return plenum 26). For example, build up in one or more filters in the flowpath of the supply and/or return airflow (e.g., the at least one filter 82A, 82B in the within the at least one plant support tray assembly 40), and an increase in plant density in the at least environmental cultivation chamber 22, may increase the flow resistance/friction/head loss of the supply and return airflows through the horticulture system 10.

To account for such variations in the flow resistance/friction/head loss experienced by the supply and return airflows, the air conditioning unit 18 can be configured to vary the rotational speed of the fan 20 to maintain a selected or desired volumetric flow rate (and thereby positive pressure) of the supply airflow into/through the at least environmental cultivation chamber 22 (or at least a specified location in the at least environmental cultivation chamber 22, such as at location at a plant canopy of plants 21 growing therein). In some embodiments, the air conditioning unit 18 is configured to vary the rotational speed of the fan 20 to maintain a selected or desired volumetric flow rate (and thereby positive pressure) into/through the at least environmental cultivation chamber 22 within the range of about 300 ft$^3$/min to about 1,000 ft$^3$/min. In some embodiments, the air conditioning unit 18 is configured to vary the rotational speed of the fan 20 to maintain a selected or desired volumetric flow rate (and thereby positive pressure) of the supply airflow flowing through the air conditioning passageway in/through the air conditioning passageway 19 within the range of about 300 ft$^3$/min and about 5,000 ft$^3$/min.

It is noted that the flowpath loop of the supply airflow and the return airflow through the horticulture system 10, and in particular through the at least environmental cultivation chamber 22, may not be hermetically sealed. For example, at least some of the supply airflow introduced into the at least environmental cultivation chamber 22 via the at least one input diffusion assembly 30 may be lost, such as flowing through the plurality of panels 13 and the rack system(s) 12 into the environment about the horticulture system 10. The horticulture system 10 is configured to provide sufficient volumetric flow of the supply airflow into the at least environmental cultivation chamber 22 such that the positive pressure is maintained and the plants 21 growing therein receive sufficient air flow, such as a volumetric flow and/or flow velocity of the supply airflow that removes the boundary layer from a vast majority of the leaves of the plants 21. In some embodiments, the air conditioning unit 18 is configured to exchange the air within the at least environmental cultivation chamber 22 at least about 400 times (air changes) per hour, such as within the range of about 500 to about 600 times (air changes) per hour. In some embodiments, the rack system 12 and the air conditioning unit 18 are configured such that the positive and negative pressures applied by the fan 20 are effective in forcing at least 75% of the volume of the supply airflow flowing into the at least one environmental cultivation chamber 22 to flow into the at least one plant support tray assembly 40. The rack system 12, the at least one return base plenum 16, the air conditioning system 18, and the at least one supply base plenum 14 form a substantially closed airflow loop comprising the supply airflow and the return airflow such that at least 75% of the volumetric airflow of the supply airflow in the air conditioning passageway 19 of the air conditioning unit returns to the air conditioning passageway 19 as the return airflow. To account for losses of the supply and/or return airflow, in some embodiments the at least one frame return plenum 26, the at least one return base plenum 16 and the conditioning passageway 19 upstream of the fan 20 includes at least one air inlet aperture, which may comprise a filter, that is in fluid communication with the environment extending about the horticulture system 10. The horticulture system 10 may thereby introduce additional air into the horticulture system 10, if necessary.

The air conditioning unit 18 may also condition the return airflow prior to forming the supply airflow and/or introducing the supply airflow into the at least one environmental cultivation chamber 22. For example, in some embodiments, as shown in FIGS. 1-4, the air conditioning unit 18 may comprise at least one cooling coil 50 within the air conditioning passageway 19 such that the return airflow flowing therethrough flows over the at least one cooling coil 50. In such embodiments, the air conditioning unit 18 may be configured to control the temperature of the at least one cooling coil 50 such that the supply airflow flowing into/through the at least one environmental cultivation chamber 22 is maintained at a selected absolute humidity level. For example, the air conditioning unit 18 may be configured to control the temperature of the at least one cooling coil 50 such that the supply airflow flowing at a particular location in the least one environmental cultivation chamber 22 is maintained at a selected absolute humidity level. In some such embodiments, the particular location in the least one environmental cultivation chamber 22 may correspond to a location within the canopy of the plants 21 growing in the least one environmental cultivation chamber 22. In some embodiments, the particular location may comprise a sensor location of a sensor that is configured to detect and/or deduce the absolute humidity level.

As also shown in FIGS. 1-4, in some embodiments, the air conditioning unit 18 may comprise at least one heating coil 52 within the air conditioning passageway 19 downstream of the at least one cooling coil 50 such that the return airflow flowing therethrough flows over the at least one heating coil 52. In such embodiments, the air conditioning unit 18 may be configured to control the temperature of the at least one heating coil 52 such that the supply airflow flowing into/through the at least one environmental cultivation chamber 22 is maintained at a selected temperature. For example, the air conditioning unit 18 may be configured to control the temperature of the at least one heating coil 52 such that the supply airflow flowing at a particular location in the least one environmental cultivation chamber 22 is maintained at a selected temperature. In some such embodiments, the particular location in the least one environmental cultivation chamber 22 may correspond to a location within the canopy of the plants 21 growing in the least one environmental cultivation chamber 22. In some embodiments, the particular location may comprise a location of a sensor that is configured to detect and/or deduce the temperature.

In some embodiments, the air conditioning unit 18 may comprise a humidifier (not shown) that is configured to control the absolute humidity of the supply airflow flowing into/through the at least one environmental cultivation chamber 22, such as at a location particular in the at least one environmental cultivation chamber 22. In some such embodiments, the particular location in the least one environmental cultivation chamber 22 may correspond to a location within the canopy of the plants 21 growing in the least one environmental cultivation chamber 22. In some embodiments, the particular location in the least one environmental cultivation chamber 22 may comprise a sensor location of a sensor that is configured to detect and/or deduce the absolute humidity. In some embodiments, the air conditioning unit 18 may comprise a carbon dioxide source (not shown), and the air conditioning unit 18 may be configured to selectively introduce carbon dioxide from the carbon dioxide source into the at least one environmental cultivation chamber 22. In some embodiments, the air conditioning unit 18 may comprise an oxygen source (not shown), and the air conditioning unit 18 may be configured to selectively introduce oxygen from the oxygen source into the at least one environmental cultivation chamber 22.

Figure 46:
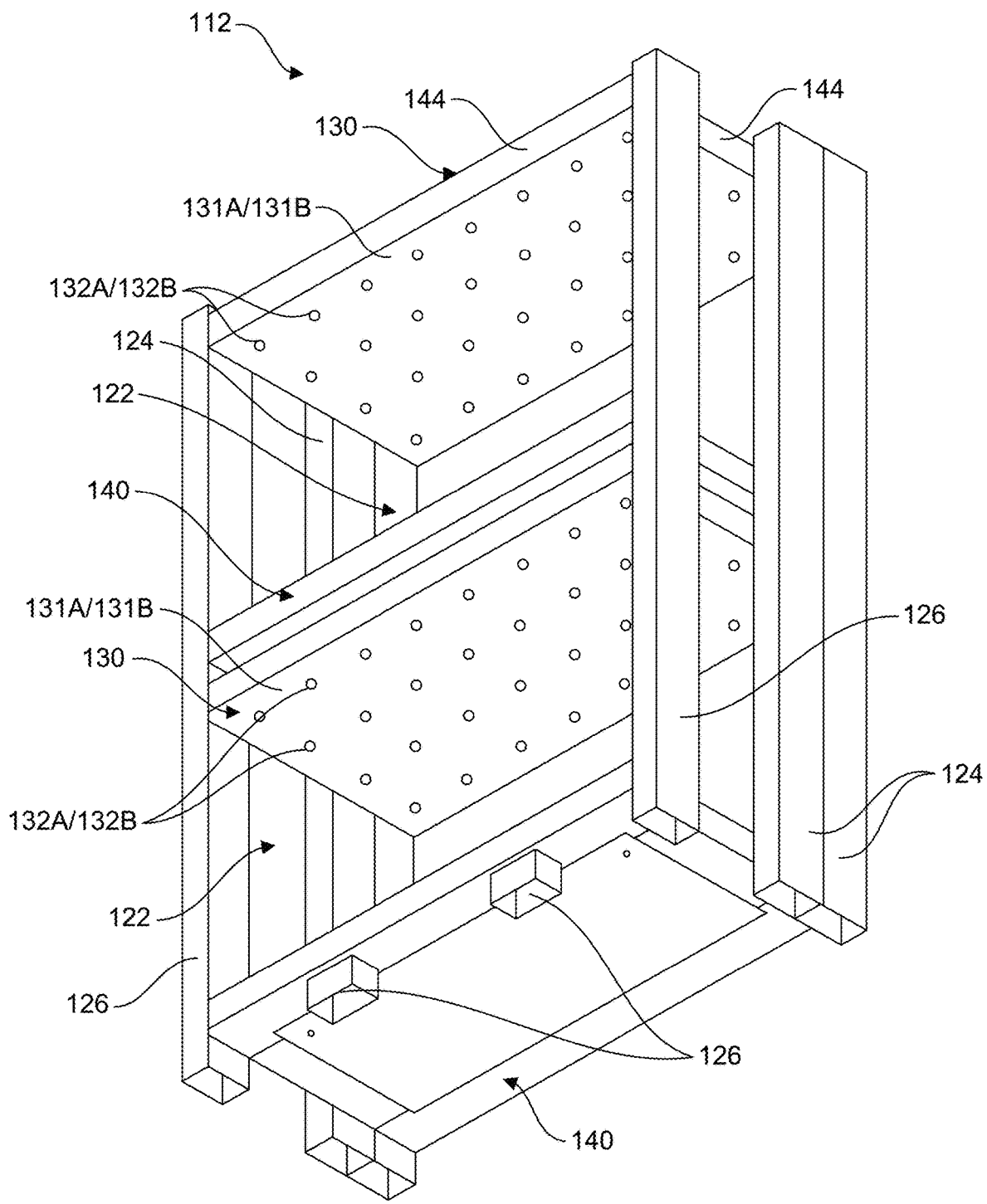
FIG. 46 illustrates a bottom front perspective view of a fixed-height, two-level air handling rack system for a horticulture system according to one embodiment of the present disclosure.
Figure 47:
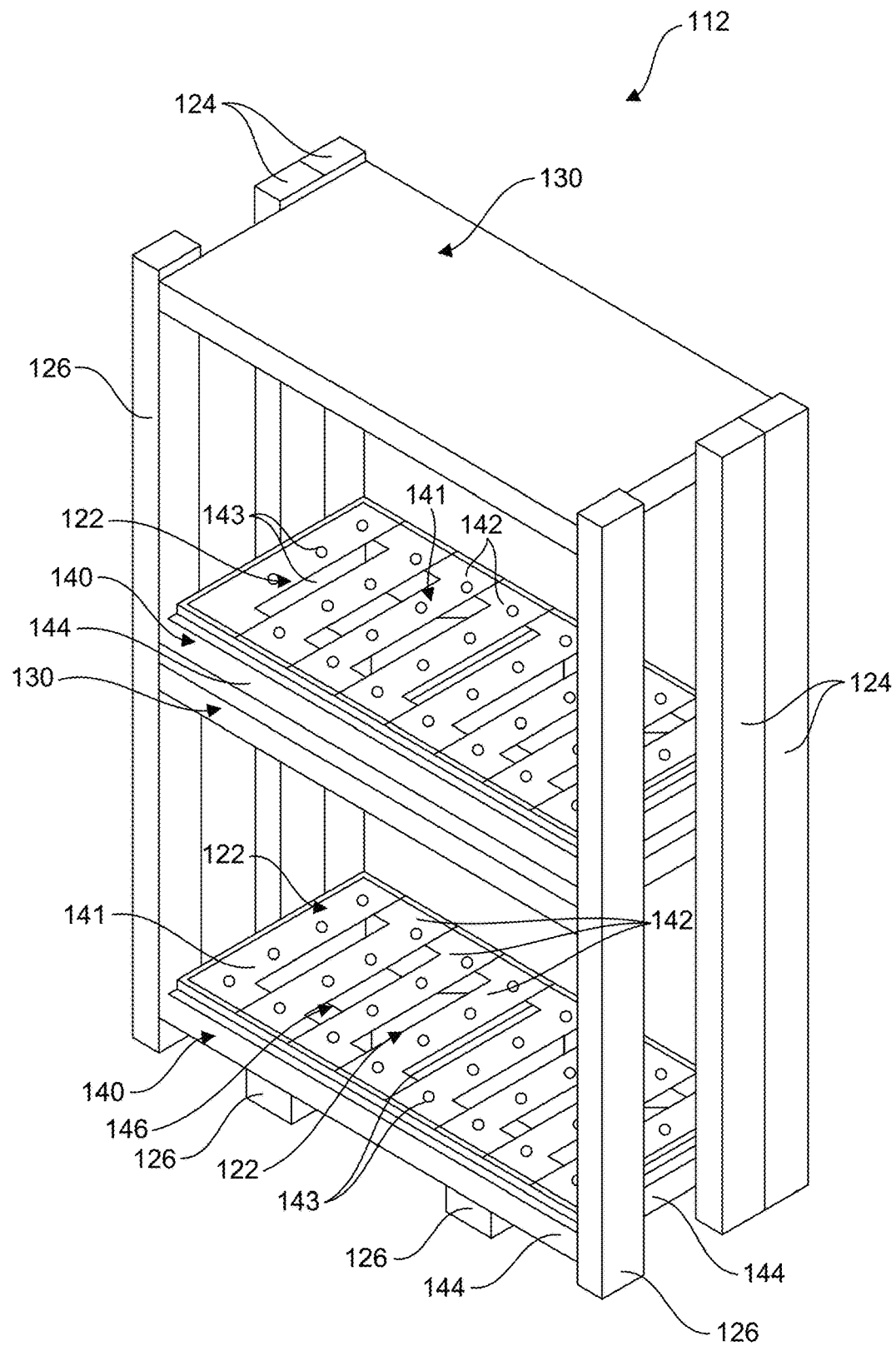
FIG. 47 illustrates an elevational front perspective view of the fixed-height, two-level air handling rack system of FIG. 46 according to one embodiment of the present disclosure.

As noted above, the horticulture systems 10 of the present disclosure may or may not include one or more air handling rack that is not height adjustable. An exemplary fixed-height, two-level air handling rack system 112 that may be utilized with the horticulture system 10 disclosed herein is shown in FIGS. 46 and 47. The air handling rack system 112 of FIGS. 46 and 47 is similar to the air handling rack systems 12 described above with respect to FIGS. 1-45, and therefore like reference numerals preceded with "1" are used to indicate like components, aspects, functions, processes or functions, and the description above directed to thereto equally applies, and is not repeated for brevity and clarity purposes.

The rack system 112 od FIGS. 46 and 47 differs from the rack systems 12 discussed above with respect to FIGS. 1-45 in that the height of the environmental cultivation chambers 122 is fixed (i.e., cannot be adjust, such as during a plant growth cycle).

As shown in FIGS. 46 and 47, the rack system 112 is a fixed-height, two-level air handling rack system 112 that includes a first input diffusion assembly 130, a first plant support tray assembly 140 positioned below the first input diffusion assembly 140 to form a first environmental cultivation chamber 122 therebetween, a second input diffusion assembly 130 positioned below the first plant support tray assembly 140, and a second plant support tray assembly 140 positioned below the second input diffusion assembly 140 to form a second environmental cultivation chamber 122 therebetween. However, the heights of the first and second environmental cultivation chambers 122 is fixed. The height of the first input diffusion assembly relative to the second input diffusion assembly is fixed, a height of the first plant support tray assembly relative to the second plant support tray assembly is fixed, a height of the first input diffusion assembly relative to the first plant support tray assembly is fixed such that a height of the first environmental cultivation chamber is fixed, and a height of the second input diffusion assembly relative to the second plant support tray is fixed such that a height of the second environmental cultivation chamber is fixed.

As the first input diffusion assembly 130 and the second input diffusion assembly 130 are not movable (at least with respect to the first plant support tray assembly 140 and the second plant support tray assembly 140, respectively), the supply frame plenums 124 do not need to be length-adjustable or include one or more length-adjustable portion, as shown in FIGS. 46 and 47. Rather, the supply frame plenums 124 comprise fixed height plenums.

Specifically, as shown in FIGS. 46 and 47, the rack system 112 includes a pair of fixed-length supply frame plenums 124 both at a first lateral side/end of the rack system 112 proximate to a first face (from or back) of the rack system 112 and at second lateral side/end of the rack system 112 proximate to a first face (from or back) of the rack system 112. Each of the of the fixed-length supply frame plenums 124 extend to the uppermost first input diffusion assembly 130, although any combination of the supply frame plenums 124 may be fluidically coupled to the first input diffusion assembly 130 to feed/provide a flow of the supply airflow thereto, and any combination of the supply frame plenums 124 may physically support it (at least partially) (e.g., may be coupled to the first input diffusion assembly 130). For example, only one supply frame plenum 124 of each pair of the supply frame plenums 124 at the respective lateral ends of the rack system 112 may be fluidically coupled to the first input diffusion assembly 130, or only one total supply frame plenum 124 may be fluidically coupled to the first input diffusion assembly 130. Similarly, only one supply frame plenum 124 of each pair of the supply frame plenums 124 may physically support the first input diffusion assembly 130, or all four (or three) of the supply frame plenums 124 may physically support the first input diffusion assembly 130. For example, only two of the supply frame plenums 124 may extend to and/or be coupled first input diffusion assembly 130. Similarly, any combination of the supply frame plenums 124 may be fluidically coupled to the second input diffusion assembly 130 to feed/provide a flow of the supply airflow thereto, and any combination of the supply frame plenums 124 may physically support it.

Although the first and second input diffusion assemblies 130 may be provided at fixed/non-adjustable heights, and thereby the heights of the first and second environmental chambers 122 be fixed/non-adjustable, the first and second input diffusion assemblies 130, 130 may be configured to adjust the velocity (and potentially volumetric flow rate) and the flow pattern/type of the supply airflow entering and passing through the first and second environmental chambers 122, as described above with respect to the input diffusion assemblies 30. For example, the first and second input diffusion assemblies 130 may be configured to selectively vary the relationship of the first and second distribution plates 131A, 131B to vary the degree/nature of overlap of the plurality of first and second input aperture 132A, 132B, and thereby the size and/or shape of the apertures as a whole, to adjust the velocity and the flow pattern/type of the supply airflow entering and passing through the first and second environmental chambers 122, as described below.

Figure 48:
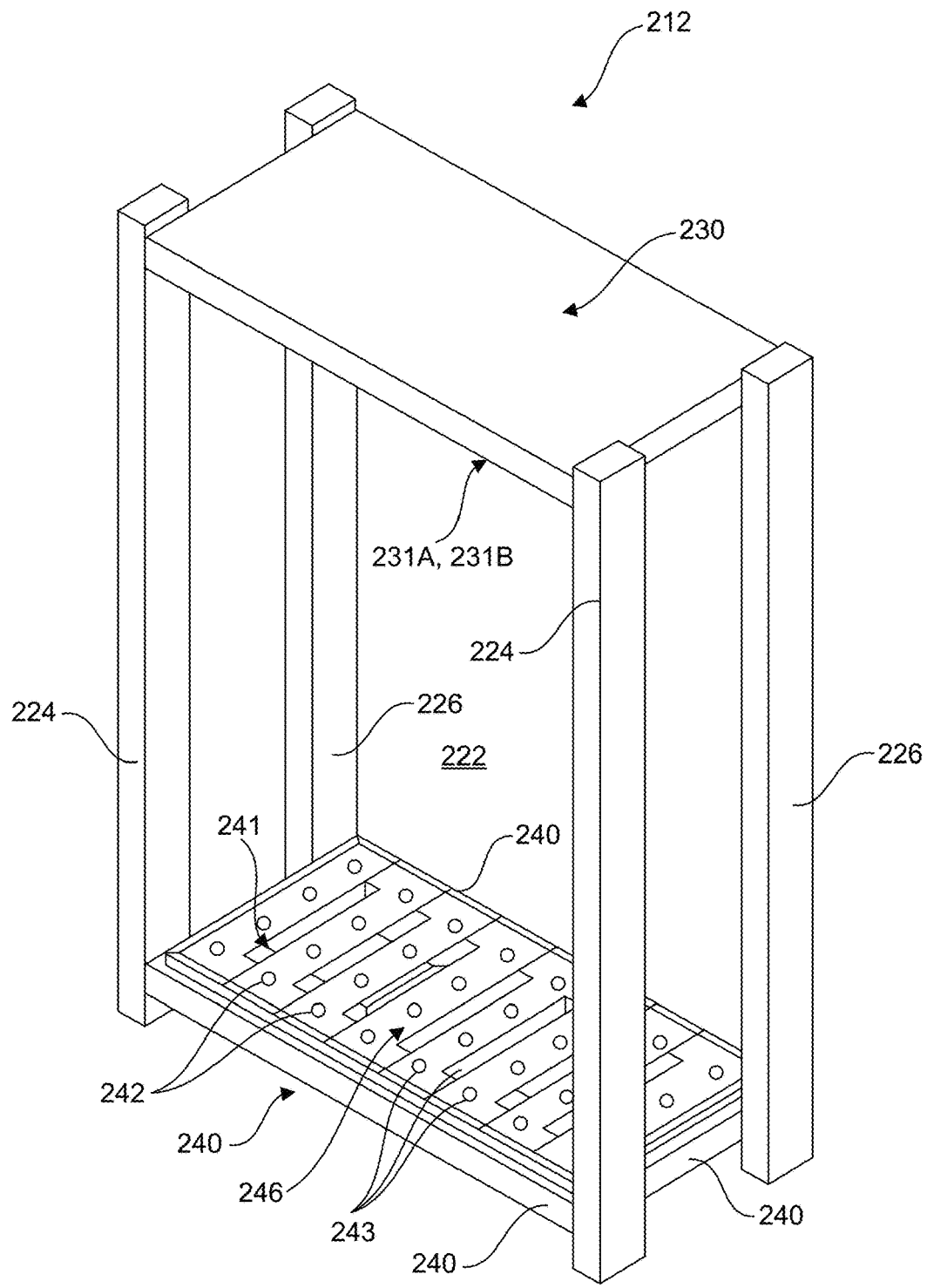
FIG. 48 illustrates an elevational front perspective view of a fixed-height, single-level air handling rack system for a horticulture system according to one embodiment of the present disclosure.

As noted above, the horticulture systems 10 of the present disclosure may not include multiple tiers/levels and/or be configured to grow many plants. An exemplary fixed-height, single-level air handling rack system 212 that may be utilized with the horticulture system 10 disclosed herein is shown in FIG. 48. The air handling rack system 212 of FIG. 48 is similar to the air handling rack systems 112 described above with respect to FIGS. 46 and 47, and therefore like reference numerals preceded with "2" are used to indicate like components, aspects, functions, processes or functions, and the description above directed to thereto equally applies, and is not repeated for brevity and clarity purposes.

The rack system 212 of FIG. 48 differs from the rack system 112 of FIGS. 46 and 47 discussed above in that it only includes a single plant support tray assembly 240 positioned below a single input diffusion assembly 240 to form a single fixed-height environmental cultivation chamber 222 therebetween, as shown in FIG. 48. As also shown in FIG. 48, as only one input diffusion assembly 240 is included, the rack system 212 may only include a single frame support plenum proximate to each corner of the rack system 212 that extends upwardly to the input diffusion assembly 240. A pair of the return frame plenums 226 may extend to the input diffusion assembly 240 so as to physically support it (i.e., are not fluidically coupled thereto). Similarly, only one of the supply frame plenums 226 may be fluidically coupled to the input diffusion assembly 240, as a relatively small volume of the supply airflow in the environmental cultivation chamber 222 may be sufficient for the relatively small area thereof. As discussed above, although the input diffusion assembly 240 may be provided at a fixed height, the distribution plates 231A, 231B, and the input apertures 232A, 232B thereof, may be adjustable to adjust the supply airflow flowing into and through the environmental cultivation chamber 222.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While dimensions and types of materials may be described herein, they are intended to define parameters of some of the various examples, and they are by no means limiting to all examples and are merely exemplary. Many other examples will be apparent to those of skill in the art upon reviewing the above description. The scope of the various examples should, therefore, be determined with reference to the claims included herein, along with the full scope of equivalents to which such claims are entitled.

As used herein, the terms "including" and "in which" are used as the plain-English equivalents of the respective terms "comprising" and "wherein." Moreover, as used herein, the terms "first," "second," and "third," etc. are used merely as reference labels, and are not intended to impose numerical, structural or other requirements. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the claims included herein are not written in means-plus-function format and are not intended to be interpreted based on 35 U.S.C. § 112, sixth paragraph, unless and until such claim limitations expressly use the phrase "means for" followed by a statement of function cavity of further structure. It is to be understood that not necessarily all such objects or advantages described above may be achieved in accordance with any particular example. Thus, for example, those skilled in the art will recognize that the systems and methods described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of examples, it should be readily understood that the disclosure is not limited to such disclosed examples. Rather, this disclosure can be modified to incorporate any number of variations, alterations, substitutions or equivalent arrangements not heretofore described, but which are commensurate with the spirit and scope of the disclosure. Additionally, while various examples have been described, it is to be understood that aspects of the disclosure may include only one example or some of the described examples. Also, while some disclosure are described as having a certain number of elements, it will be understood that the examples can be practiced with less than or greater than the certain number of elements.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A horticulture system, comprising:
    an air handling first rack system comprising:
        at least one frame supply plenum extending upwardly from a bottom side of the first rack system;
        at least one frame return plenum extending upwardly from the bottom side of the first rack system;
        at least one input diffusion assembly fluidically coupled to the at least one frame supply plenum, the at least one input diffusion assembly being configured to direct a supply airflow flowing through the at least one frame supply plenum downwardly from an underside of the at least one input diffusion assembly;
        at least one plant support tray assembly physically supported by and fluidically coupled to the at least one frame return plenum, the at least one plant support tray assembly being positioned below the at least one input diffusion assembly to form at least one environmental cultivation chamber therebetween; and
        a plurality of panels that collectively extend about a periphery of at least a portion of the at least one environmental cultivation chamber to substantially enclose the at least one environmental cultivation chamber,
    wherein the least one at least one frame supply plenum physically supports the at least one input diffusion assembly in an elevated position spaced above the at least one plant support tray assembly such that the at least one input diffusion assembly extends over the at least one plant support tray assembly, and
    wherein the first rack system is configured to direct the supply airflow through the at least one environmental cultivation chamber from the at least one input diffusion assembly to the at least one plant support tray assembly past at least one plant positioned on a support side of the at least one plant support tray assembly and into the at least one frame return plenum as a return airflow, and
    wherein the at least one frame supply plenum, the at least one frame return plenum, the at least one input diffusion assembly and the at least one plant support tray assembly form a free-standing rack with the at least one frame supply plenum and the at least one frame return plenum being support legs of the free-standing rack.

2. The system according to claim 1, wherein the at least one input diffusion assembly comprises at least one diffusion plate with a plurality of input apertures in fluid communication with the at least one frame supply plenum, the at least one diffusion plate being configured to direct the supply airflow flowing downwardly therefrom toward the at least one plant support tray assembly.

3. The system according to claim 2, wherein the at least one diffusion plate comprises a first diffusion plate with a plurality of first input apertures and a second diffusion plate with a plurality of second input apertures at least partially overlapping the first input apertures, the first and second diffusion plates being movably coupled together such that the degree of overlap between the first and second input apertures is adjustable to adjust the velocity of the supply airflow flowing therethrough.

4. The system according to claim 1, wherein a height of the at least one input diffusion assembly relative to that of the at least one plant support tray assembly is adjustable such that a height of the at least one environmental cultivation chamber is adjustable.

5. The system according to claim 1, wherein the first rack system further comprises at least one bottom lighting device positioned proximate to the support side of the at least one plant support tray assembly and distal to the underside of the at least one input diffusion assembly such that the at least one bottom lighting device is positioned below a leaf canopy of the at least one plant when it is positioned on the support side of the at least one plant support tray assembly.

6. The system according to claim 1, wherein the first rack system further comprises at least one top lighting device positioned within the at least one environmental cultivation chamber proximate to the underside of the at least one input diffusion assembly and distal to the support side of the at least one plant support tray assembly such that the at least one top lighting device is positioned above the at least one plant when it is positioned on the support side of the at least one plant support tray assembly.

7. The system according to claim 1, wherein the first rack system further comprises at least one bottom lighting device positioned proximate to the support side of the at least one plant support tray assembly and distal to the underside of the at least one input diffusion assembly such that the at least one bottom lighting device is positioned below a leaf canopy of the at least one plant when it is positioned on the support side of the at least one plant support tray assembly.

8. The system according to claim 1, wherein the at least one plant support tray assembly comprises a plant support platform that defines the support side, and wherein the plant support platform comprises a plurality of first return apertures extending therethrough for a flow of the return airflow therethrough.

9. The system according to claim 8, wherein the at least one plant support tray assembly further comprises a return passageway configured to direct the flow of the return airflow flowing through the plant support platform through the return passageway and to the at least one frame return plenum, wherein the return passageway extends along a pathway that extends about an internal cavity such that an inner side wall of the return passageway defines an outer border of the internal cavity, and wherein the internal cavity is in fluid communication with the return passageway via a plurality of through holes in the inner side wall of the return passageway that are spaced along the outer border.

10. The system according to claim 1, wherein:
the at least one input diffusion assembly comprises:
  a first input diffusion assembly; and
  a second input diffusion assembly positioned below the first input diffusion assembly; and
the at least one plant support tray assembly comprises:
  a first plant support tray assembly positioned above the second input diffusion assembly, and positioned below the first input diffusion assembly to form a first environmental cultivation chamber therebetween, wherein the first rack system is configured to direct the supply airflow through the first environmental cultivation chamber from the first input diffusion assembly to the first plant support tray assembly past at least one plant positioned on a support side of the first plant support tray assembly and into the at least one frame return plenum as a portion of the return airflow; and
  a second plant support tray assembly positioned below the second input diffusion assembly to form a second environmental cultivation chamber therebetween, wherein the first rack system is configured to direct the supply airflow through the second environmental cultivation chamber from the second input diffusion assembly to the second plant support tray assembly past at least one plant positioned on a support side of the second plant support tray assembly and into the at least one frame return plenum as a portion of the return airflow.

11. The system according to claim 10, wherein the plurality of panels collectively extend about the first environmental cultivation chamber to substantially enclose the first environmental cultivation chamber, and collectively extend about the second environmental cultivation chamber to substantially enclose the second environmental cultivation chamber.

12. The system according to claim 1, wherein the at least one frame supply plenum comprises a first frame supply plenum and a second frame supply plenum, the second frame supply plenum being a separate and distinct plenum than the first frame supply plenum, and wherein the at least one input diffusion assembly comprises a first input diffusion assembly fluidically coupled to the first and second frame supply plenums such that the first input diffusion assembly receives and directs respective flows of the supply airflow from the first and second frame supply plenums.

13. The system according to claim 1, wherein the at least one frame supply plenum comprises a first frame supply plenum positioned proximate to a first end of the first rack system and a first face of the first rack system, and a second frame supply plenum positioned proximate to a second end of the first rack system that opposes the first end and the first face of the first rack system, and wherein the at least one input diffusion assembly extends between the first and second frame supply plenums in a first direction that extends between the first and second ends of the first rack system, and
wherein the at least one frame return plenum comprises a first frame return plenum positioned proximate to the first end of the first rack system and a second face of the first rack system that opposes the first face, and a second support return plenum positioned proximate to the second end of the first rack system and the second face of the first rack system, wherein the at least one input diffusion assembly and the at least one plant support tray assembly extend between the first and second frame supply plenums and between the first and second frame return plenums in the first direction, and wherein the at least one input diffusion assembly and the at least one plant support tray assembly extend between the first frame supply plenum and the first frame return plenum, and between the second frame supply plenum and the second frame return plenum, in a second direction that extends between the first and second faces of the first rack system.

14. The system according to claim 1, wherein the at least one plant support tray input diffusion assembly is physically supported by the at least one frame supply plenum and not fluidically coupled thereto.

15. The system according to claim 1, further comprising an air conditioning system fluidically coupled to the at least one frame supply plenum via at least one supply base plenum and fluidically coupled to the at least one frame return plenum via at least one return base plenum, the air conditioning system configured to force the supply airflow through the at least one supply base plenum and to the at least one frame supply plenum under positive pressure, and draw the return airflow through the at least one return base plenum from the at least one frame return plenum under negative pressure.

16. The system according to claim 15, wherein the air conditioning system is configured to maintain the at least one environmental cultivation chamber under positive pressure.

17. The system according to claim 15, wherein the least one supply base plenum and the at least one return base plenum extend beneath the first rack system and the air conditioning system.

18. The system according to claim 1, wherein the at least one frame supply plenum consists of at least one rigid duct.

19. The system according to claim 1, wherein the plurality of panels comprise a plurality of separate and distinct panels.

20. The system according to claim 1, wherein the first rack system further comprises at least one lighting device positioned within the at least one environmental cultivation chamber, and wherein the plurality of panels each comprise an inner surface that faces the at least one environmental cultivation chamber and is configured to reflect at least about 75% of light emitted from the at least one lighting device.

21. The system according to claim 1, wherein the at least one frame return plenum extends upwardly from the bottom side of the first rack system and to the at least one input diffusion assembly.

22. The system according to claim 1, wherein the at least one frame return plenum consists of one or more rigid duct.

23. The system according to claim 1, wherein the at least one frame supply plenum and the at least one frame return plenum of the first rack system each define an open bottom end at bottom sides thereof, and wherein the system further comprises:
   at least one supply base plenum extending beneath the open bottom end of the at least one frame supply plenum of the first rack system and being in fluid communication with the at least one frame supply plenum of the first rack system via the open bottom end thereof; and
   at least one return base plenum extending beneath the open bottom end of the at least one frame return plenum of the first rack system and being in fluid communication with the at least one frame return plenum of the first rack system via the open bottom thereof.

24. The system according to claim 23, further comprising an air handling second rack system comprising:
   at least one second frame supply plenum extending upwardly from a bottom side of the second rack system;
   at least one second frame return plenum extending upwardly from the bottom side of the second rack system;
   at least one second input diffusion assembly physically supported by and fluidically coupled to the at least one second frame supply plenum, the at least one second input diffusion assembly being configured to direct a supply airflow flowing through the at least one second frame supply plenum downwardly from an underside of the at least one second input diffusion assembly;
   at least one second plant support tray assembly physically supported by and fluidically coupled to the at least one second frame return plenum, the at least one second plant support tray assembly being positioned below the at least one second input diffusion assembly to form at least one second environmental cultivation chamber therebetween; and
   a second plurality of panels that collectively extend about a periphery of at least a portion of the at least one second environmental cultivation chamber to substantially enclose the at least one second environmental cultivation chamber,
   wherein the second rack system is configured to direct the supply airflow through the at least one second environmental cultivation chamber from the at least one second input diffusion assembly to the at least one second plant support tray assembly past at least one plant positioned on a support side of the at least one second plant support tray assembly and into the at least one second frame return plenum as a return airflow,
   wherein the at least one supply base plenum extends beneath the open bottom end of the at least one second frame supply plenum of the second rack system and is in fluid communication with the at least one second frame supply plenum of the second rack system via the open bottom end thereof, and
   wherein the at least one return base plenum extends beneath the open bottom end of the at least one second frame return plenum of the second rack system and is in fluid communication with the at least one second frame return plenum of the second rack system via the open bottom thereof.

25. A horticulture system, comprising:
   an air handling first rack system comprising:
      at least one frame supply plenum extending upwardly from a bottom side of the first rack system;
      at least one frame return plenum extending upwardly from the bottom side of the first rack system;
      at least one input diffusion assembly fluidically coupled to the at least one frame supply plenum, the at least one input diffusion assembly being configured to direct a supply airflow flowing through the at least one frame supply plenum downwardly from an underside of the at least one input diffusion assembly;
      at least one plant support tray assembly physically supported by and fluidically coupled to the at least one frame return plenum, the at least one plant support tray assembly being positioned below the at least one input diffusion assembly to form at least one environmental cultivation chamber therebetween; and
      a plurality of panels that collectively extend about a periphery of at least a portion of the at least one environmental cultivation chamber to substantially enclose the at least one environmental cultivation chamber,
      wherein the least one at least one frame supply plenum physically supports the at least one input diffusion assembly in an elevated position spaced above the at least one plant support tray assembly such that the at least one input diffusion assembly extends over the at least one plant support tray assembly, and
   wherein the first rack system is configured to direct the supply airflow through the at least one environmental cultivation chamber from the at least one input diffusion assembly to the at least one plant support tray assembly past at least one plant positioned on a support side of the at least one plant support tray assembly and into the at least one frame return plenum as a return airflow,
   wherein the at least one plant support tray assembly comprises a plant support platform that defines the support side, and the plant support platform comprises a plurality of first return apertures extending therethrough for a flow of the return airflow therethrough,
   wherein the at least one plant support tray assembly further comprises a return passageway configured to direct the flow of the return airflow flowing through the plant support platform through the return passageway and to the at least one frame return plenum, and
   wherein the return passageway extends along a pathway that extends about an internal cavity such that an inner side wall of the return passageway defines an outer border of the internal cavity, and wherein the internal cavity is in fluid communication with the return passageway via a plurality of through holes in the inner side wall of the return passageway that are spaced along the outer border.

26. The system according to claim 25, wherein the return passageway extends about and defines an outer periphery of the internal cavity, and wherein the first rack system further comprises filters positioned within the plurality of through holes.

27. The system according to claim 26, wherein a height of a portion of the at least one input plenum between the at least one input diffusion assembly and the at least one plant support tray assembly is adjustable such that a height of the at least one environmental cultivation chamber is adjustable.

28. A horticulture system, comprising:
an air handling first rack system comprising:
　at least one frame supply plenum extending upwardly from a bottom side of the first rack system;
　at least one frame return plenum extending upwardly from the bottom side of the first rack system;
　at least one input diffusion assembly physically supported by and fluidically coupled to the at least one frame supply plenum, the at least one input diffusion assembly being configured to direct a supply airflow flowing through the at least one frame supply plenum downwardly from an underside of the at least one input diffusion assembly;
　at least one plant support tray assembly physically supported by and fluidically coupled to the at least one frame return plenum, the at least one plant support tray assembly being positioned below the at least one input diffusion assembly to form at least one environmental cultivation chamber therebetween; and
　a plurality of panels that collectively extend about a periphery of at least a portion of the at least one environmental cultivation chamber to substantially enclose the at least one environmental cultivation chamber,
　wherein the first rack system is configured to direct the supply airflow through the at least one environmental cultivation chamber from the at least one input diffusion assembly to the at least one plant support tray assembly past at least one plant positioned on a support side of the at least one plant support tray assembly and into the at least one frame return plenum as a return airflow, and
　wherein the at least one frame supply plenum comprises at least one length adjustable plenum portion positioned at least partially below the at least one input diffusion assembly and above the at least one plant support tray assembly, the at least one length adjustable plenum portion configured to adjust a height of the at least one input diffusion assembly with respect to the at least one plant support tray, and thereby a height of the at least one environmental cultivation chamber.

29. The system according to claim 28, wherein each of the at least one length adjustable plenum portion comprises a first adjustable plenum member and a second adjustable plenum member being telescopingly arranged.

30. The system according to claim 28, wherein the at least one frame supply plenum, the at least one frame return plenum, the at least one input diffusion assembly and the at least one plant support tray assembly form a free-standing rack with the at least one frame supply plenum and the at least one frame return plenum being support legs of the free-standing rack.

31. A horticulture system, comprising:
an air handling first rack system comprising:
　at least one frame supply plenum extending upwardly from a bottom side of the first rack system;
　at least one frame return plenum extending upwardly from the bottom side of the first rack system;
　at least one input diffusion assembly fluidically coupled to the at least one frame supply plenum, the at least one input diffusion assembly being configured to direct a supply airflow flowing through the at least one frame supply plenum downwardly from an underside of the at least one input diffusion assembly;
　at least one plant support tray assembly physically supported by and fluidically coupled to the at least one frame return plenum, the at least one plant support tray assembly being positioned below the at least one input diffusion assembly to form at least one environmental cultivation chamber therebetween; and
　a plurality of panels that collectively extend about a periphery of at least a portion of the at least one environmental cultivation chamber to substantially enclose the at least one environmental cultivation chamber,
　wherein the least one at least one frame supply plenum physically supports the at least one input diffusion assembly in an elevated position spaced above the at least one plant support tray assembly such that the at least one input diffusion assembly extends over the at least one plant support tray assembly, and
wherein the first rack system is configured to direct the supply airflow through the at least one environmental cultivation chamber from the at least one input diffusion assembly to the at least one plant support tray assembly past at least one plant positioned on a support side of the at least one plant support tray assembly and into the at least one frame return plenum as a return airflow,
wherein the at least one frame supply plenum comprises a first frame supply plenum positioned proximate to a first end of the first rack system and a first face of the first rack system, and a second frame supply plenum positioned proximate to a second end of the first rack system that opposes the first end and the first face of the first rack system, and wherein the at least one input diffusion assembly extends between the first and second frame supply plenums in a first direction that extends between the first and second ends of the first rack system, and
wherein the at least one frame return plenum comprises a first frame return plenum positioned proximate to the first end of the first rack system and a second face of the first rack system that opposes the first face, and a second support return plenum positioned proximate to the second end of the first rack system and the second face of the first rack system, wherein the at least one input diffusion assembly and the at least one plant support tray assembly extend between the first and second frame supply plenums and between the first and second frame return plenums in the first direction, and wherein the at least one input diffusion assembly and the at least one plant support tray assembly extend between the first frame supply plenum and the first frame return plenum, and between the second frame supply plenum and the second frame return plenum, in a second direction that extends between the first and second faces of the first rack system.

32. A horticulture system, comprising:
an air handling first rack system comprising:
- at least one frame supply plenum extending upwardly from a bottom side of the first rack system;
- at least one frame return plenum extending upwardly from the bottom side of the first rack system;
- at least one input diffusion assembly fluidically coupled to the at least one frame supply plenum, the at least one input diffusion assembly being configured to direct a supply airflow flowing through the at least one frame supply plenum downwardly from an underside of the at least one input diffusion assembly;
- at least one plant support tray assembly physically supported by and fluidically coupled to the at least one frame return plenum, the at least one plant support tray assembly being positioned below the at least one input diffusion assembly to form at least one environmental cultivation chamber therebetween; and
- a plurality of panels that collectively extend about a periphery of at least a portion of the at least one environmental cultivation chamber to substantially enclose the at least one environmental cultivation chamber,
wherein the least one at least one frame supply plenum physically supports the at least one input diffusion assembly in an elevated position spaced above the at least one plant support tray assembly such that the at least one input diffusion assembly extends over the at least one plant support tray assembly, and
wherein the first rack system is configured to direct the supply airflow through the at least one environmental cultivation chamber from the at least one input diffusion assembly to the at least one plant support tray assembly past at least one plant positioned on a support side of the at least one plant support tray assembly and into the at least one frame return plenum as a return airflow, and
wherein the first rack system comprises a first rack structure consisting of the at least one frame supply plenum and the at least one frame return plenum, and wherein the at least one input diffusion assembly and the at least one plant support tray assembly are physically supported above the bottom side of the first rack system only by the first rack structure.

* * * * *